(12) United States Patent
Oranski et al.

(10) Patent No.: US 7,645,381 B2
(45) Date of Patent: Jan. 12, 2010

(54) WATER DISPENSER AND FILTER CARTRIDGE FOR USE THEREIN

(75) Inventors: Michael Oranski, Jerusalem (IL); Avner Sadot, Tel Aviv (IL); Israel Heifetz, Tel Aviv (IL); Yoav Dracher, Givatayim (IL)

(73) Assignee: Tana Industries (1991) Ltd., D.N. Haela (IL)

( * ) Notice: Subject to any disclaimer, the term of this patent is extended or adjusted under 35 U.S.C. 154(b) by 0 days.

(21) Appl. No.: 11/955,978

(22) Filed: Dec. 13, 2007

(65) Prior Publication Data

US 2008/0202996 A1  Aug. 28, 2008

Related U.S. Application Data

(62) Division of application No. 11/097,976, filed on Mar. 31, 2005, now Pat. No. 7,470,364.

(60) Provisional application No. 60/559,351, filed on Apr. 2, 2004.

(51) Int. Cl.
    *C02F 1/32* (2006.01)
(52) U.S. Cl. ............... 210/198.1; 210/338; 210/748; 55/476
(58) Field of Classification Search ............ 210/198.1, 210/338, 748; 55/476
    See application file for complete search history.

(56) References Cited

U.S. PATENT DOCUMENTS

| 3,290,906 A |   | 12/1966 | Schilling et al. |        |
|-------------|---|---------|------------------|--------|
| 4,079,440 A |   | 3/1978  | Ohnuma et al.    |        |
| 4,245,270 A |   | 1/1981  | Busby            |        |
| 4,322,291 A | * | 3/1982  | Ho ............... | 210/181 |
| 5,028,809 A |   | 7/1991  | Watanabe et al.  |        |
| 5,188,727 A | * | 2/1993  | Kurth et al. ..... | 210/85 |
| 5,782,380 A |   | 7/1998  | DiSanto          |        |
| 5,833,096 A |   | 11/1998 | Ohu et al.       |        |
| 5,889,684 A |   | 3/1999  | Ben-David et al. |        |
| 5,944,990 A | * | 8/1999  | Edens ............ | 210/232 |
| 5,971,220 A |   | 10/1999 | Payne            |        |
| 6,094,524 A |   | 7/2000  | Riley            |        |
| 6,112,819 A |   | 9/2000  | Henry            |        |

(Continued)

FOREIGN PATENT DOCUMENTS

CA          2310397         11/2001

(Continued)

OTHER PUBLICATIONS

European Search Report Dated Jul. 19, 2005 ; Application No. 05252113.5.

*Primary Examiner*—Walter D Griffin
*Assistant Examiner*—Cameron J Allen
(74) *Attorney, Agent, or Firm*—S. Peter Ludwig

(57) ABSTRACT

A water dispenser including a water inlet adapted to receive water from a water supply, a water filter operative to filter water received from the water supply via the water inlet, a water outlet operative to provide filtered water received from the water filter, a water spill collector and a pivotably mounted drainage-equipped water container support having a first operative orientation underlying the water outlet and defining a downwardly inclined water spill drainage pathway communicating with the water spill collector and a second, non-operative, orientation not underlying the water outlet.

15 Claims, 59 Drawing Sheets

U.S. PATENT DOCUMENTS

| | | |
|---|---|---|
| 6,123,837 A | 9/2000 | Wadsworth et al. |
| 6,207,046 B1 | 3/2001 | Yamashita et al. |
| 6,332,428 B1 | 12/2001 | Li et al. |
| 6,413,114 B2 | 7/2002 | Fukamachi |
| 6,425,425 B2 | 7/2002 | Bianchi et al. |
| 6,516,141 B1 | 2/2003 | DeSantis et al. |
| 6,575,308 B1 | 6/2003 | Fuls et al. |
| 6,644,512 B2 | 11/2003 | Li et al. |
| 7,470,364 B2 | 12/2008 | Oranski et al. |

FOREIGN PATENT DOCUMENTS

| | | |
|---|---|---|
| DE | 4209585 | 9/1993 |
| DE | 20313441 | 11/2003 |
| EP | 386938 | 9/1990 |
| GB | 424595 | 2/1935 |
| GB | 1167090 | 10/1969 |
| WO | 03/099732 | 12/2003 |
| WO | WO-03099732 | 12/2003 |

* cited by examiner

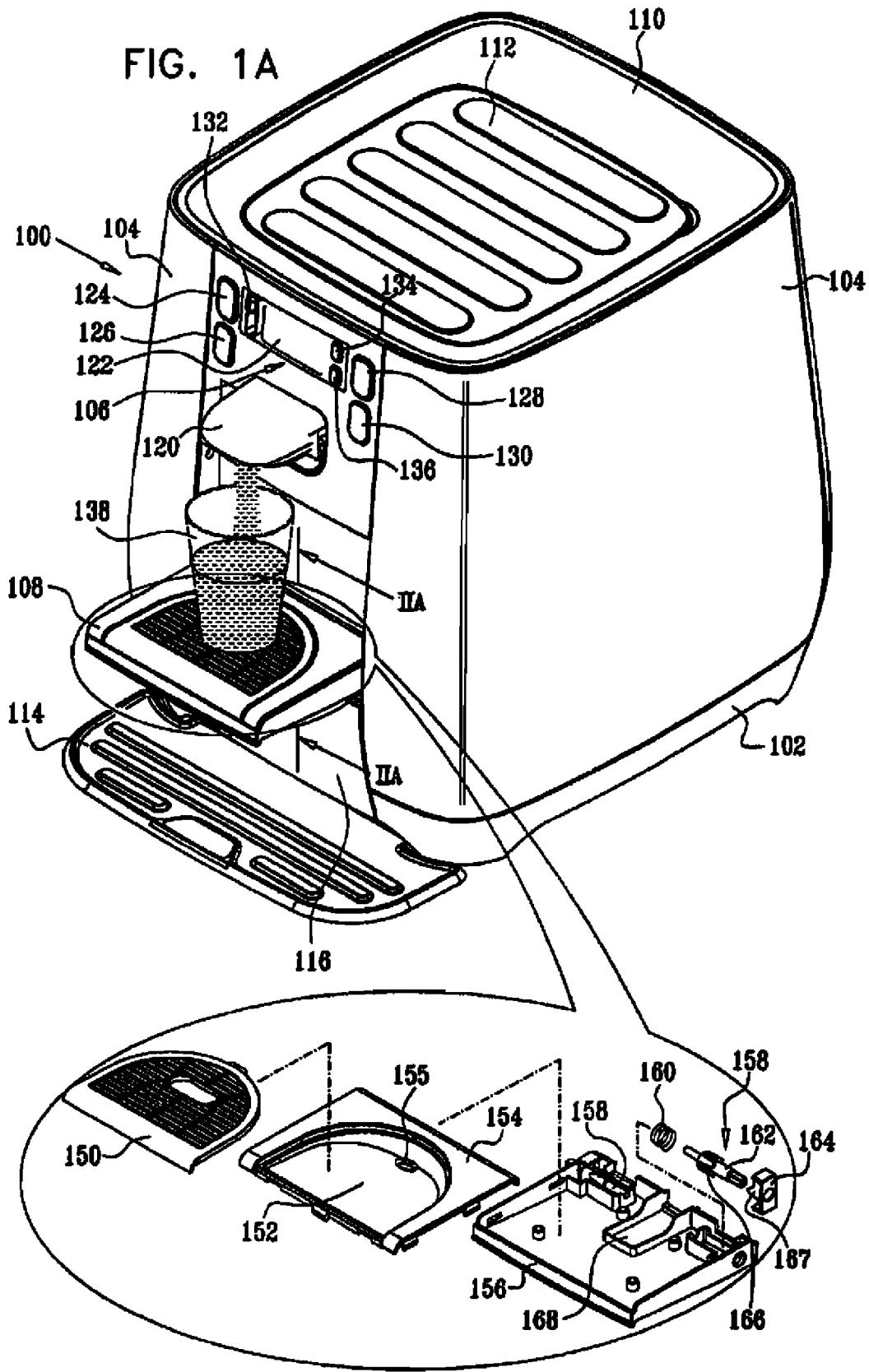

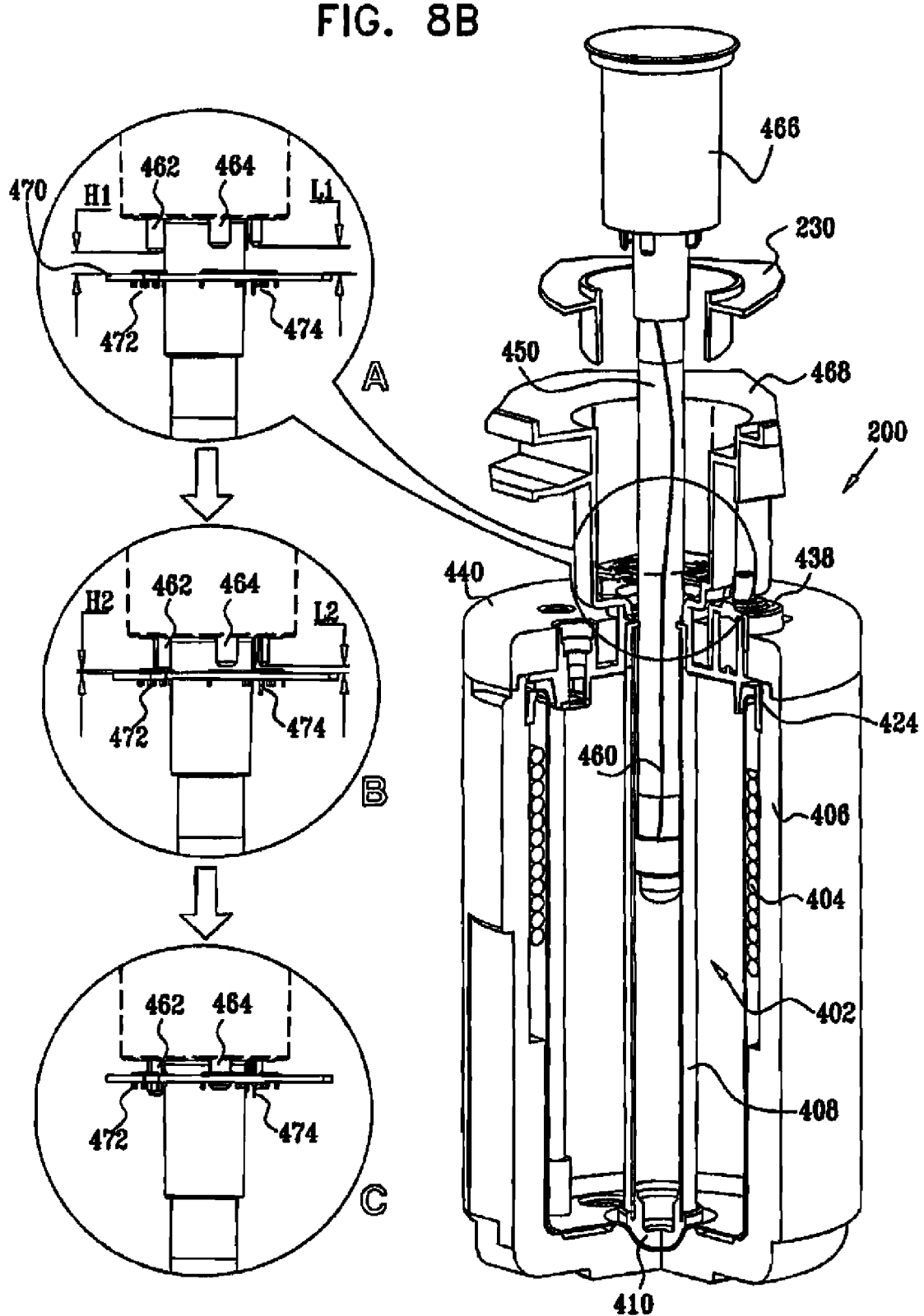

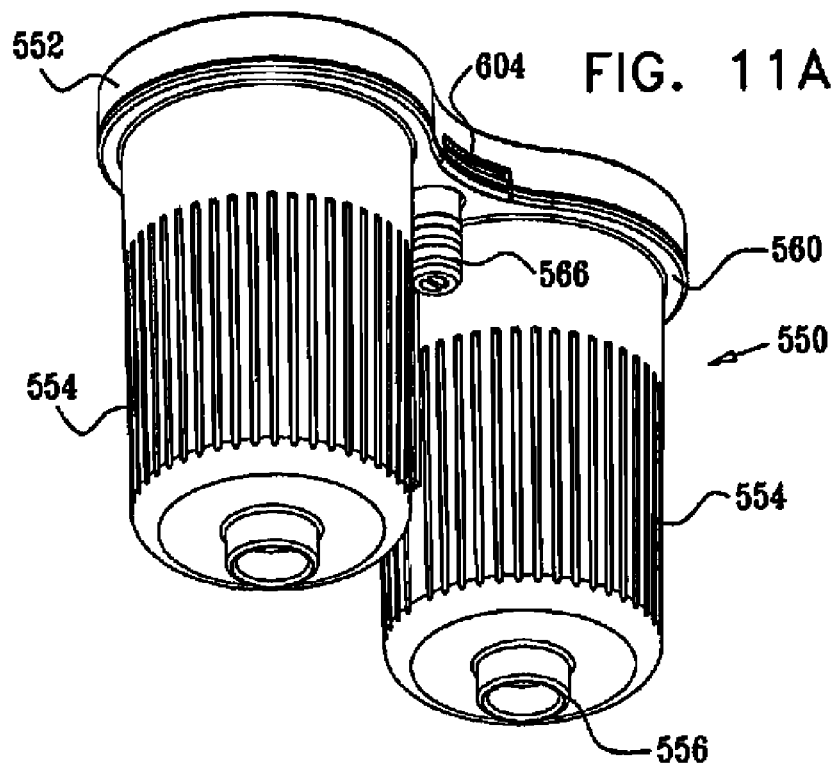
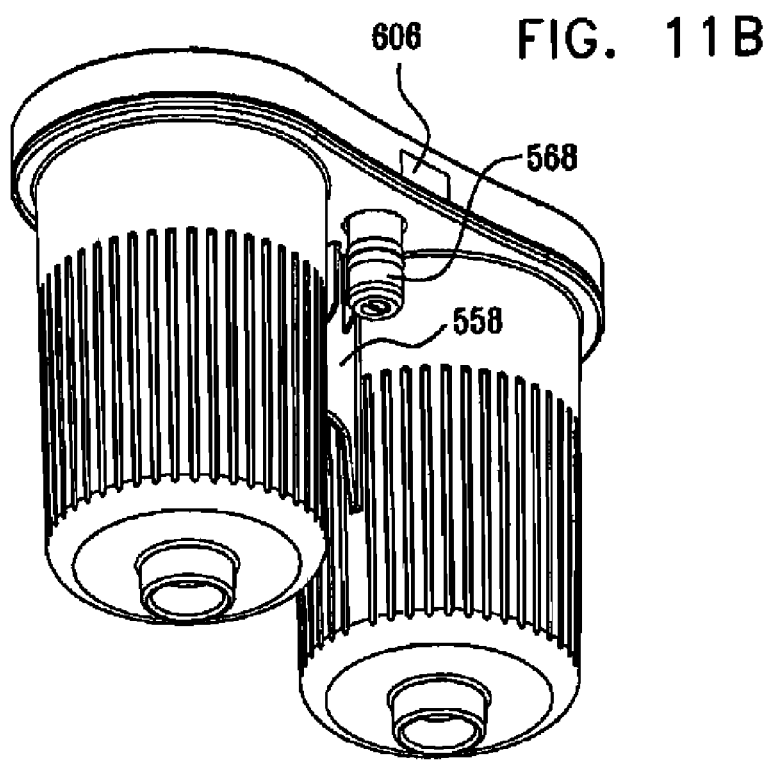

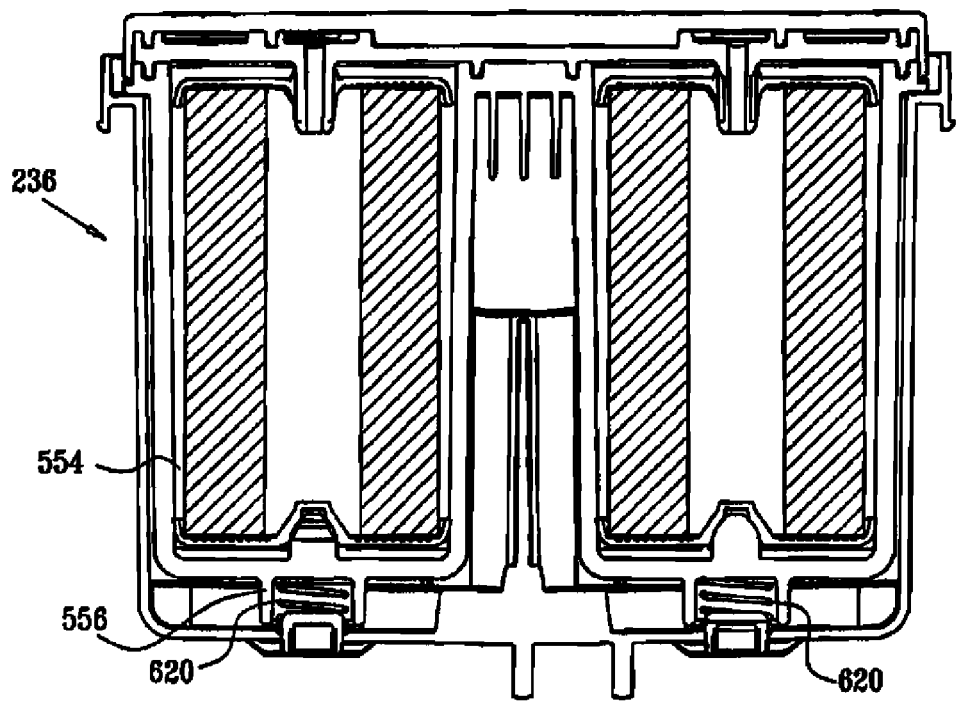
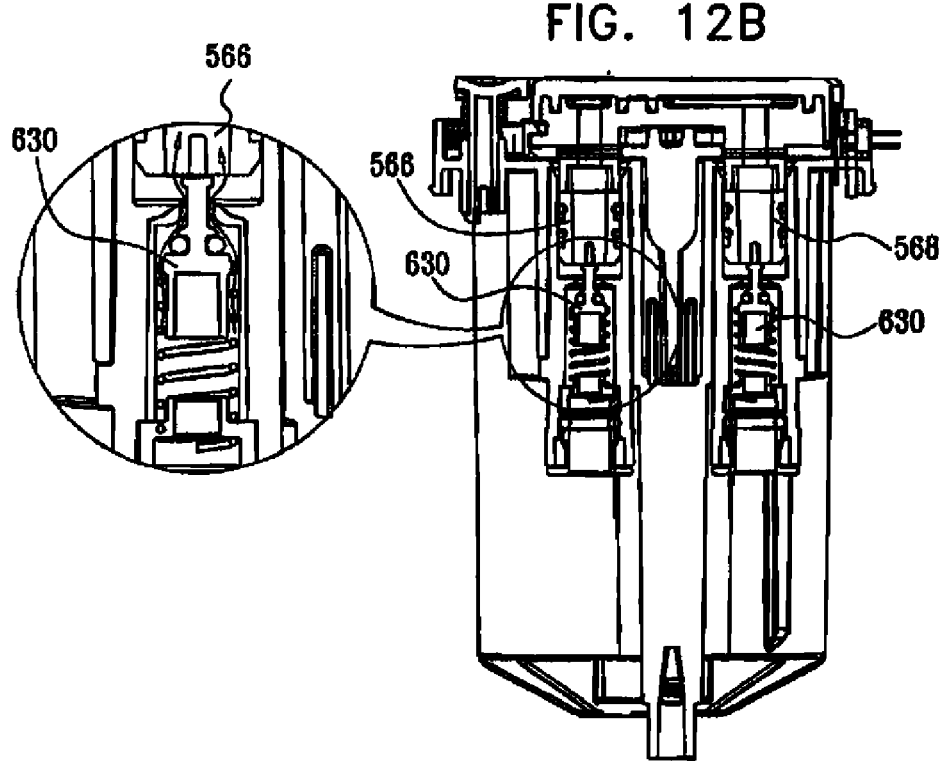

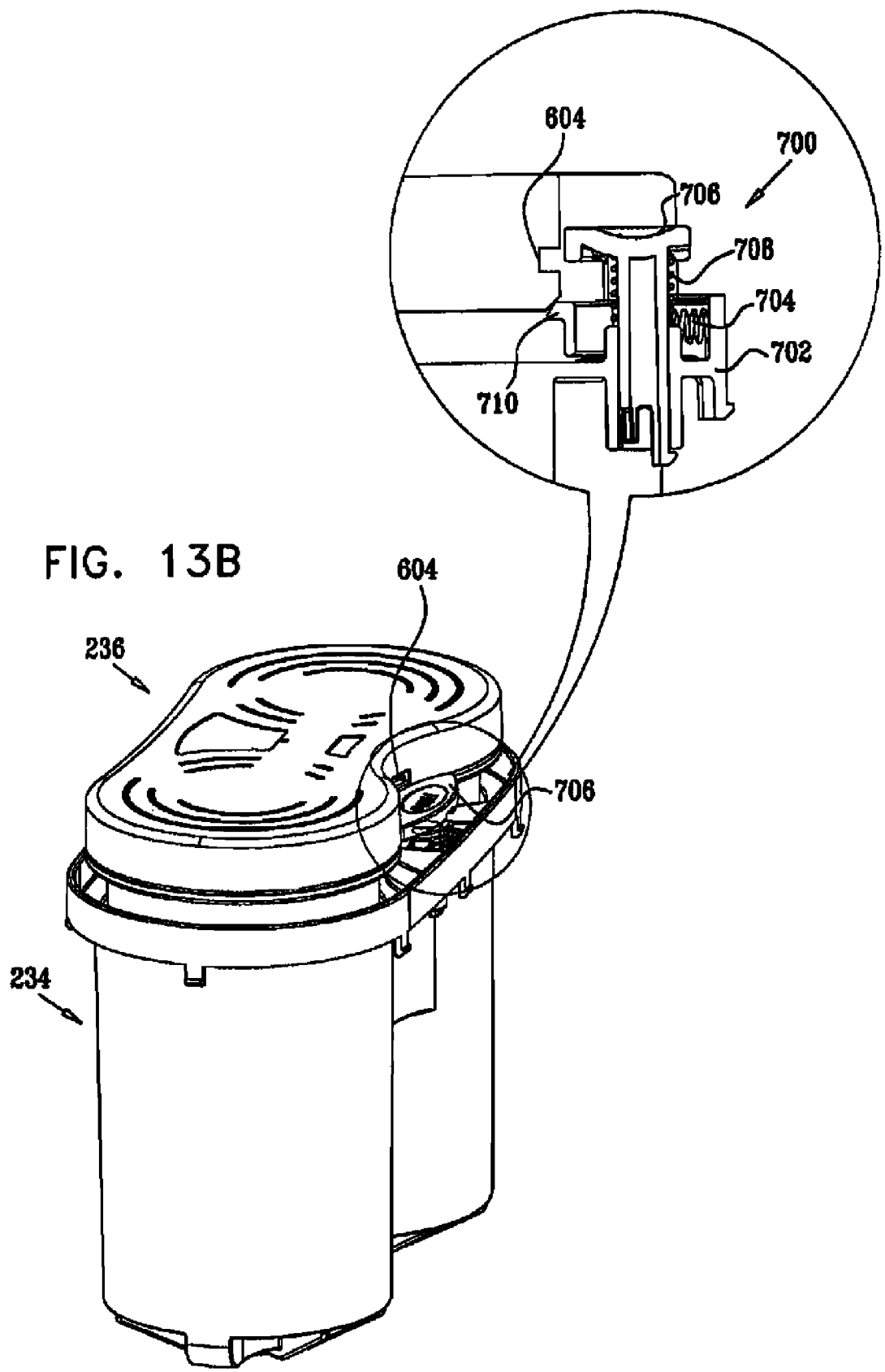

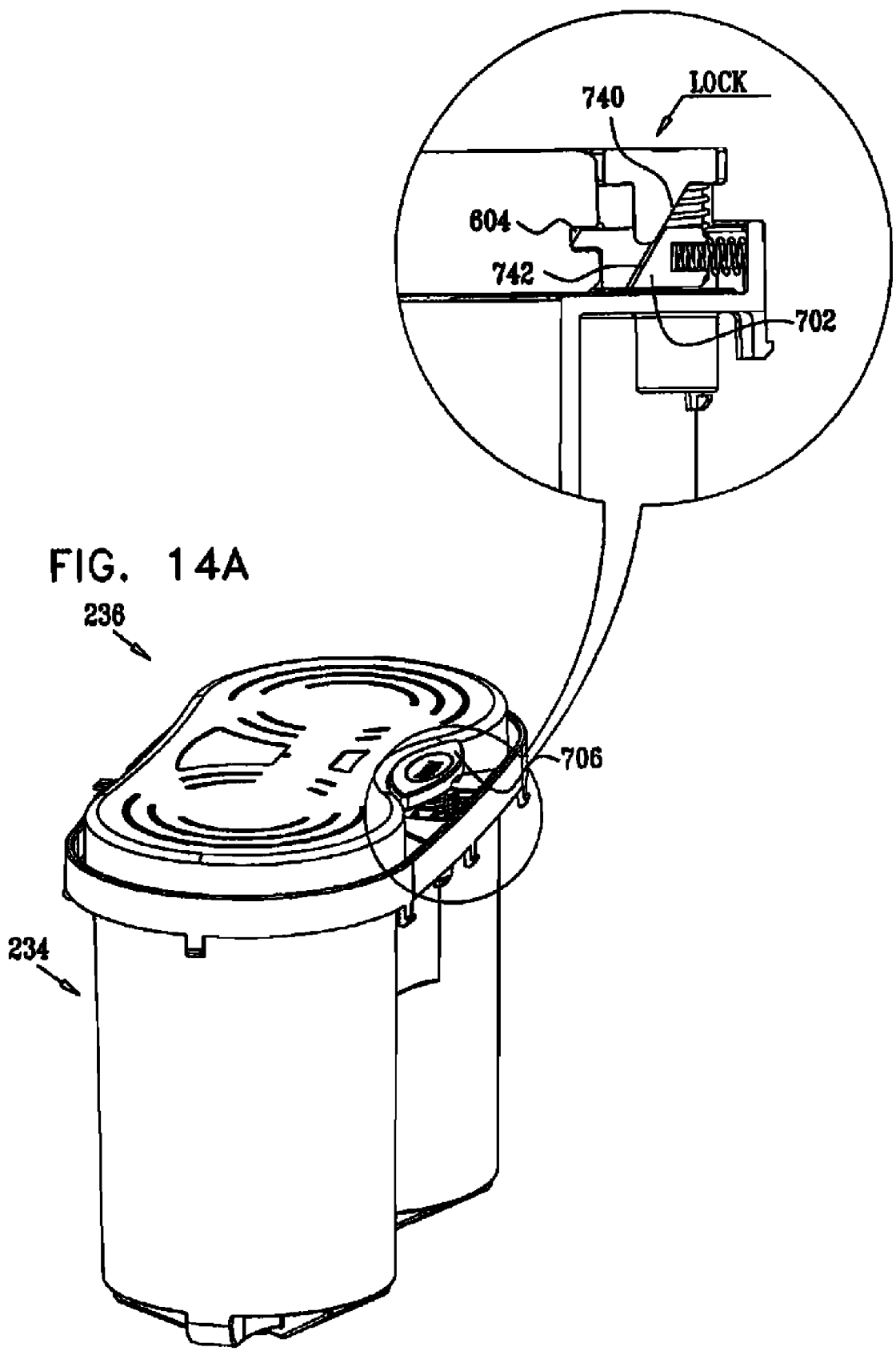

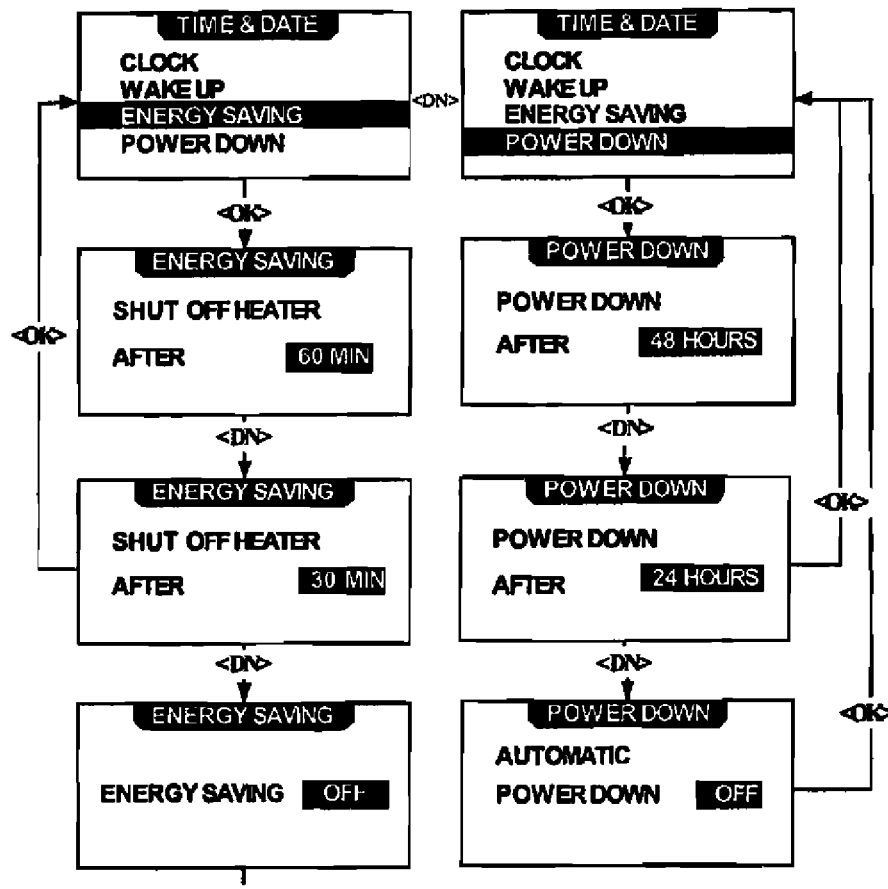

FIG. 15E

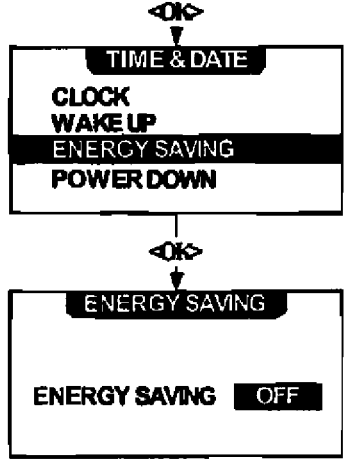

System: MMI Mode > Time & Date
Dispense: Not Available
Key: OK, UP, DN, BACK
Display:Time & Date Menu
NOTE: Use <UP> & <DN> Keys to Navigate, <OK> to Confirm <BACK> Returns to previous Screen to the same Line & Status it came from.

System: MMI Mode > Time & Date > Power down/energy saving set
Dispense: Not Available
Key: OK, UP, DN, BACK
Display:Time & Date Menu
NOTE: Use <UP> & <DN> Keys to change parameters TSLEEPMODE/TPOWERDOWNMODE FIG. 15G
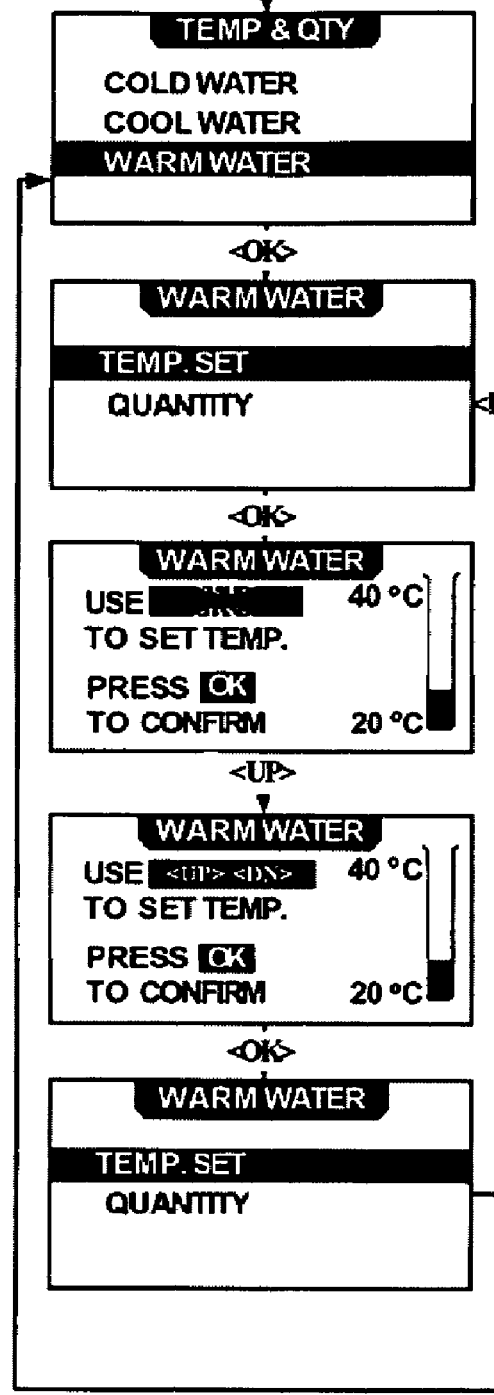
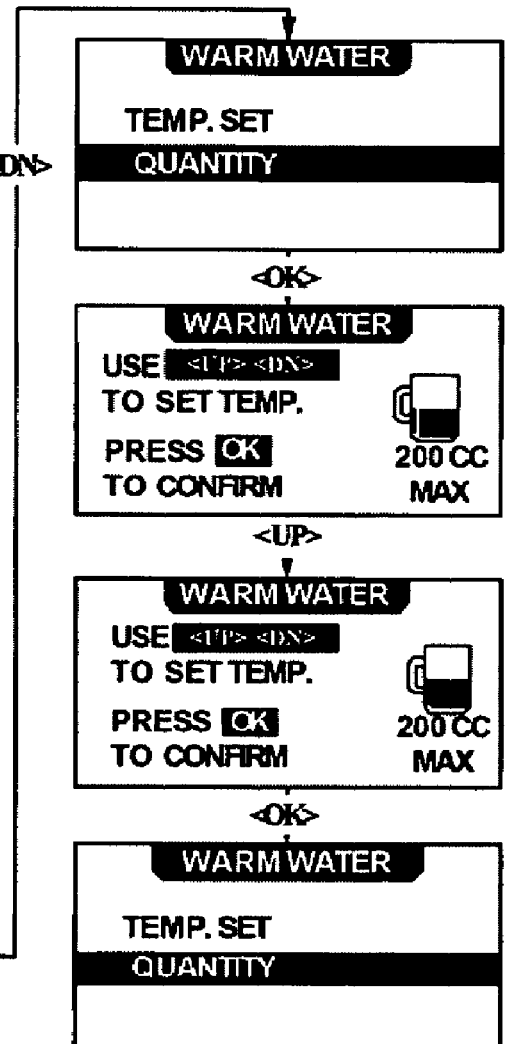

WATER DISPENSER AND FILTER CARTRIDGE FOR USE THEREIN

CROSS-REFERENCE TO PRIOR APPLICATION

This application is a divisional application of U.S. Ser. No. 11/097,976, filed Mar. 31, 2005, which claims priority to U.S. Provisional Patent Application Ser. No. 60/559,351, filed Apr. 2, 2004, which is incorporated herein by reference in its entirety.

FIELD OF THE INVENTION

The present invention relates to water dispensers generally.

BACKGROUND OF THE INVENTION

The following U.S. Patent documents represent the current state of the art:

U.S. Pat. Nos. 6,644,512; 6,516,141; 6,425,425; 6,332,428; 6,207,046; 6,112,819; 6,094,524; 5,971,220 and 5,833,096.

SUMMARY OF THE INVENTION

The present invention seeks to provide an improved, user-friendly, water dispenser.

There is thus provided in accordance with a preferred embodiment of the present invention a water dispenser including a water inlet adapted to receive water from a water supply, a water filter operative to filter water received from the water supply via the water inlet, a water outlet operative to provide filtered water received from the water filter, a water spill collector and a pivotably mounted drainage-equipped water container support having a first operative orientation underlying the water outlet and defining a downwardly inclined water spill drainage pathway communicating with the water spill collector and a second, non-operative, orientation not underlying the water outlet.

There is also provided in accordance with another preferred embodiment of the present invention a water dispenser including a water inlet adapted to receive water from a water supply, a water filter operative to filter water received from the water supply via the water inlet, a water cooling subassembly, a heat exchanger cooperating with the cooling subassembly, the heat exchanger including an at least partially folded over grid, and a water outlet operative to provide filtered water received from the water filter and the water cooling subassembly. In accordance with yet another preferred embodiment the water dispenser also includes a water spill collector and a pivotably mounted drainage-equipped water container support having a first operative orientation underlying the water outlet and defining a downwardly inclined water spill drainage pathway communicating with the water spill collector and a second, non-operative, orientation not underlying the water outlet.

There is further provided in accordance with yet another preferred embodiment of the present invention a water dispenser including a water inlet adapted to receive water from a water supply, a water filter operative to filter water received from the water supply via the water inlet, an ultraviolet radiation assembly operative to disinfect the water received from the water supply, the ultraviolet radiation assembly including a UV lamp assembly and a UV lamp socket, the UV lamp assembly including a UV lamp including at least one filament and a plurality of male contacts, including first and second contacts of respective first and second different lengths, the first lengths being greater than the second lengths, the UV lamp socket defining female contacts for receiving the first and second contacts of the first and second different lengths, the first contacts providing electrical contact with at least one filament in the UV lamp and the second contacts providing electrical contact with an electrical power supply.

There is even further provided in accordance with still another preferred embodiment of the present invention a water dispenser including a water inlet adapted to receive water from a water supply, a water filter assembly operative to filter water received from the water supply via the water inlet and a water outlet operative to provide filtered water received from the water filter assembly, the water filter assembly including a replaceable filter cartridge and a filter socket arranged to removably receive the replaceable filter cartridge and to provide water input and water output communication therewith, the replaceable filter cartridge and the filter socket being configured such that upon vertically downward insertion of the replaceable filter cartridge into the filter socket, both the water input and the water output communication are established generally simultaneously and upon vertically upward removal of the replaceable filter cartridge from the filter socket, both the water input and the water output communication are terminated generally simultaneously.

Preferably, the water dispenser also includes a housing including a base which supports a chassis onto which are formed wrap-around side panels, a front control panel, the pivotably mounted drainage-equipped water container support and a top cover element. Additionally, the front control panel includes a display and at least one function selection button. Preferably, the at least one function selection button includes a hot water selection button, a warm water selection button, a cold water selection button and a cool water selection button. Additionally or alternatively, the at least one function selection button includes an extra-hot water selection button and first and second menu selection buttons.

Preferably, the pivotably mounted drainage-equipped water container support includes a perforated grid element which is seated in a recess formed in a tray element, having a drain aperture, the tray element being attached to a pivotable tray element support which is pivotably supported onto a chassis by means of a pair of pivot axle assemblies. Additionally, at least one of the pair of pivot axle assemblies is spring loaded by a coil spring and includes a non-rotating axle portion, which is arranged for non-rotational engagement with a corresponding socket in the chassis and a cooperating tray element support engagement element, the socket and the engagement element having cooperating toothed surfaces which enable mutual seating engagement thereof at relative rotational orientations separated by 90 degrees, corresponding to the first and second orientations, thus retaining the pivotably mounted drainage-equipped water container support in its second orientation unless the user moves it to its first orientation. Alternatively or additionally, the pivotably mounted drainage-equipped water container support is operative in the first orientation such that water impinging thereonto from above passes through the perforated grid element and may temporarily collect on the tray element, the water draining from the tray element via the drain aperture into a drainage collection and flow region of the pivotable tray element support.

Preferably, the drainage collection and flow region of the tray element support is downwardly inclined towards a weir, which defines a barrier which collects water in the region but permits excess water to pour from the region into the water spill collector. Additionally, when the pivotably mounted drainage-equipped water container support is in the second orientation, any remaining water in the region drains into the water spill collector.

Preferably, the water dispenser includes a filter cartridge identification and verification functionality.

Preferably, the water dispenser includes a filter cartridge as defined hereinbelow.

There is also provided in accordance with another preferred embodiment of the present invention a user-replaceable filter cartridge for use in a water dispenser, the filter cartridge including a housing defining a water inlet manifold and a water outlet manifold communicating respectively with a water inlet connector and a water outlet connector, the water inlet connector and the water outlet connector depending from the water inlet manifold and the water outlet manifold respectively, the housing also defining at least first and second filter element housing portions housing at least first and second filter elements, each of the at least first and second filter element housing portions communicating with the water inlet manifold and with the water outlet manifold, each of the first and second filter elements depending from the water inlet manifold and the water outlet manifold.

There is further provided in accordance with yet another preferred embodiment of the present invention a user-replaceable filter cartridge for use in a water dispenser, the filter cartridge including a housing defining a generally planar portion, a pair of first generally cylindrical portions arranged about respective generally parallel first cylindrical axes extending perpendicular to the plane, and a pair of second generally cylindrical portions arranged about respective generally parallel second cylindrical axes extending perpendicular to the plane, parallel to and adjacent the first cylindrical axes, the pair of second generally cylindrical portions lying adjacent the generally planar portion and adjacent the pair of first generally cylindrical portions, the generally planar portion enclosing a water inlet manifold and a water outlet manifold, the pair of first generally cylindrical portions enclosing first and second filter elements, each communicating with the water inlet manifold and the water outlet manifold, and the pair of second generally cylindrical portions defining a water inlet connector communicating with the water inlet manifold and a water outlet connector communicating with the water outlet manifold.

In accordance with another preferred embodiment of the present invention the pair of first generally cylindrical portions are disposed alongside each other in spaced relationship, being separated from each other along a first axis parallel to the planar portion and the pair of second generally cylindrical portions are disposed alongside each other in spaced relationship, between the pair of first generally cylindrical portions, the pair of second generally cylindrical portions being separated from each other along a second axis parallel to the planar portion and perpendicular to the first axis. In accordance with still another preferred embodiment of the present invention the pair of second generally cylindrical portions communicate directly with the planar portion.

Preferably, the user-replaceable filter cartridge also includes a shut-off valve in communication with an inlet water conduit upstream of water inlets of a filter element housing socket, the shut-off valve and the water inlet being formed as separate units in the filter element housing socket and being formed of different materials.

Preferably, the housing defines a bicameral main housing portion and a housing top portion which is sealed thereto. Additionally, the bicameral main housing portion includes a pair of filter element containing chambers, each of which is formed with a generally cylindrical spring seat defining socket at a bottom surface thereof, the pair of filter element containing chambers being integrally joined by a planar structural portion and by a planar base element which lies in a plane generally perpendicular to the plane of planar structural portion, the planar base element being formed with inlet and outlet port receiving apertures in which are located respective inlet and outlet port defining connector assemblies.

Preferably, the inlet and outlet port defining connector assemblies each define a generally cylindrical water flow conduit on an outer surface of which are provided a pair of sealing rings. Additionally, disposed within each of the filter element containing chambers there is provided an elastomeric sealing pad, which supports one of the filter elements. Preferably, each of the filter elements is formed to have a central bore and wherein disposed over each the filter element is a top pad having a centrally disposed filtered water outlet aperture, communicating with the central bore.

Preferably, the user-replaceable filter cartridge also includes a manifold defining planar element sealed to the planar base element, the manifold defining planar element including respective water inlet and water outlet port communication apertures to which are sealingly joined the inlet and outlet port defining connector assemblies. Additional, the manifold defining planar element is sealed to the housing top portion and defines therewith a water inlet pathway from the water inlet port communication aperture to outer peripheries of both of the filter elements. Alternatively, the manifold defining planar element is sealed to the housing top portion and defines a water outlet pathway from a pair of filtered water apertures, which communicate with filtered water outlet apertures in the top pads, to the outlet port defining connector assembly.

Preferably, the filter cartridge is configured to define a locking surface.

Preferably, the filter cartridge is configured to define a machine-readable label, which enables the filter cartridge to be automatically identified by a water dispenser.

BRIEF DESCRIPTION OF THE DRAWINGS

The present invention will be understood and appreciated more fully from the following detailed description, taken in conjunction with the drawings in which:

FIGS. 1A and 1B are simplified general illustrations of a water dispenser constructed and operative in accordance with a preferred embodiment of the present invention in respective first and second operative orientations;

FIGS. 7A, 7B, 7C, 7D, 7E, 7F, 7G, 7H, 7I, 7J, 7K and 7L are together an electrical schematic illustration of a preferred embodiment of the electrical control circuitry of the water dispenser;

FIGS. 8A and 8B are, respectively, a sectional assembled view and a pictorial exploded view illustration of a water cooling and purification assembly forming part of the water dispenser of FIGS. 1A and 1B;

FIGS. 11A, 11B, 11C and 11D are simplified pictorial illustrations of a filter element constructed and operative in accordance with a preferred embodiment of the present invention;

FIGS. 12A and 12B are sectional assembled view illustrations taken along lines XIIA-XIIA and XIIB-XIIB respectively in FIG. 4;

FIGS. 13A, 13B and 13C are simplified pictorial illustrations of user-initiated installation of a filter element forming part of the water dispenser of FIGS. 1A and 1B in accordance with a preferred embodiment of the present invention;

FIGS. 14A, 14B and 14C illustrate user-initiated removal of a filter cartridge from a socket in the water dispenser of FIGS. 1A and 1B in accordance with a preferred embodiment of the present invention;

FIGS. 15A, 15B, 15C, 15D, 15E, 15F, 15G, 15H, 15I, 15J, 15K and 15L illustrate menu functionality of the water dispenser in accordance with a preferred embodiment of the present invention;

DETAILED DESCRIPTION OF PREFERRED EMBODIMENTS

Figure 1B:
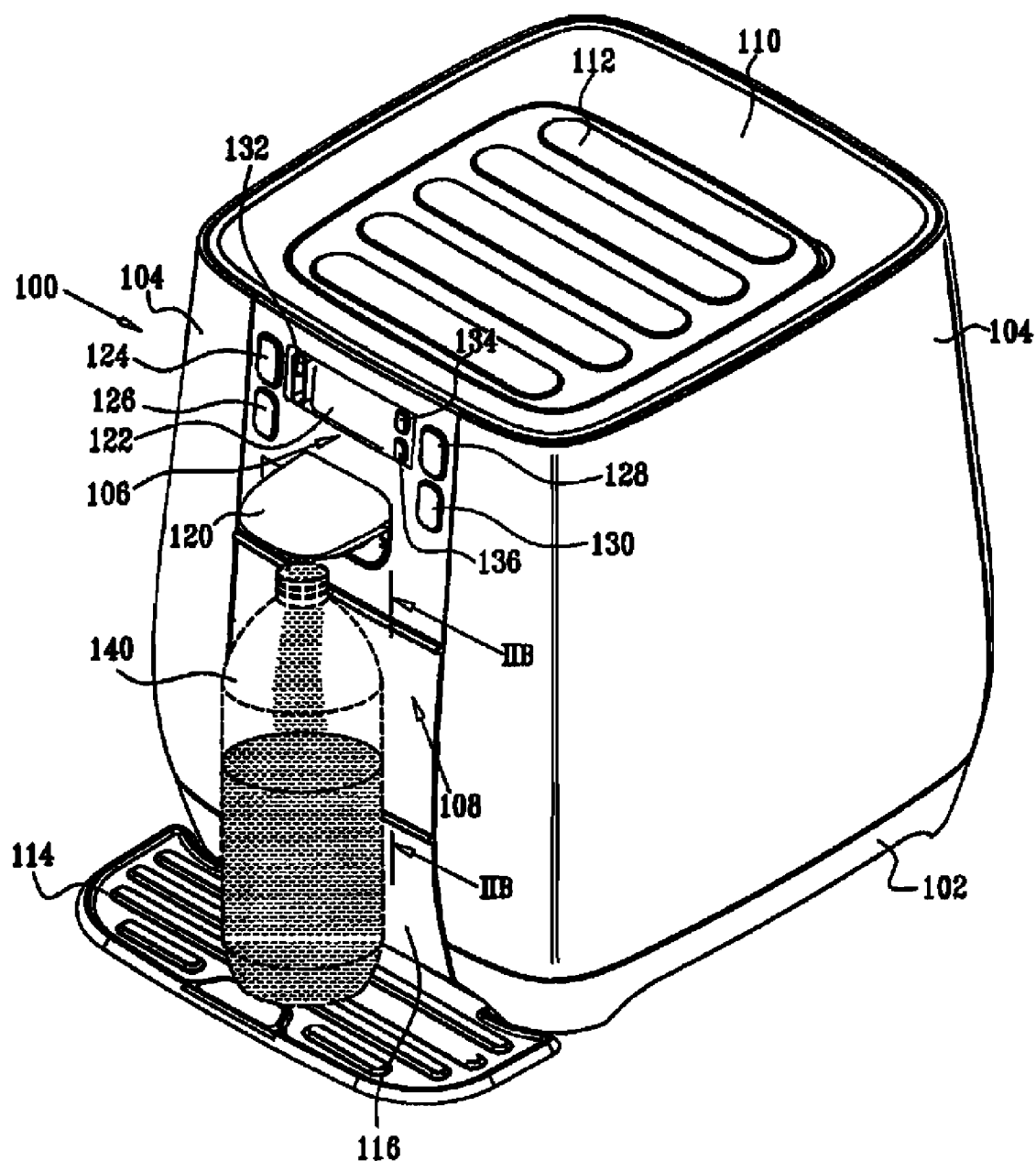
Figure 2A:
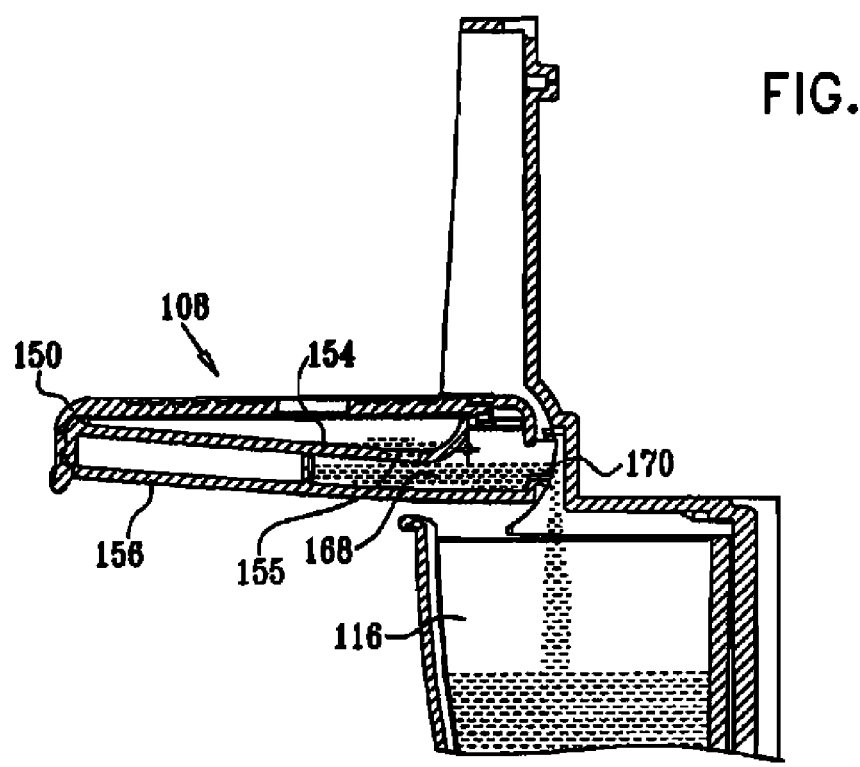
FIGS. 2A and 2B are sectional illustrations taken along lines IIA-IIA and IIB-IIB in FIGS. 1A and 1B respectively, showing drainage of water.
Figure 2B:
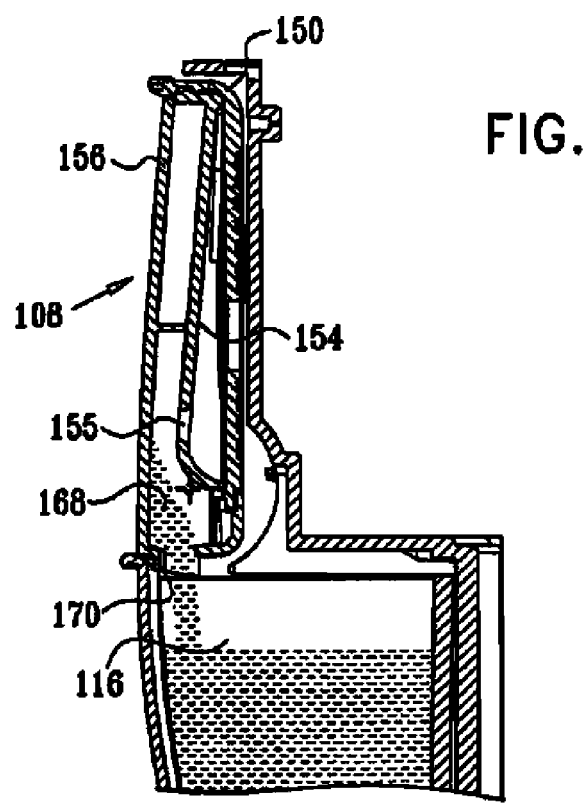
Figure 3:
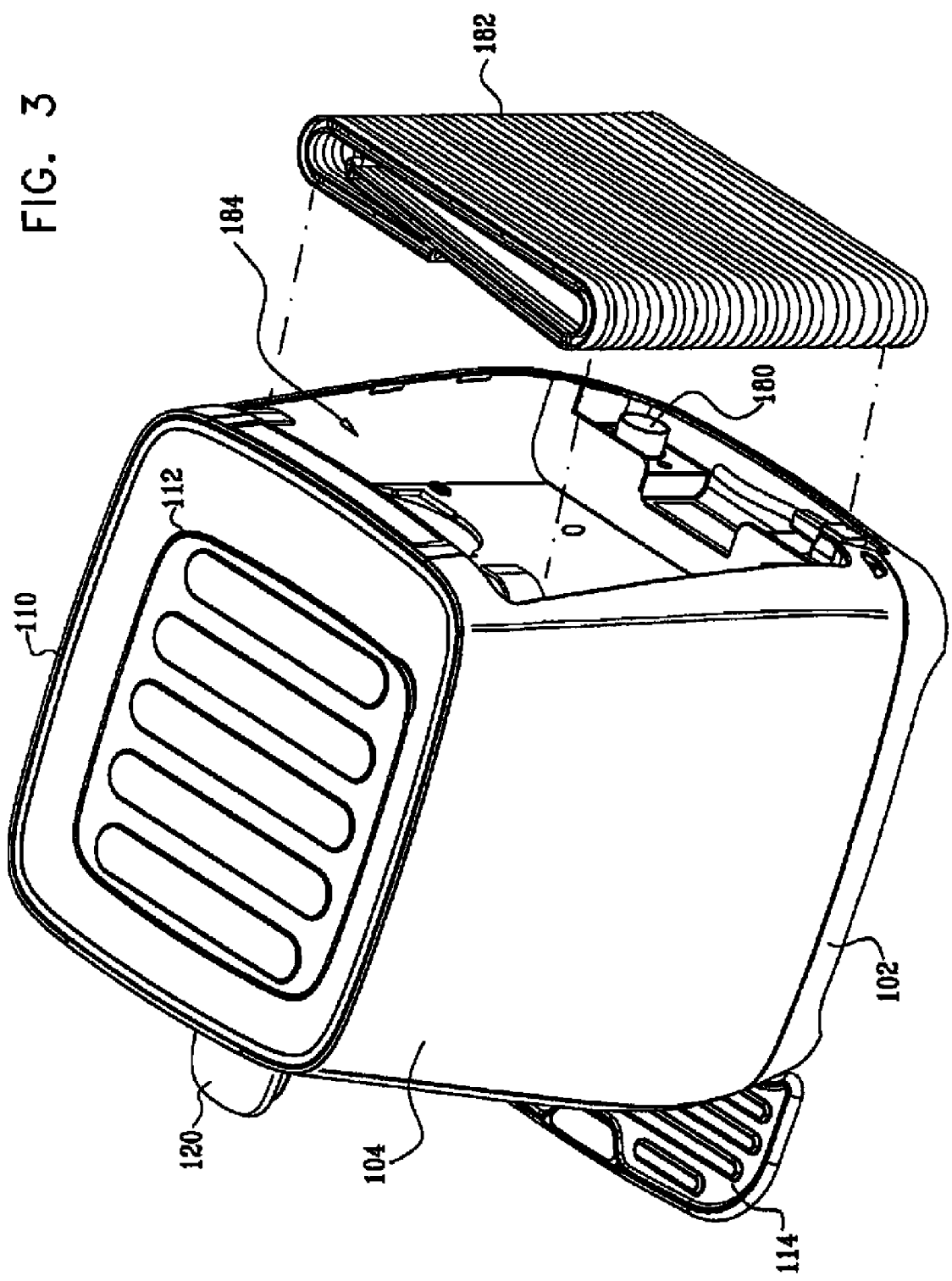
FIG. 3 is a simplified partially exploded view illustration of the water dispenser of FIGS. 1A & 1B showing the construction and location of a heat exchanger forming part thereof.

Reference is now made to FIGS. 1A and 1B, which are simplified general illustrations of a water dispenser constructed and operative in accordance with a preferred embodiment of the present invention in respective first and second operative orientations; to FIGS. 2A and 2B, which are sectional illustrations taken along lines II-II in FIGS. 1A and 1B, respectively, and to FIG. 3, which is a simplified partially exploded view illustration of the water dispenser of FIGS. 1A & 1B showing the construction and location of a heat exchanger forming part thereof.

As seen in FIGS. 1A and 1B, the water dispenser comprises a housing 100 including a base 102 which supports a chassis (not shown) and onto which are formed wrap-around side panels 104, a front control panel 106, a pivotably mounted drainage-equipped water container support 108 and a top cover element 110. A decorative panel 112 is preferably placed over part of top cover 110 and a forward tray 114 is preferably located just in front of base 102, underlying water container support 108. Pivotably mounted drainage-equipped water container support 108 is located below the front control panel 106. A water spill collector 116 is located below the pivotably mounted drainage-equipped water container support 108 and cooperates therewith, as will be described hereinbelow with reference to FIGS. 2A and 2B.

Front control panel 106 preferably includes a water outlet 120, a display 122, such as an LCD display, a hot water selection button 124, a warm water selection button 126, a cold water selection button 128 and a cool water selection button 130. There are preferably also provided additional buttons including an extra-hot water selection button 132, and first and second menu selection buttons 134 and 136.

FIG. 1A illustrates the pivotably mounted drainage-equipped water container support 108 in an open, operative orientation, supporting a glass 138, while FIG. 1B, shows the pivotably mounted drainage-equipped water container support 108 in a closed orientation, allowing a relatively large container, such as a one-liter bottle 140, to be supported on forward tray 114 underlying water outlet 120 for being filled therefrom, as shown.

The pivotably mounted drainage-equipped water container support 108 comprises a perforated grid element 150, which is seated in a recess 152 formed in a tray element 154, having a drain aperture 155. Tray element 154 is, in turn, is attached, preferably by snap-fit engagement to a pivotable tray element support 156 which is pivotably supported onto the chassis by means of a pair of pivot axle assemblies 158, each of which is preferably spring loaded by a coil spring 160. Pivot axle assemblies 158 each include a non-rotating axle portion 162, which is arranged for non-rotational engagement with a corresponding socket in the chassis, and a cooperating tray element support engagement element 164. Elements 162 and 164 have respective cooperating toothed surfaces 166 and 167, which enable mutual seating engagement thereof at relative rotational orientations separated by 90 degrees, corresponding to open and closed water container support positions, shown respectively in FIGS. 1A and 1B, thus retaining the pivotably mounted drainage-equipped water container support 108 in its closed orientation (FIG. 1B) unless the user moves it to its open orientation (FIG. 1A).

Reference is now made to FIGS. 2A and 2B, which illustrate the drainage functionality of the pivotably mounted drainage-equipped water container support 108. Turning to FIG. 2A, it is seen that water impinging from above onto pivotably mounted drainage-equipped water container support 108, passes through perforated grid element 150, and may temporarily collect on tray element 154. The water preferably drains from tray element 154 via aperture 155 into a drainage collection and flow region 168 of pivotable tray element support 156. It is noted that the drainage collection and flow region 168 of tray element support 156 is downwardly inclined towards a weir 170, which defines a barrier which collects water in region 168 but permits excess water to pour from region 168 into water spill collector 116. Alternatively, weir 170 may be obviated and substantially all water draining into region 168 may flow directly into water spill collector 116, even when the pivotably mounted drainage-equipped water container support 108 is in the open operative position.

Reference is now made to FIG. 2B, which shows the pivotably mounted drainage-equipped water container support 108 in a closed position. It is seen that in this position, any remaining water in region 168 drains into water spill collector 116. It is a particular feature of the present invention that drainage from pivotably mounted drainage-equipped water container support 108 is provided both in open and closed orientations of pivotably mounted drainage-equipped water container support 108.

Turning now to FIG. 3, which shows the rear of the water dispenser, there is seen a water inlet 180 which is adapted to be connected to a conventional domestic source of pressurized water. Also shown is a heat exchanger 182, which is preferably mounted into a recess 184 defined at the rear of the water dispenser. It is a particular feature of the present invention that the heat exchanger 182 is in a partially overlapping folded orientation, which provides high heat exchange efficiency in a compact configuration.

Figure 4:
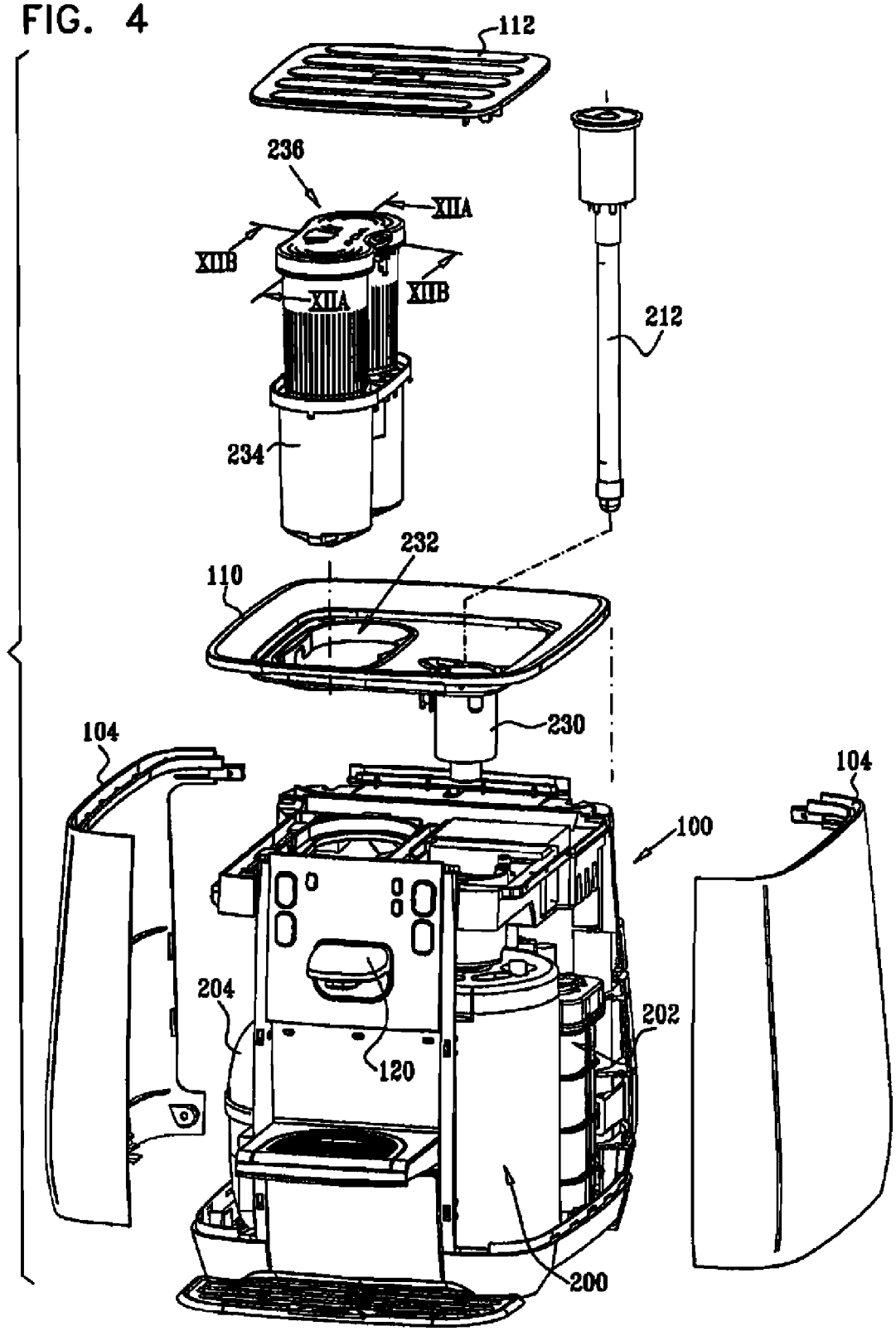
FIG. 4 is a simplified partially exploded view illustration of the water dispenser of FIGS. 1A & 1B showing principal components thereof.

Reference is now made to FIG. 4, which is a simplified partially exploded view illustration of the water dispenser of FIGS. 1A & 1B showing principal components thereof. As seen in FIG. 4, disposed within the housing 100 is a water cooling and purification subassembly 200, a water heating subassembly 202 and a compressor 204, which cooperates with the water cooling subassembly 200 and the heat exchanger 182 (FIG. 3).

Preferably the water cooling subassembly 200 is formed with a central channel, preferably formed of quartz glass, which accommodates a UV lamp assembly 212, for purifying water in the water cooling subassembly 200 by UV radiation.

Preferably top cover element 110 is formed as a unitary element, typically by injection molding, and defines a UV lamp assembly socket housing portion 230 and a filter element aperture 232, which cooperates with a separate filter element housing socket 234 which accommodates a filter cartridge 236.

Figure 5:
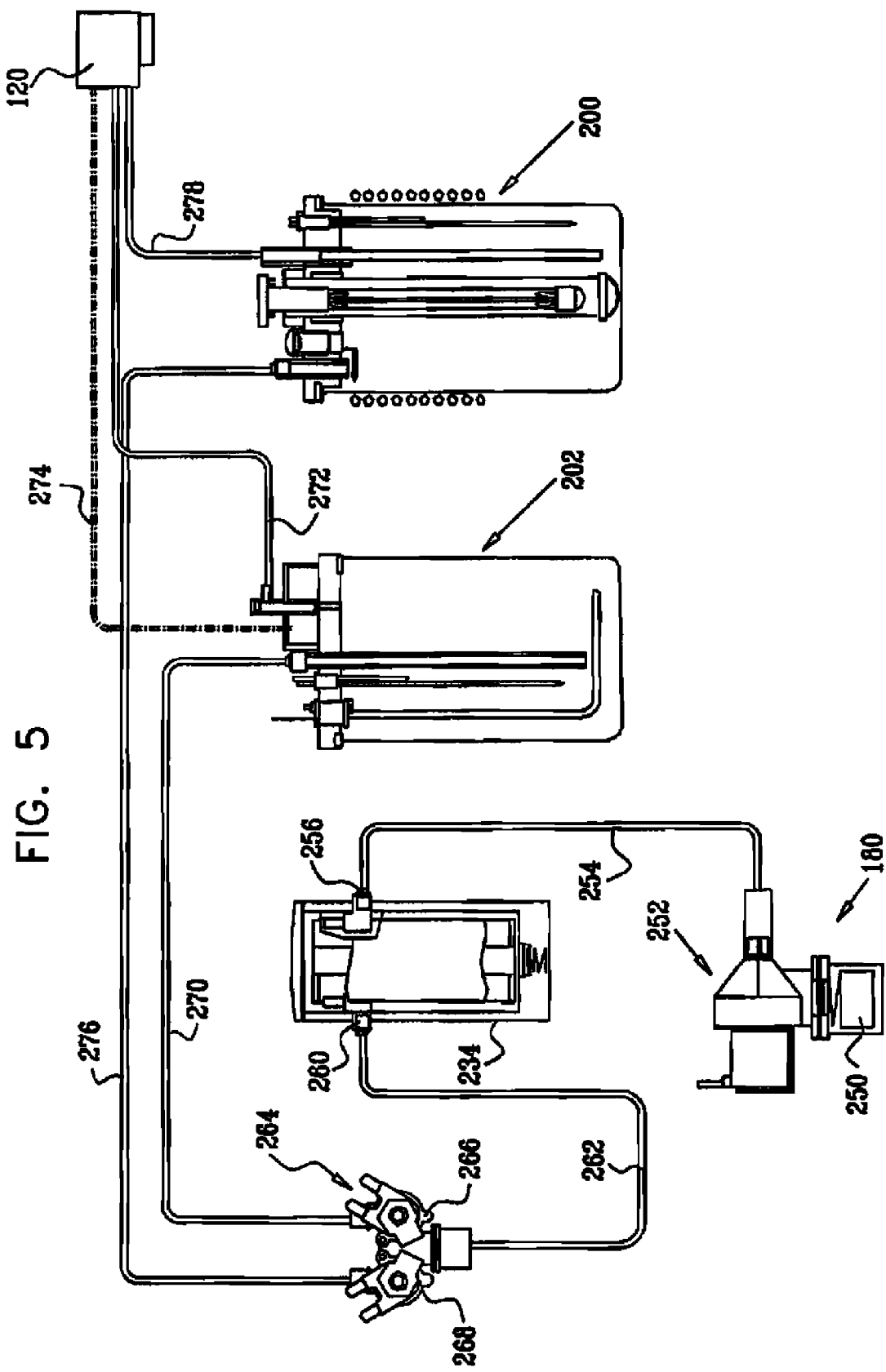
FIG. 5 is a simplified illustration of hydraulic interconnections between components of the water dispenser of FIG. 4.

Reference is now made to FIG. 5, which is a simplified illustration of hydraulic interconnections between components of the water dispenser of FIG. 4. As seen in FIG. 5, water inlet 180 is preferably externally threaded and includes an internally disposed check valve 250. Coupled to the water inlet 180 via a solenoid valve 252 is an inlet water conduit 254 which is connected to a water inlet 256 of filter element housing socket 234. Water supplied to water inlet 256 of filter element housing socket 234 passes through a shut-off valve (not shown) formed in filter element housing socket 234 to a water inlet of filter cartridge 236 for filtering thereby. Filtered water from a water outlet of filter cartridge 236 is supplied via a water outlet 260 of filter element housing socket 234 and a shut-off valve (not shown) formed in filter element housing socket 234 and via a filtered water conduit 262 to a filtered water distributor 264, preferably including two solenoid valves 266 and 268.

Solenoid valve 266 is coupled to a water heater supply conduit 270 which supplies filtered water to water heating subassembly 202. Heated water from water heating subassembly 202 is supplied to water outlet 120 via a heated water conduit 272. Steam from water heating subassembly 202 may be vented to water outlet 120 via a steam conduit 274.

Solenoid valve 268 is coupled to a water cooling supply conduit 276 which supplies filtered water to water cooling subassembly 200. Cooled water from water cooling subassembly 200 is supplied to water outlet 120 via a cooled water conduit 278.

Figure 6:
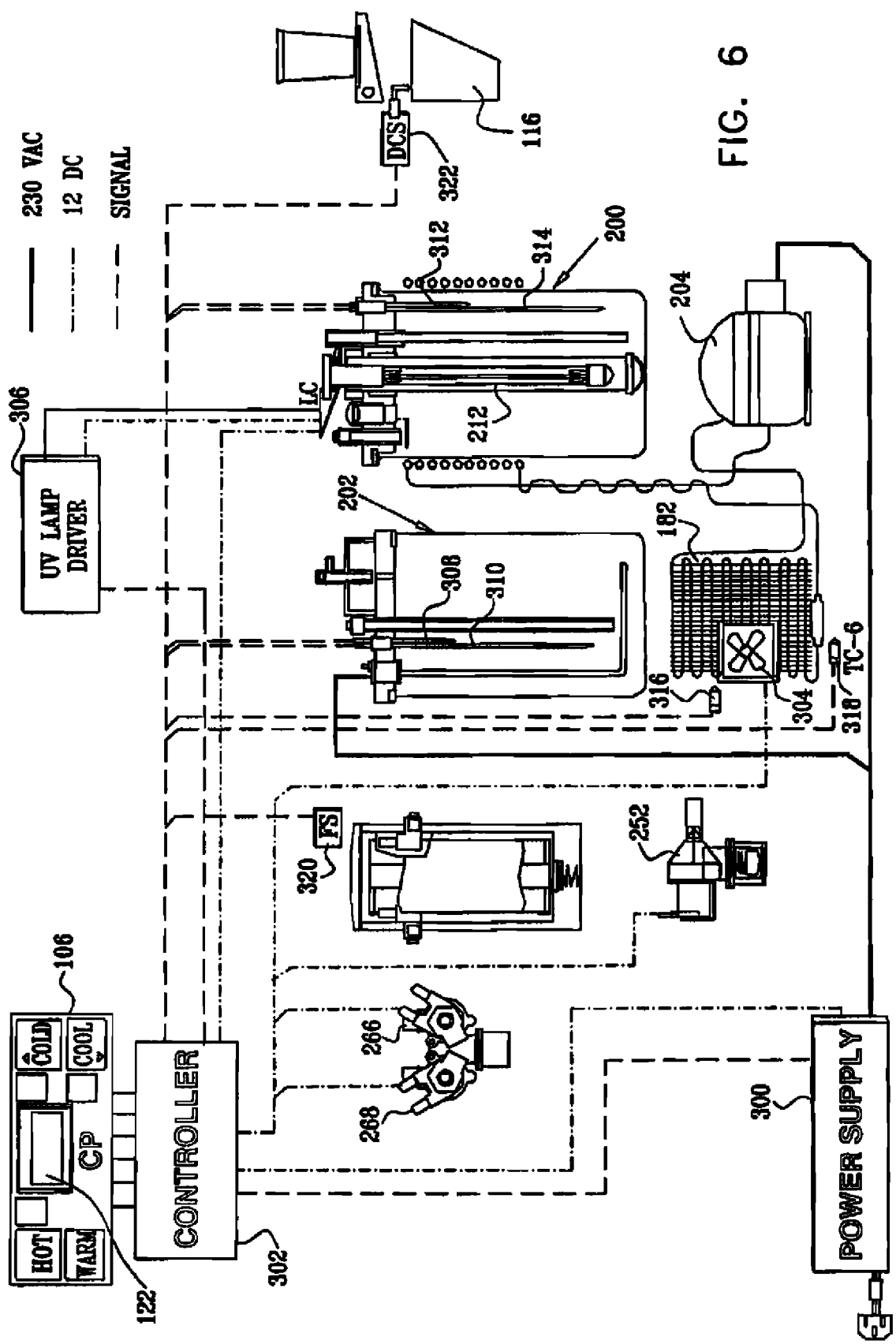
FIG. 6 is a simplified illustration of electrical power and control interconnections between components of the water dispenser of FIGS. 4 and 5.
Figure 7A:
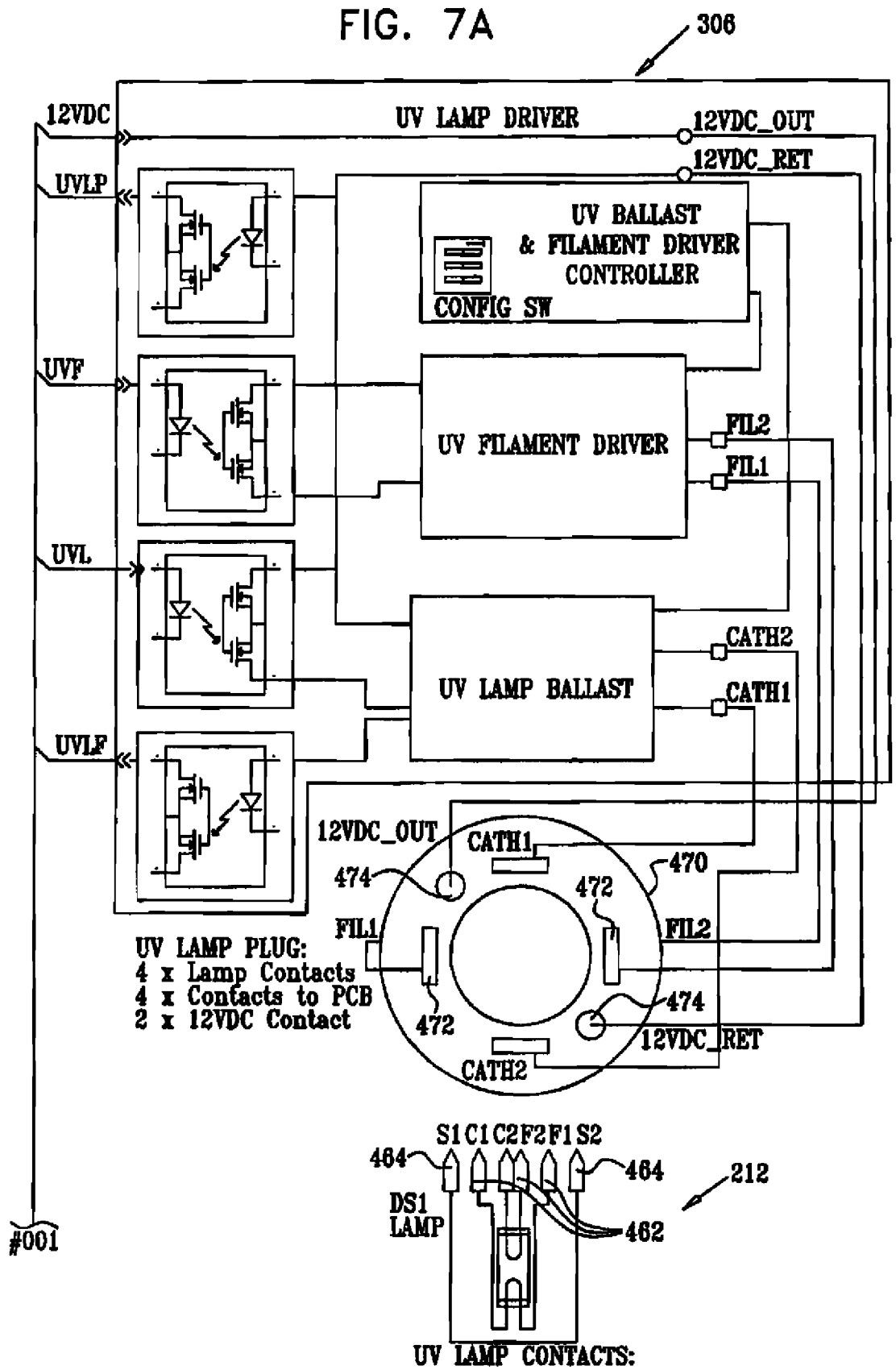
Figure 7B:
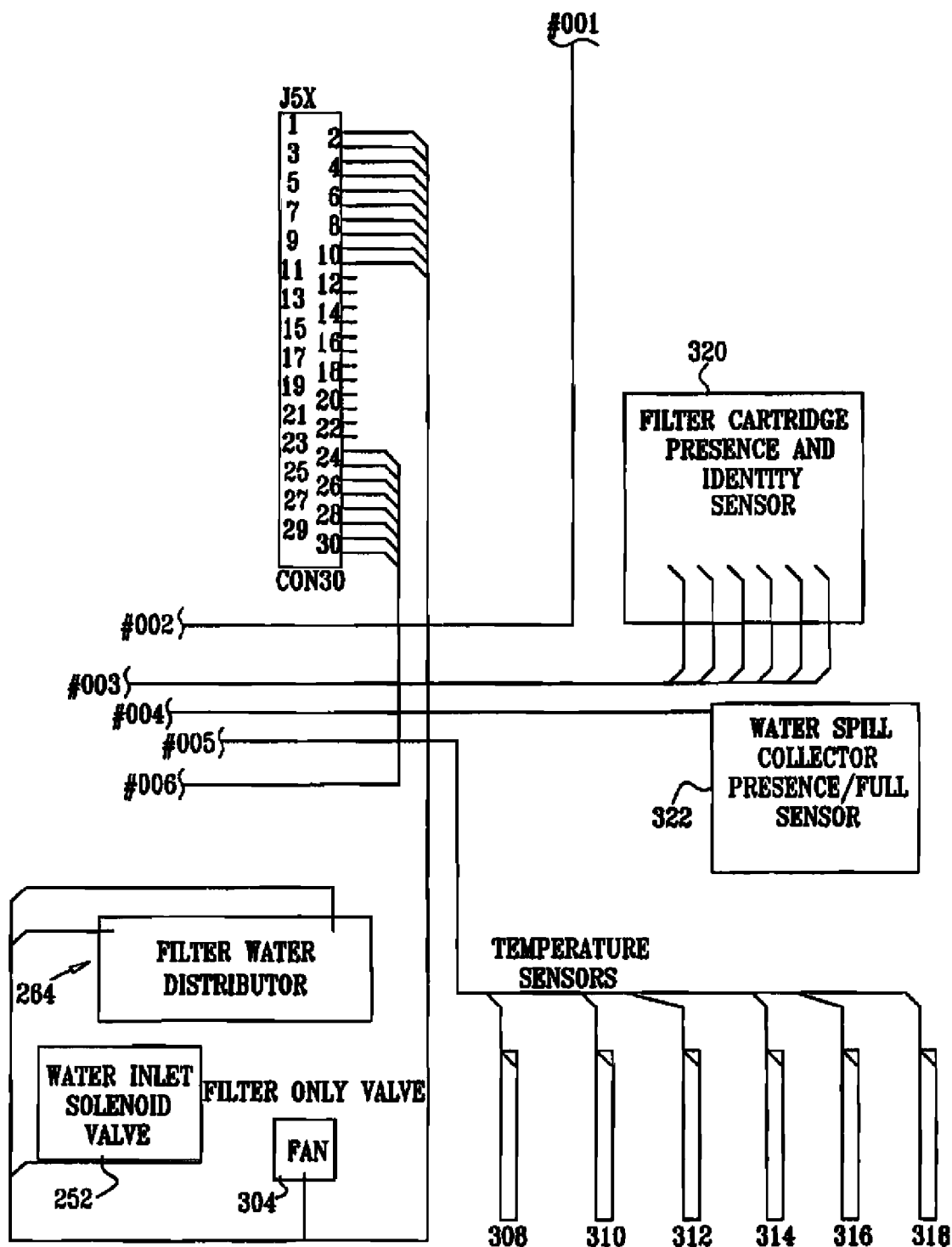
Figure 7C:
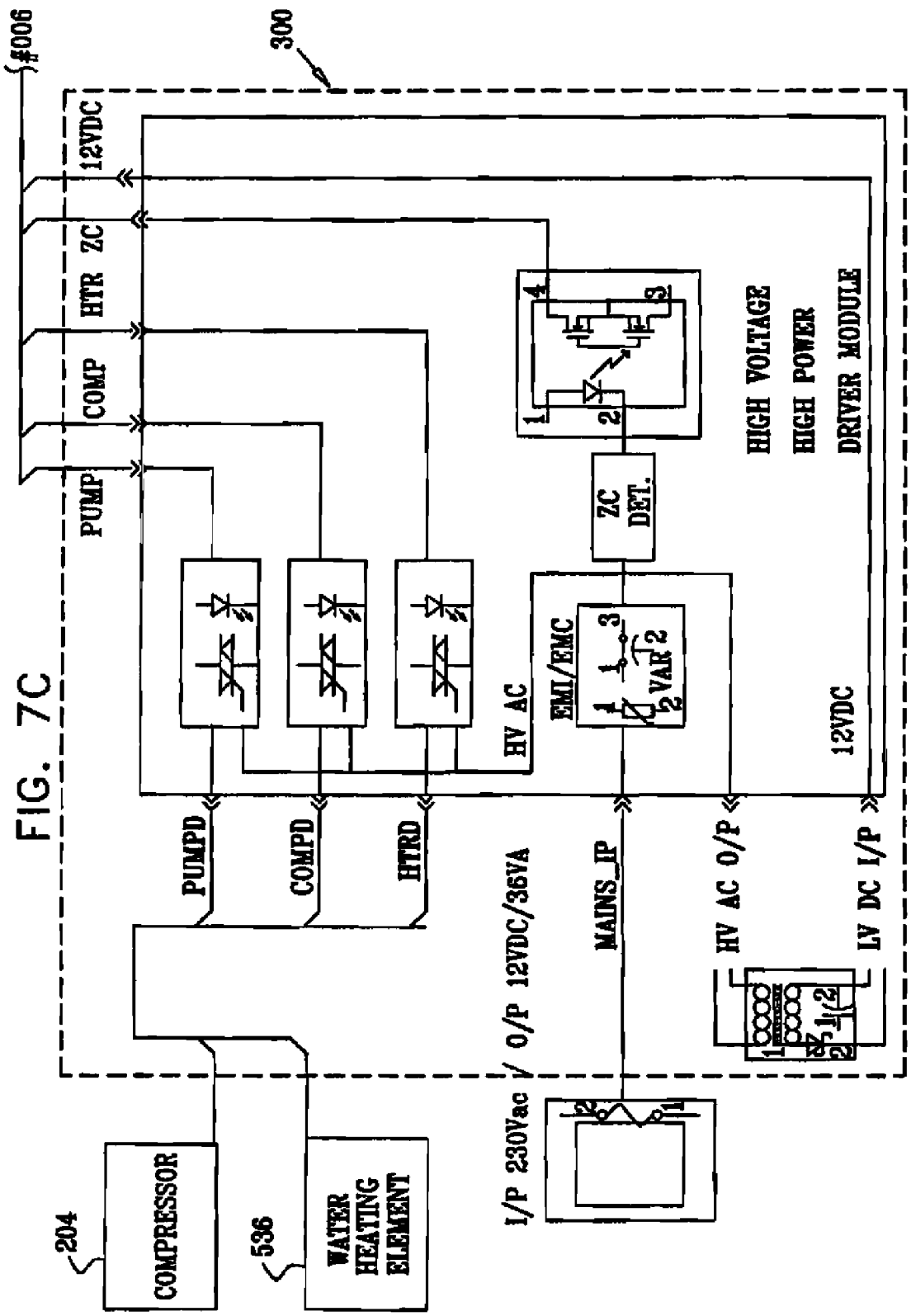
Figure 7D:
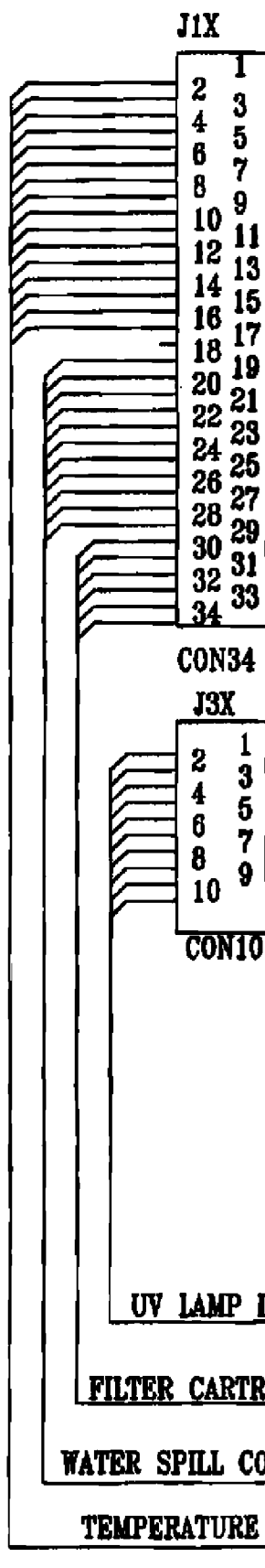
Figure 7E:
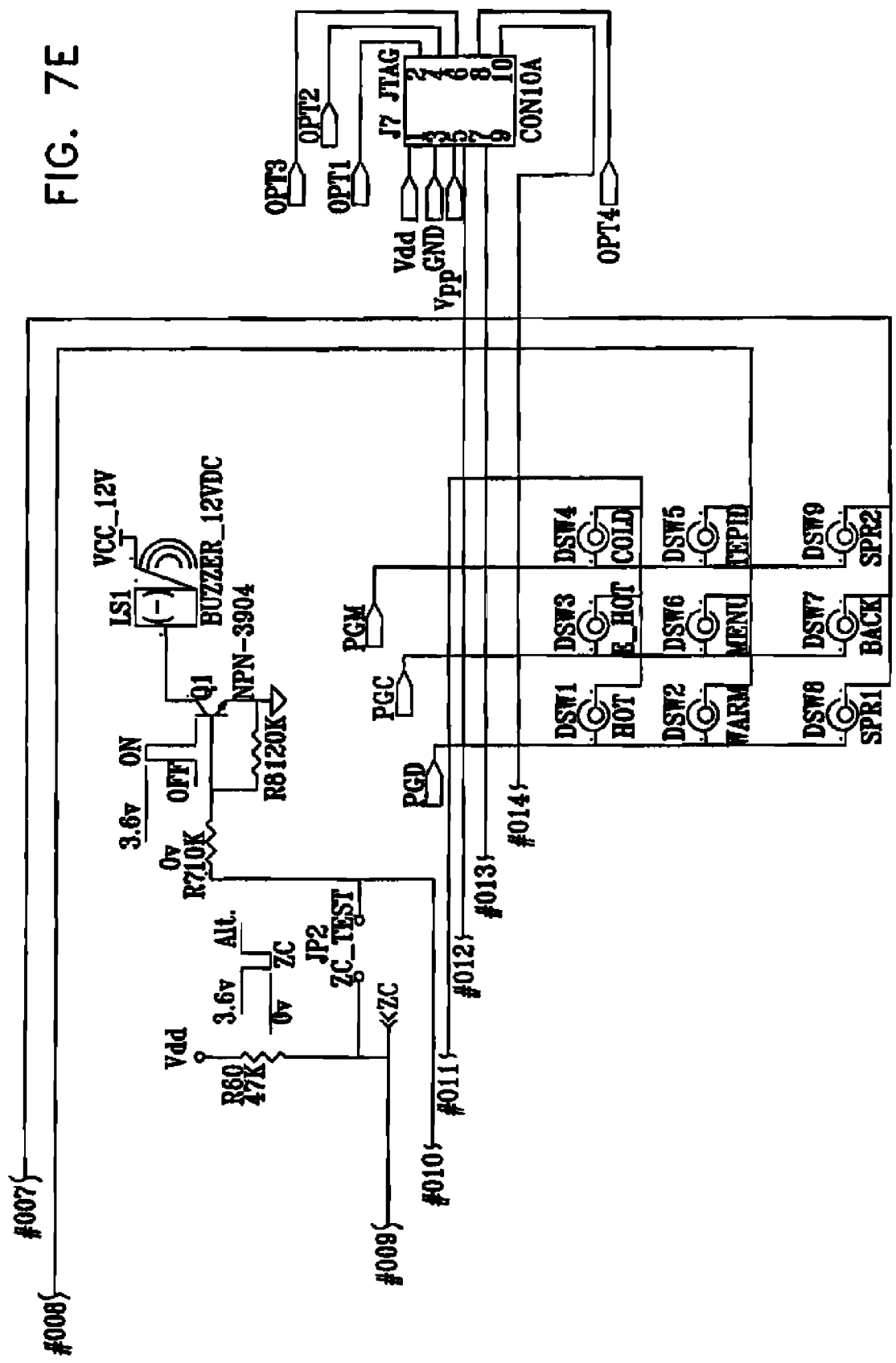
Figure 7F:
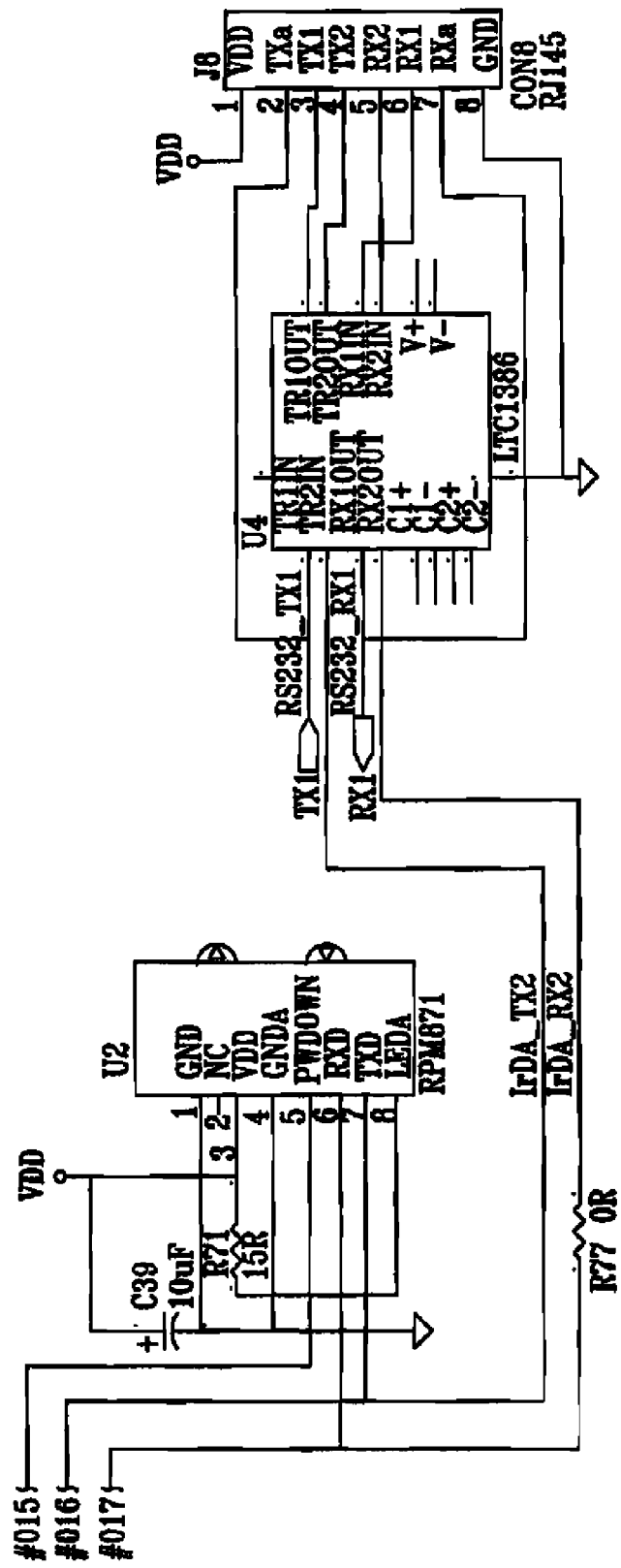
Figure 7G:
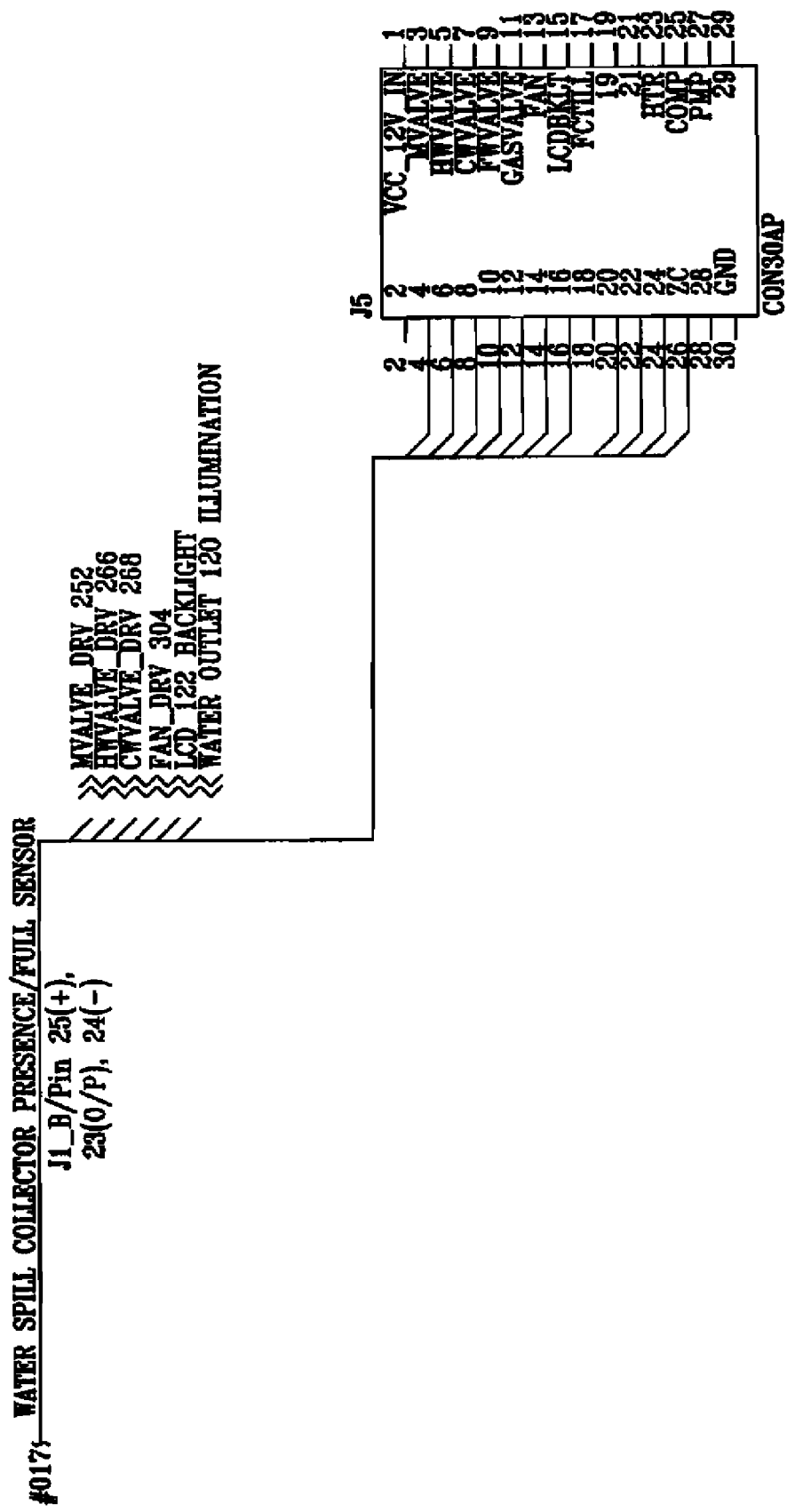
Figure 7H:
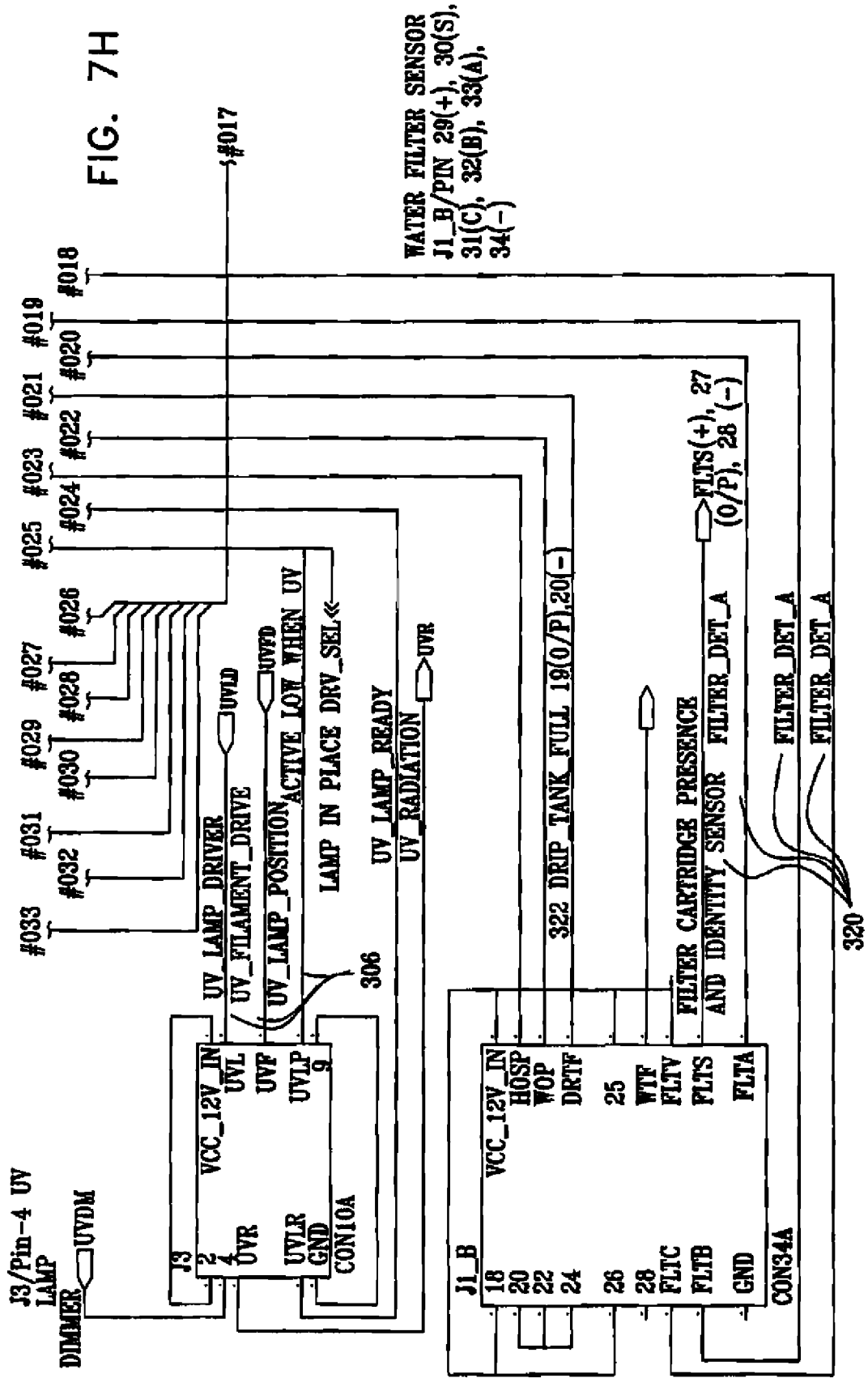
Figure 71:
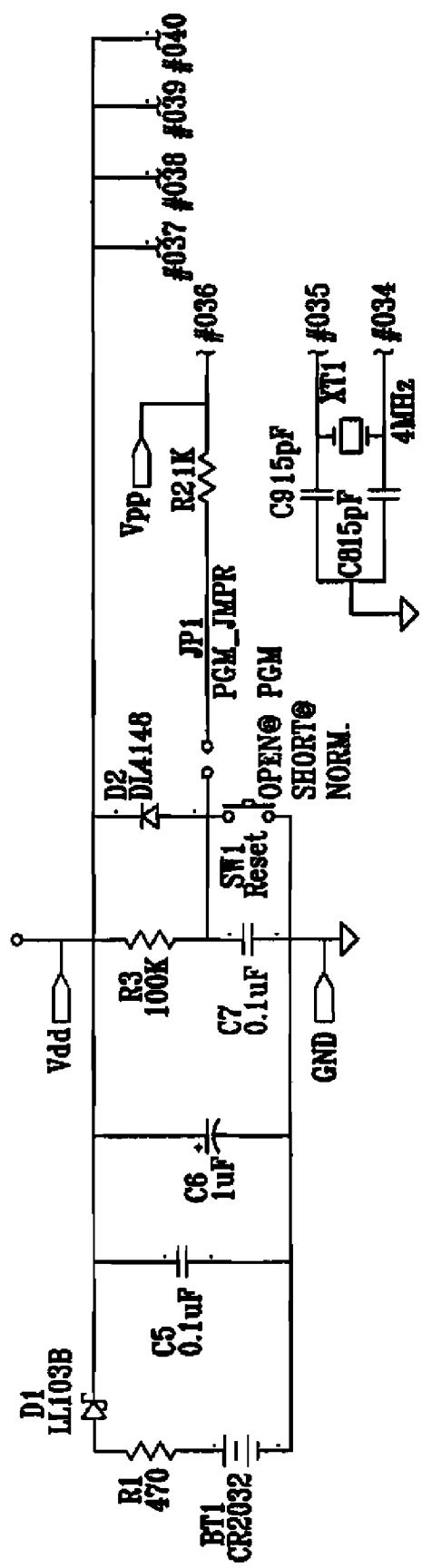
Figure 7J:
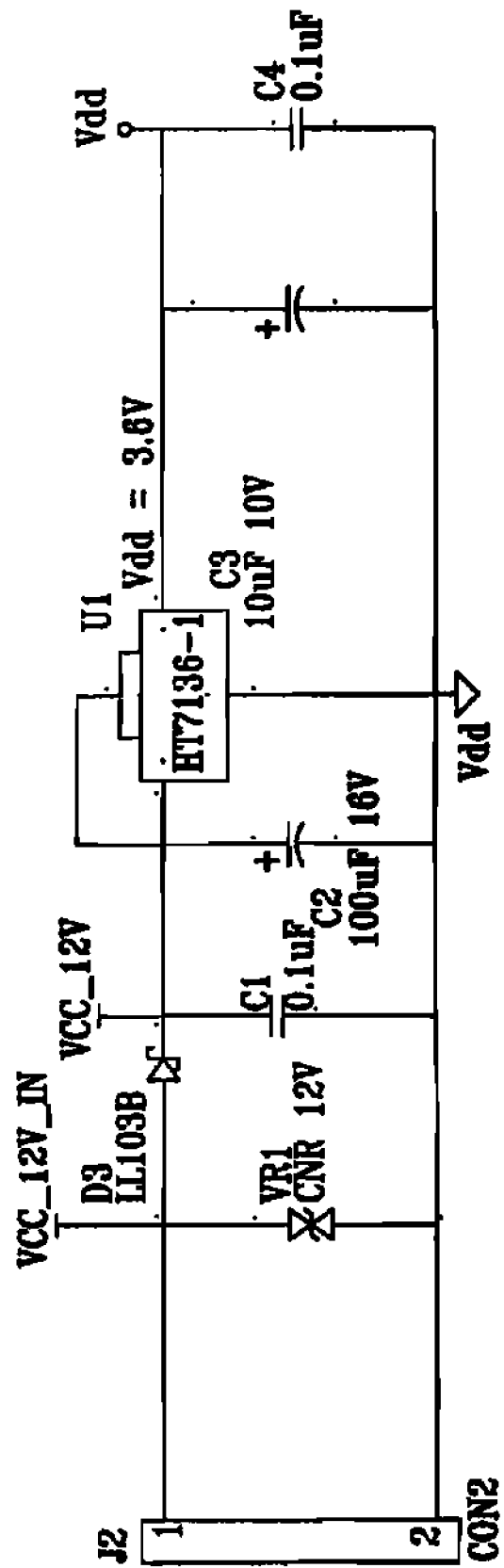
Figure 7K:
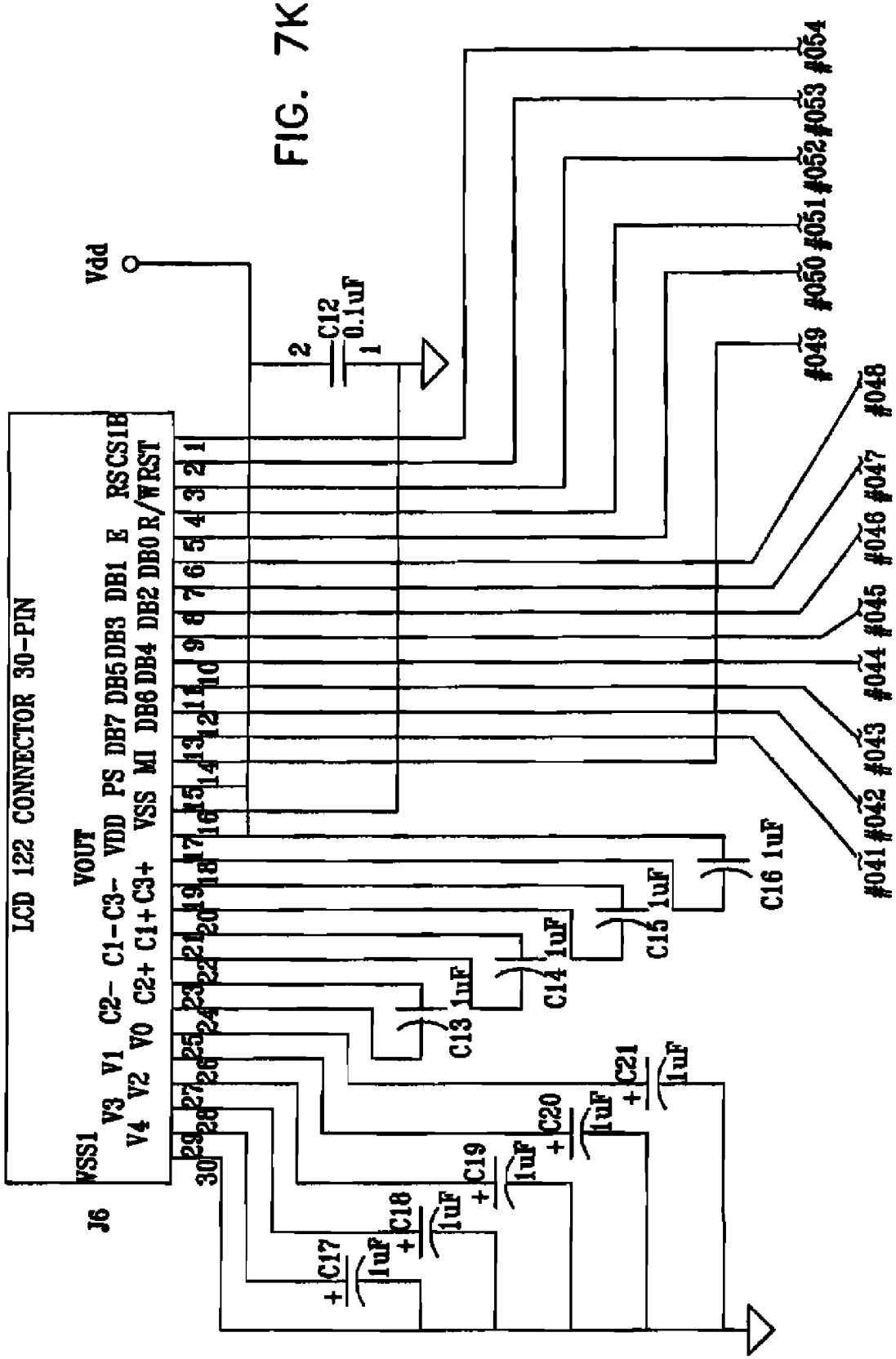
Figure 7L:
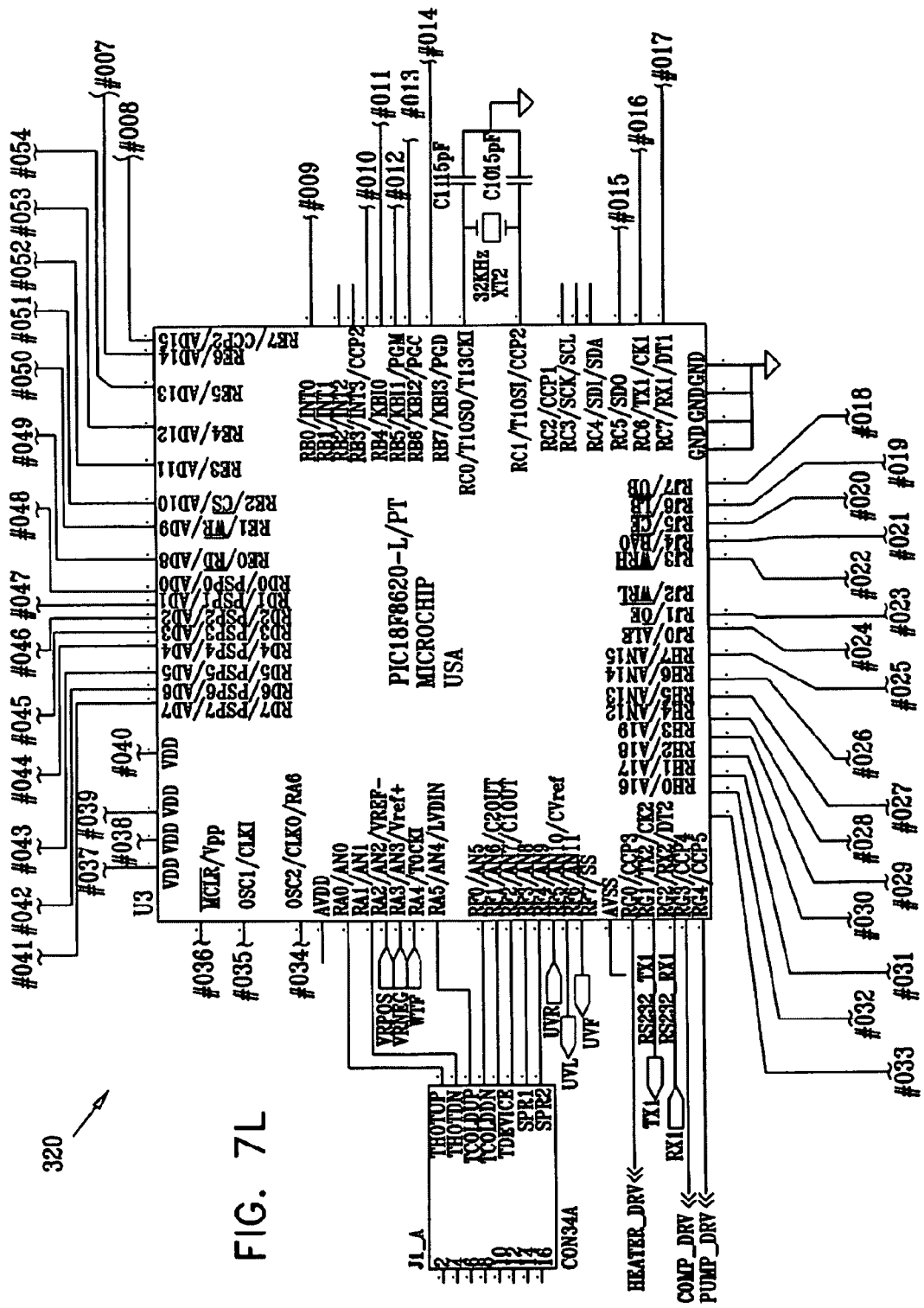

Reference is now made to FIG. 6, which is a simplified illustration of electrical power and control interconnections between components of the water dispenser of FIGS. 4 and 5. Mains electrical power is supplied to a power supply assembly 300 which supplies high voltage electrical power to water heating subassembly 202 and to compressor 204 and provides low voltage electrical power to a controller 302.

Controller 302 is responsive to user commands supplied via control panel 106 to provide suitable low voltage electrical power to water distributor solenoid valves 266 and 268 and to water inlet solenoid valve 252. Low voltage electrical power is also supplied to a fan 304, which cooperates with heat exchanger 182, and to a UV lamp driver 306, which supplies electrical power to UV lamp assembly 212.

Controller 302 also receives input control signals from upper and lower water heating subassembly temperature sensors 308 and 310, upper and lower water cooling subassembly temperature sensors 312 and 314, inner housing temperature sensor 316 and heat exchanger temperature sensor 318. Controller 302 preferably also receives a control input from a filter cartridge presence and identity sensor 320 and a water spill collector presence/full sensor 322, associated with water spill collector 116, and UV lamp driver 306, indicating whether a UV lamp is connected and operating properly.

Controller 302 also provides control signals to power supply 300 and to UV lamp driver 306, as well as to display 122.

Reference is now made to 7A, 7B, 7C, 7D, 7E, 7F, 7G, 7H, 7I, 7J, 7K and 7L, which together are an electrical schematic illustration of a preferred embodiment of the electrical control circuitry of the water dispenser. The electrical schematic illustration includes annotations indicating the reference numerals used elsewhere in the description and the drawings for elements appearing both in the schematic and elsewhere in the description and the drawings. Inasmuch as the electrical schematic is self-explanatory to a person of ordinary skill in the art, for the sake of conciseness, a verbal description of the schematic is not provided. The functionality of the electrical circuitry is described hereinbelow with reference to flow charts FIGS. 15A-15L.

Figure 8A:
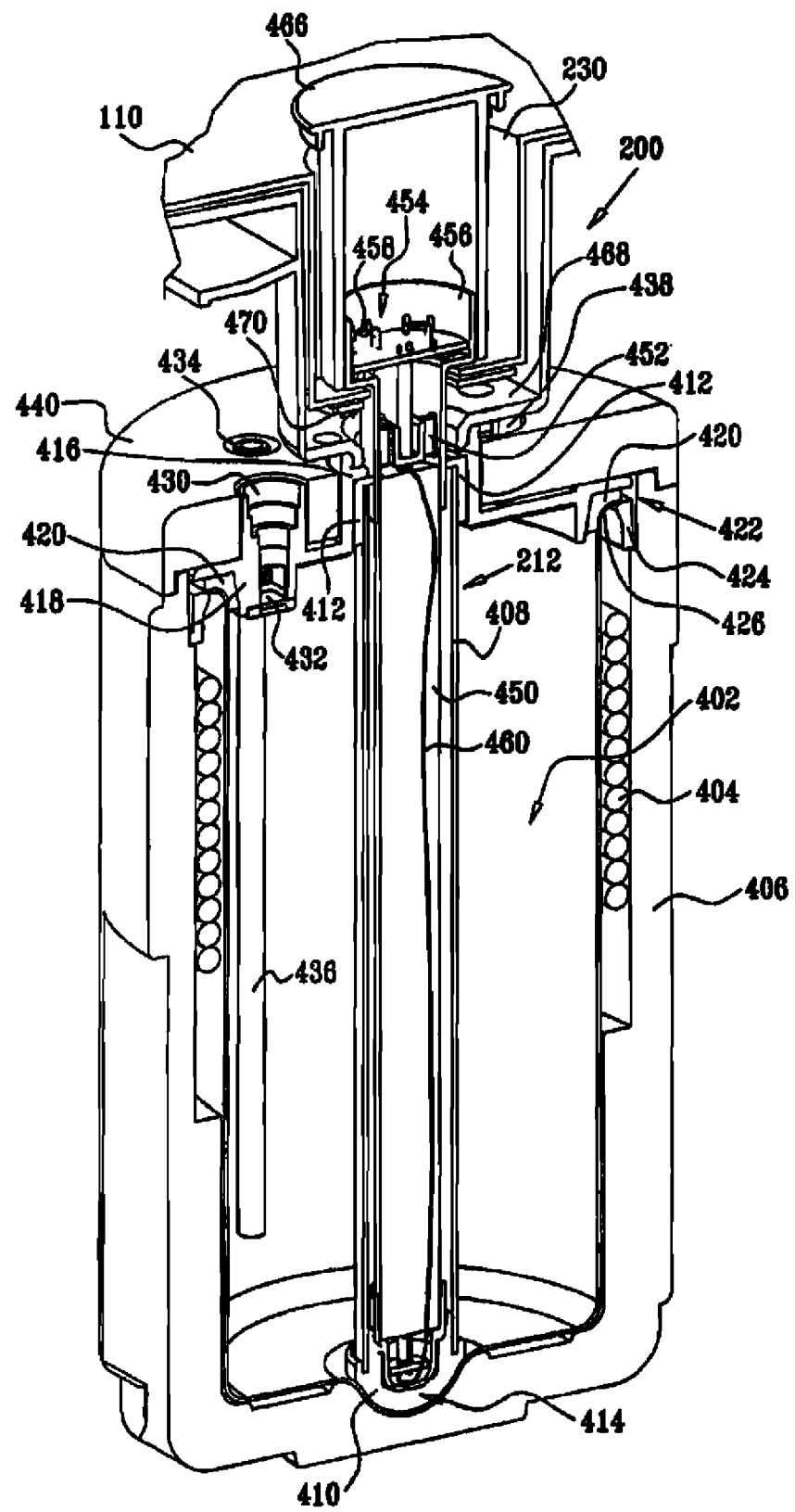

Reference is now made to FIGS. 8A and 8B, which are, respectively, a sectional assembled view and a partially cutaway pictorial partially exploded view illustration of a water cooling and purification subassembly forming part of the water dispenser of FIGS. 1A and 1B. As seen in FIGS. 8A and 8B, the water cooling and purification subassembly 200 comprises a generally cylindrical inner container 402, typically formed of stainless steel. At least part of the circumference of inner container 402 is surrounded in heat-exchange relationship by a cooling coil 404, which is, in turn coupled to compressor 204 (FIGS. 4 & 6) and heat exchanger 182 (FIGS. 3 & 6). The inner container 402 and the cooling coil 404 are, in turn, surrounded by a temperature insulative jacket 406, typically formed of polystyrene.

Disposed in liquid sealing engagement inside inner container 402 is a central channel 408, typically formed of a tube of quartz glass, mounted on respective bottom and top mounting sockets 410 and 412, respectively. Bottom mounting socket 410 preferably is seated in a recess 414 formed at the bottom center of inner container 402. Top mounting socket 412 preferably comprises an elastomeric sealing gasket which is, in turn, seated in a central aperture 416 of a container top sealing assembly 418.

Container top sealing assembly 418 preferably includes an elastomeric seal 420 which sealingly engages a top surface of inner container 402. Elastomeric seal 420 is seated in a circumferential recess 422 formed interiorly of a flange 424 having portions which are in snap-fit engagement with a outwardly directed rim 426 at the top surface of inner container 402.

Container top sealing assembly 418 defines a water inlet 430 which includes a water flow distributor 432 and a water outlet 434 which communicates with a water outlet pipe 436, which extends to a location near the bottom of the interior of inner container 402. Water outlet pipe 436 is preferably formed of quartz glass, thereto to provide UV disinfection of water passing therethrough. Container top sealing assembly 418 also includes an air release mechanism 438, which communicates with the interior of inner container 402. Additionally, top sealing assembly 418 defines sealed attachment locations (not shown) for sensors 312 and 314 (FIG. 6). The top sealing assembly 418 is, in turn, surrounded by a temperature insulative top jacket 440, typically formed of polystyrene.

FIGS. 8A and 8B also illustrate the operative engagement of the UV lamp assembly 212 with the water cooling and purification subassembly 200. The UV lamp assembly 212 comprises a conventional UV lamp 450, preferably a Philips G11T5, which is mounted at a first end thereof into a two-pin socket 452, forming part of a UV lamp connector 454. UV lamp connector 454 includes a PCB housing 456 within which is mounted a printed circuit board 458, to which the two-pin socket 452 is electrically connected.

The additional pins at the opposite end of UV lamp 450 are preferably connected by wires 460 to printed circuit board 458. The printed circuit board 458 includes conductors (not shown) which electrically connect each of the four pins of the UV lamp to corresponding long male contacts 462. An additional two short male contacts 464 are interconnected by conductors on printed circuit board 458 to define a jumper.

A housing cover 466 sealingly engages PCB housing 456 and is arranged to slidably and removably engage UV lamp assembly socket housing portion 230 of top cover element 110. The UV lamp assembly socket housing portion 230 is, in turn, seated within a recess 468 formed in the chassis. As seen in FIGS. 8A and 8B, disposed in recess 468, underlying UV lamp assembly socket housing portion 230, is a UV lamp socket printed circuit board 470, which includes a plurality of female sockets 472 and 474 for receiving the long male contacts 462 and short male contacts 464 respectively. Printed circuit board 470 is electrically connected to UV lamp driver 306 (FIG. 6). The long male contacts 462 are connected to a ballast in the UV lamp driver 306, while the short male contacts are connected in series with a low voltage power supply to the ballast, such that when the short male contacts 464 are not in electrical engagement with their respective female sockets 474, electrical power is not supplied to the ballast. This is a particular feature of the present invention.

Steps of engagement of the male contacts of the UV lamp assembly 212 with corresponding female contacts of printed circuit board 470 may be appreciated from a consideration of three enlargements appearing in FIG. 8B. Enlargement A shows the arrangement prior to engagement of any of the male contacts with the corresponding female contacts. Enlargement B shows contact of the long male contacts 462 with corresponding female contacts 472, thus establishing electrical contact between the ballast in the UV lamp driver 306 and the pins of the UV lamp 450, prior to electrical power being supplied to the ballast. Enlargement C shows contact of both long and short male contacts 462 and 464 with corresponding female contacts 472 and 474, thus supplying electrical power to the ballast in the UV lamp driver 306 following establishment of electrical contact with the pins of the UV lamp 450.

Figure 9A:
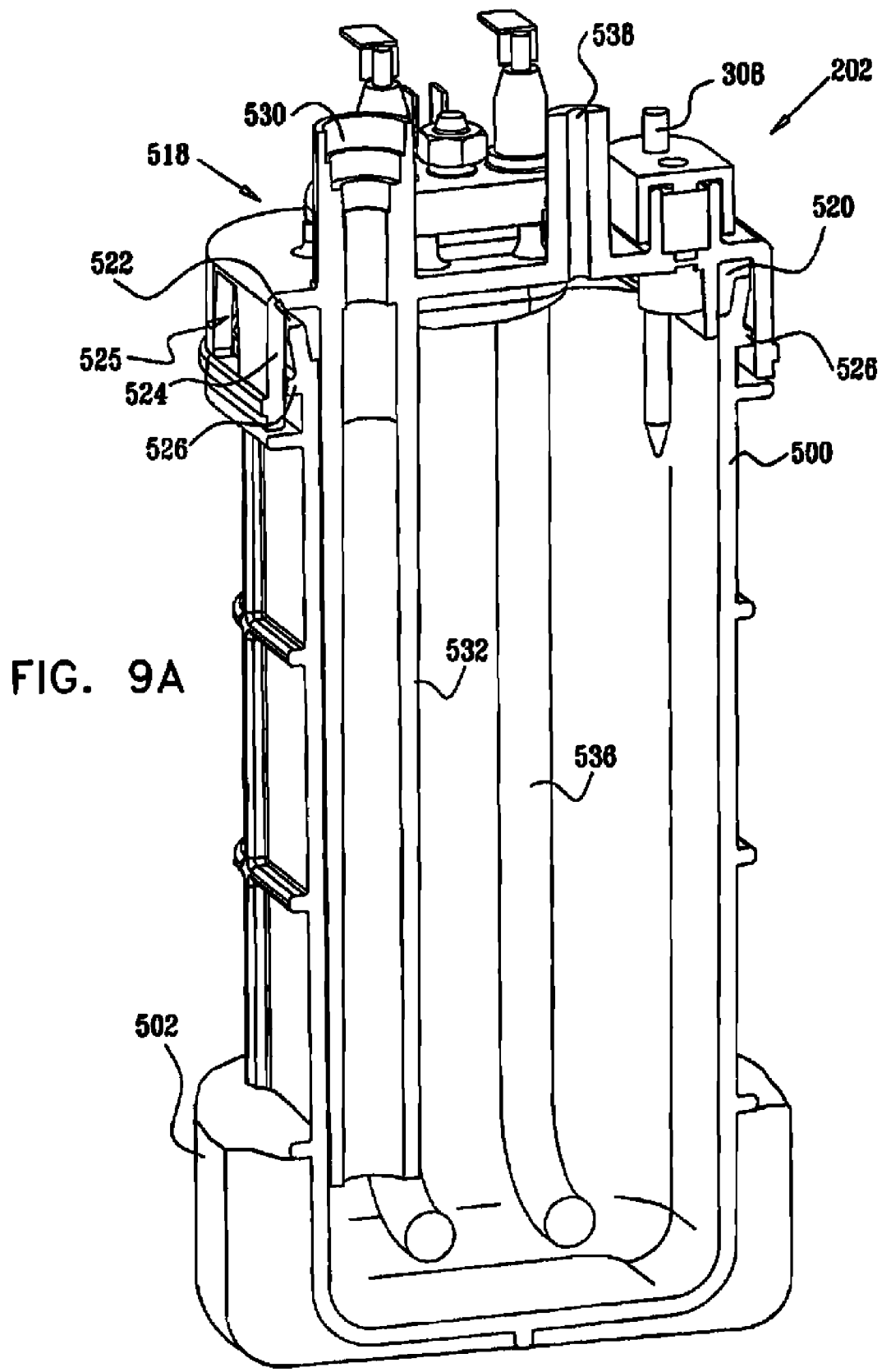
FIGS. 9A and 9B are, respectively, a sectional assembled view and a pictorial exploded view illustration of a water heating assembly forming part of the water dispenser of FIGS. 1A and 1B.
Figure 9B:
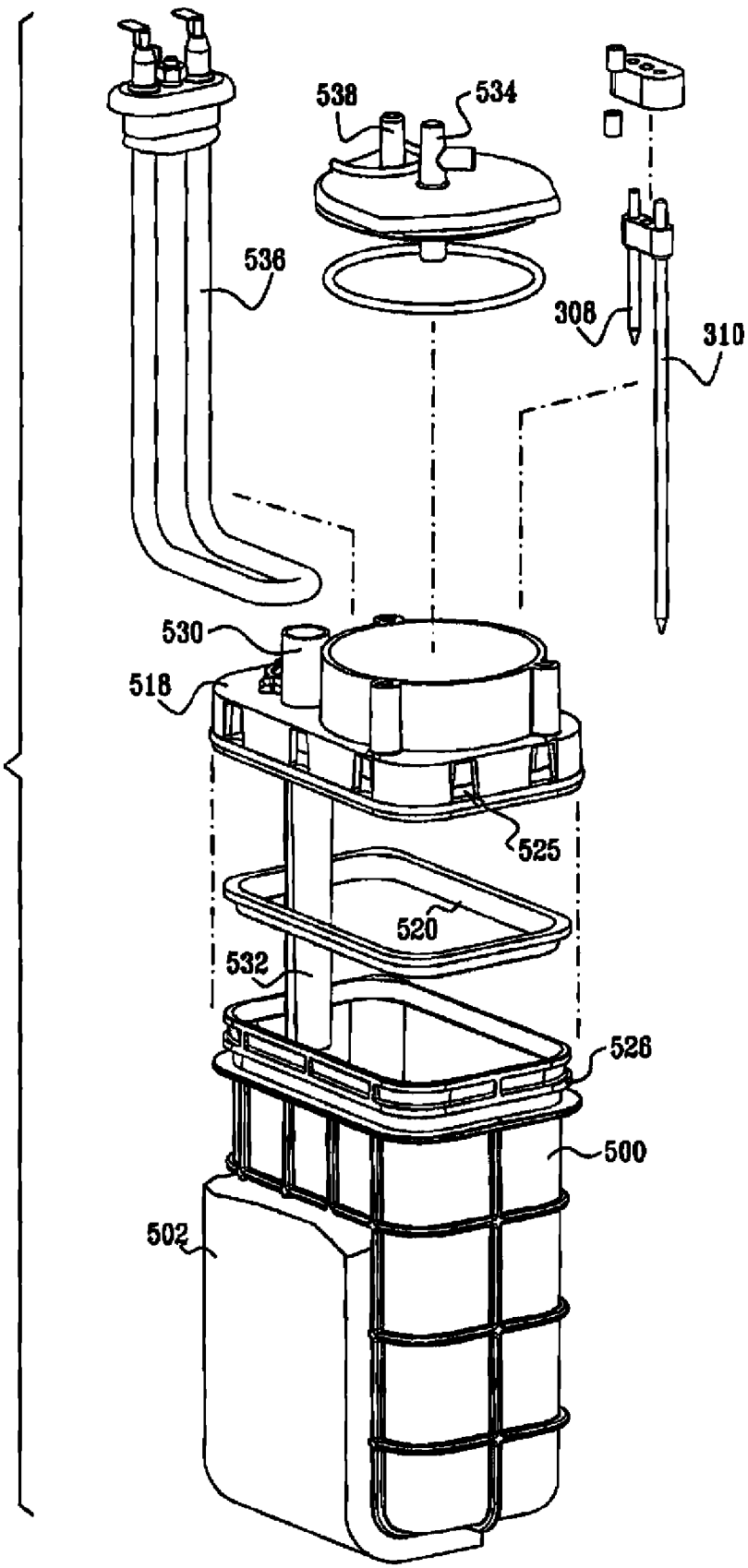

Reference is now made to FIGS. 9A and 9B, which are, respectively, a sectional assembled view and a pictorial exploded view illustration of water heating subassembly 202, forming part of the water dispenser of FIGS. 1A and 1B. As seen in FIGS. 9A and 9B, the water heating subassembly 202 includes a container 500, typically formed of polypropylene, which is preferably enclosed in a thermally insulative jacket 502. A container top sealing assembly 518 is preferably sealingly engaged with container 500 and preferably includes an elastomeric seal 520 which sealingly engages a top surface of container 500. Elastomeric seal 520 is seated in a circumferential recess 522 formed interiorly of a flange 524 having portions 525 which are in snap-fit engagement with a outwardly directed rim 526 near the top surface of container 500.

Container top sealing assembly 518 defines a water inlet 530 coupled to water heater supply conduit 270 (FIG. 5) which includes a water flow guide 532 directed to the bottom of the interior of container 500 and a water outlet 534, coupled to heated water conduit 272 (FIG. 5). Container top sealing assembly 518 also includes a sealed attachment location for a water heating element 536 which is disposed within container 500. Container top sealing assembly 518 also includes a steam venting port 538, which is connected to steam conduit 274 (FIG. 5). Additionally, top sealing assembly 518 defines sealed attachment locations for sensors 308 and 310.

Figure 10:
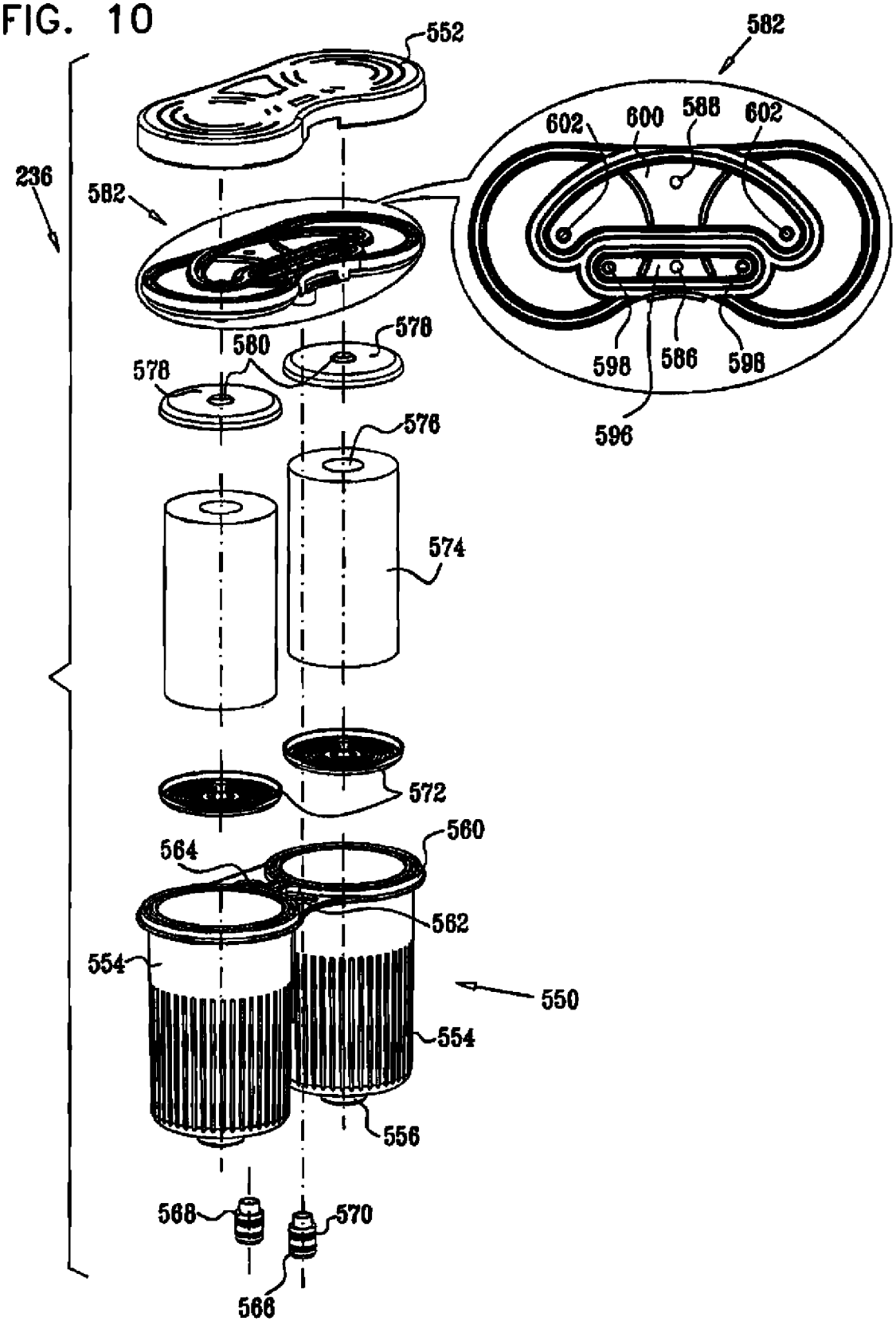
FIG. 10 is an exploded view of a filter cartridge constructed and operative in accordance with a preferred embodiment of the present invention.
Figure 11C:
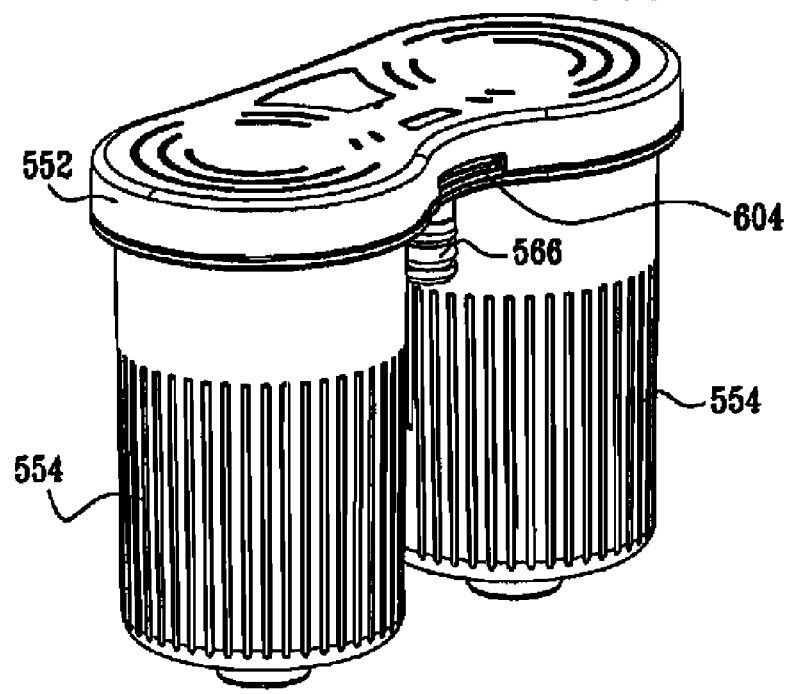
Figure 11D:
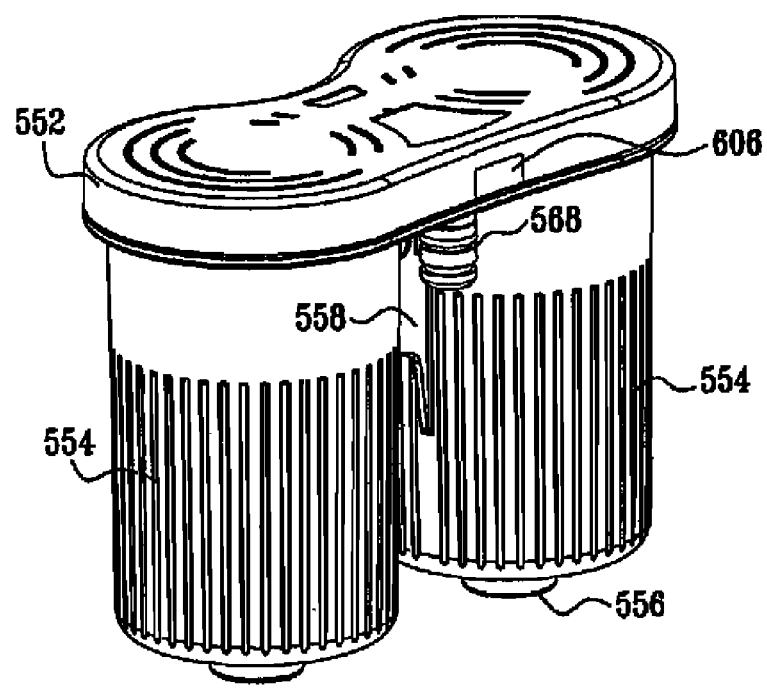

Reference is now made to FIG. 10, which is an exploded view of a filter cartridge constructed and operative in accordance with a preferred embodiment of the present invention and to FIGS. 11A-11D, which are pictorial illustrations of the filter cartridge. As seen in FIGS. 10 and 11A-11D, the filter cartridge, which is a preferred embodiment of filter cartridge 236 (FIG. 4), comprises a bicameral main housing portion 550 and a housing top portion 552 which is preferably sealed thereto.

As seen more particularly in FIGS. 11A-11D, the bicameral main housing portion 550 preferably includes a pair of filter element containing chambers 554, each of which is preferably formed with a generally cylindrical spring seat defining socket 556 at a bottom surface thereof. The pair of filter element containing chambers 554 are integrally joined by a planar structural portion 558 and by a planar base element 560 which lies in a plane generally perpendicular to the plane of planar structural portion 558. Planar base element 560 is formed with inlet and outlet port receiving apertures 562 and 564 in which are located respective inlet and outlet port defining connector assemblies 566 and 568.

Each of assemblies 566 and 568 defines a generally cylindrical water flow conduit on an outer surface of which there are preferably provided a pair of sealing rings 570.

Disposed within each of filter element containing chambers 554 there is preferably provided an elastomeric sealing pad 572, which supports a generally cylindrical filter element 574, preferably formed of activated carbon, and formed to have a central bore 576. Disposed over each cylindrical filter element 574 is a top pad 578 having a centrally disposed filtered water outlet aperture 580, communicating with central bore 576.

Sealed, preferably by ultrasonic welding, to planar base element 560 is a manifold defining planar element 582. Manifold defining planar element 582 includes respective water inlet and water outlet port communication apertures 586 and 588 to which are sealingly joined, as by ultrasonic welding, respective inlet and outlet port defining connector assemblies 566 and 568.

Manifold defining planar element 582 is sealed to housing top portion 552 and defines therewith a water inlet pathway 596 from aperture 586 to the outer peripheries of both of cylindrical filter elements 574, via apertures 598. Manifold defining planar element 582 and housing top portion 552 also define a water outlet pathway 600 from a pair of filtered water apertures 602, which communicate with filtered water outlet apertures 580 in top pads 578, to outlet port defining connector assembly 568 via aperture 588. This is also a particular feature of the present invention.

It is a particular feature of the present invention that the filter cartridge 236 is configured to define a locking surface, preferably a locking slot 604, defined jointly by housing top portion 552 and manifold defining planar element 582. Preferably, in accordance with a preferred embodiment of the present invention, the filter cartridge 236 is also provided with a machine-readable label 606, such as a bar-coded label, which enables the filter cartridge 236 to be automatically identified by the water dispenser, preferably by use of a filter cartridge presence and identity sensor 320 (FIG. 6). Label 606 is preferably located on housing top portion 552.

Reference is now made to FIGS. 12A and 12B, which illustrate operative engagement between filter cartridge 236 and filter element housing socket 234 (FIG. 4). It is seen in FIG. 12A that a spring 620 underlies each filter element containing chamber 554 and engages generally cylindrical spring seat defining sockets 556 at respective bottom surfaces thereof.

Referring now particularly to FIG. 12B, it is seen that shut-off valves 630 are provided in communication with inlet water conduit 254 upstream of water inlets 256 of filter element housing socket 234 (FIG. 5). The shut-off valves 630 are shown in an open orientation, being pressed downwardly by engagement therewith of respective inlet and outlet port defining connector assemblies 566 and 568. It is a particular feature of the present invention that the shut-off valves 630 and water inlets 256 are formed as separate units in the filter element housing socket 234 and may be formed of different materials.

Figure 13A:
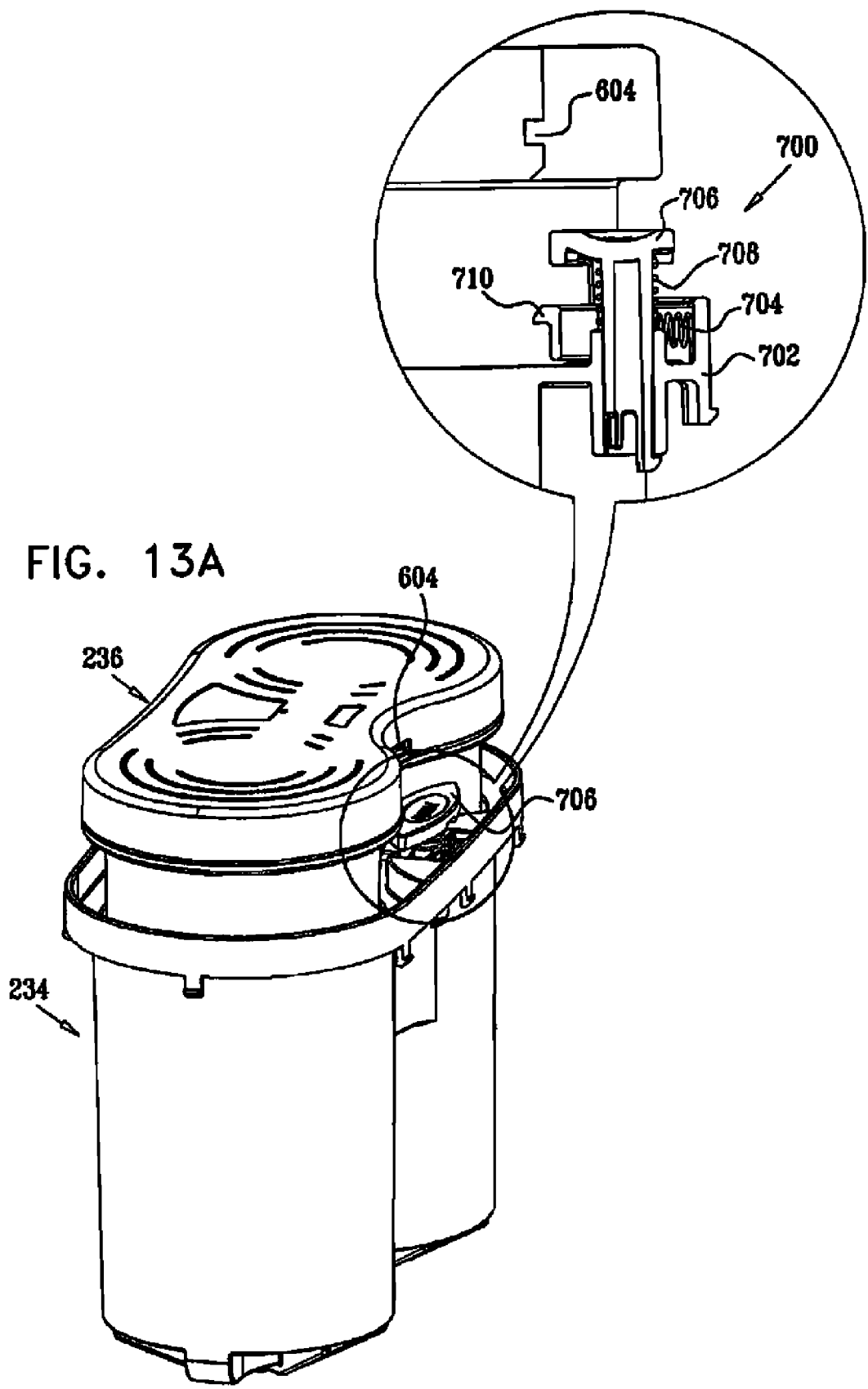
Figure 13C:
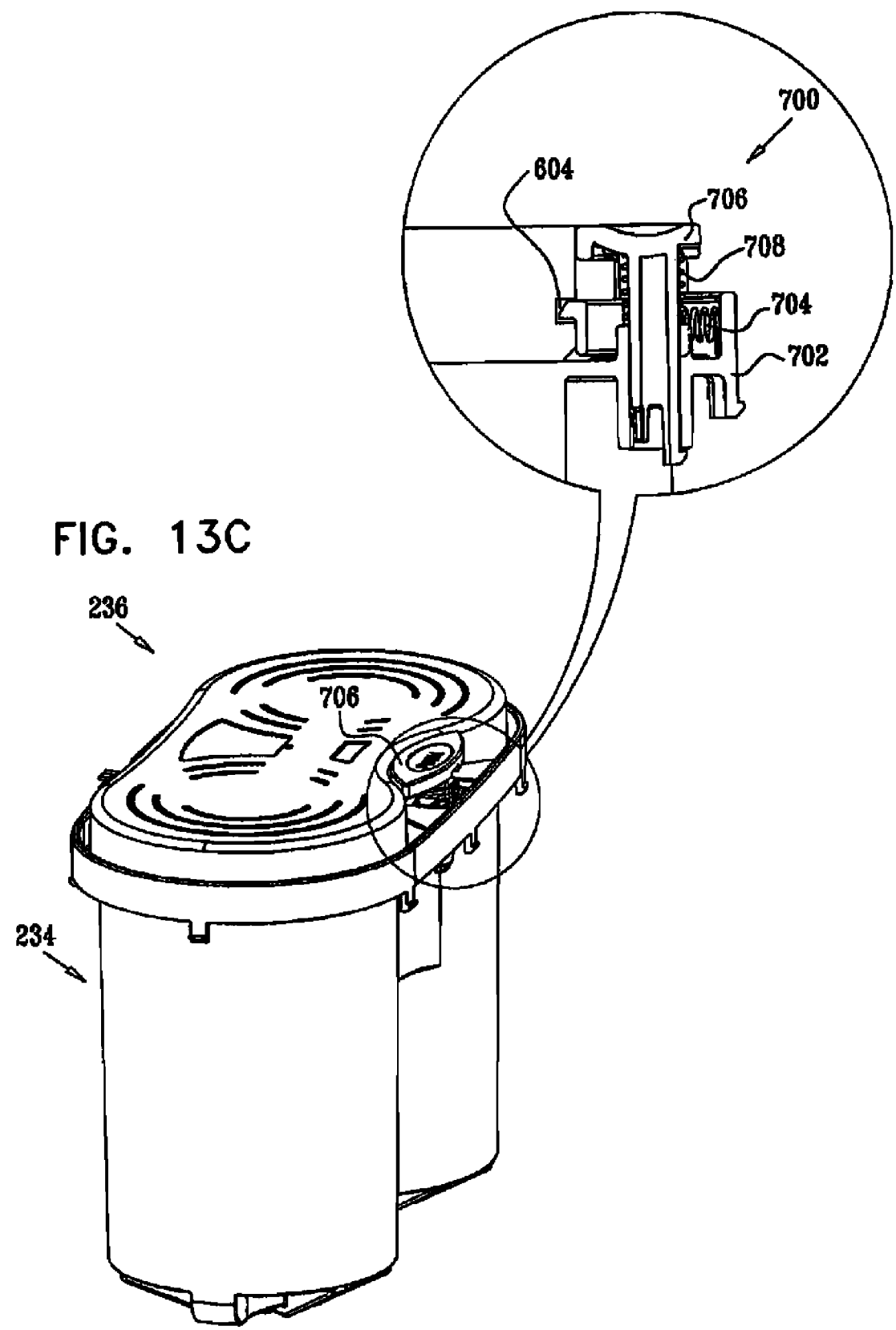

Reference is now made additionally to FIGS. 13A-13C, which illustrate user-initiated installation of a filter element forming part of the water dispenser of FIGS. 1A and 1B in accordance with a preferred embodiment of the present invention and shows structural details of a latch mechanism 700 which is preferably employed.

As seen in FIGS. 13A-13C, the latch mechanism comprises a latching element 702 which is spring biased, preferably by a pair of springs 704, into removable locking engagement with locking slot 604 in filter cartridge 236. Retraction of latching element 702 and disengagement of latching element 702 is preferably provided by a user-actuable push button 706, which acts against the urging of a spring 708 and when depressed engages latching element 702 and forces it out of engagement with locking slot 604. Retraction of latching element 702 is also provided by engagement therewith of a surface of manifold defining planar element 582 (FIG. 10) with an inclined surface 710 of the latching element 702.

FIG. 13A illustrates a preliminary stage in the insertion of a filter cartridge 236 into socket 234; FIG. 13B shows operative engagement between a surface of manifold defining planar element 582 (FIG. 10) with an inclined surface 710 of the latching element 702, producing disengagement of latching element 702 from locking slot 604 and FIG. 13C shows the filter cartridge 236 inserted into socket 234 with the latching element 702 in locking engagement with locking slot 604.

Figure 14B:
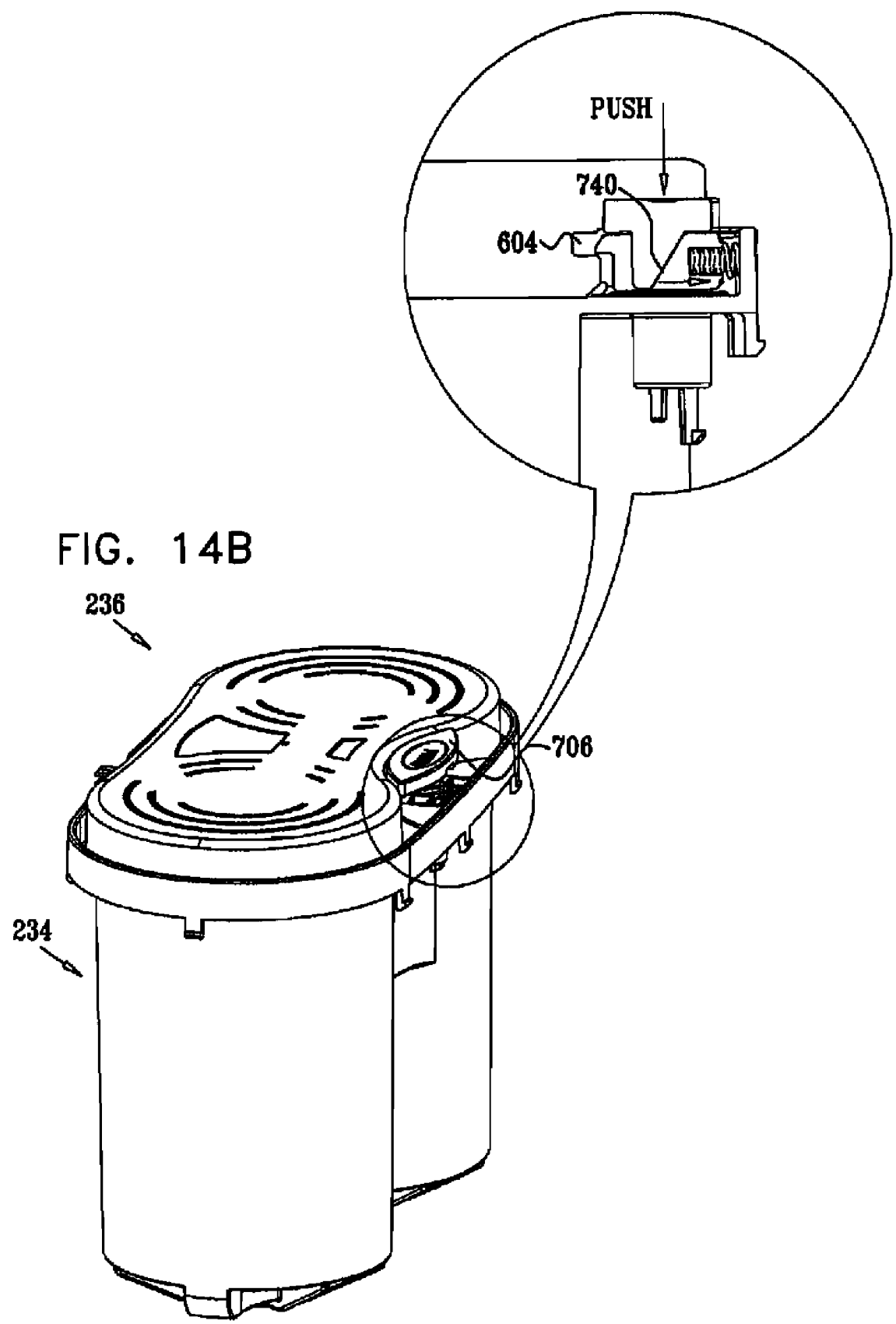
Figure 14C:
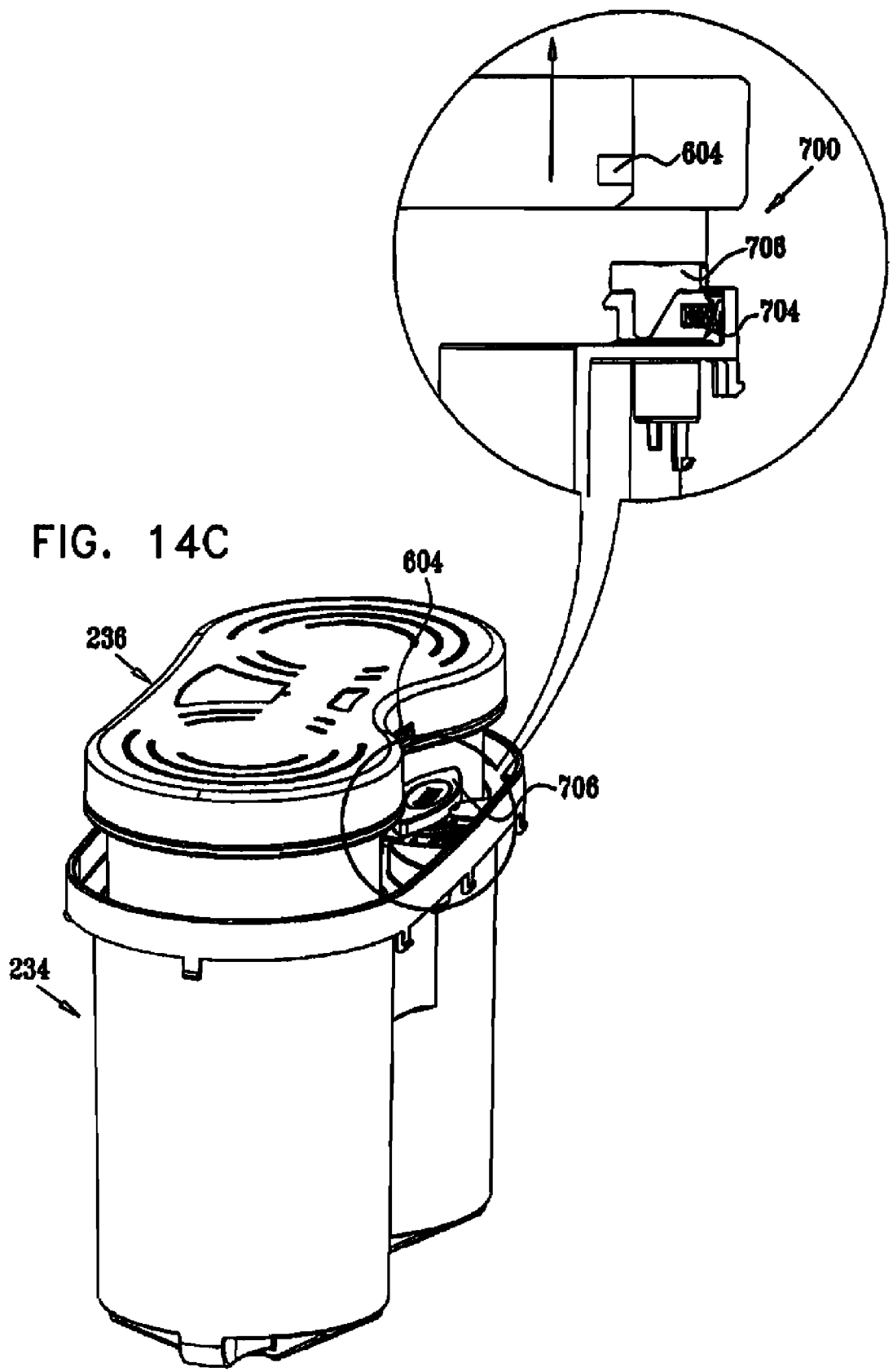

Reference is now made additionally to FIGS. 14A-14C, which illustrate user-initiated removal of the filter cartridge 236 from socket 234 in the water dispenser of FIGS. 1A and 1B in accordance with a preferred embodiment of the present invention and shows structural details of the push-button actuated retraction of latch element 702.

FIG. 14A illustrates the filter cartridge 236 latched in engagement with socket 234; FIG. 14B shows operative engagement between a cam surface 740 of push button 706 with an inclined surface 742 (FIG. 14A) of the latching element 702, producing disengagement of latching element 702 from locking slot 604 and FIG. 14C shows the filter cartridge 236 removed from socket 234 with the latching element 702 returned to its extended orientation.

Reference is now made to FIGS. 15A, 15B, 15C, 15D, 15E, 15F, 15G, 15H, 15I, 15J, 15K and 15L, which illustrate menu functionality of the water dispenser in accordance with a preferred embodiment of the present invention. This functionality is provided by the electrical circuitry shown in schematic form in FIGS. 7A-7L along with suitable software embedded in components thereof.

Figure 15A:
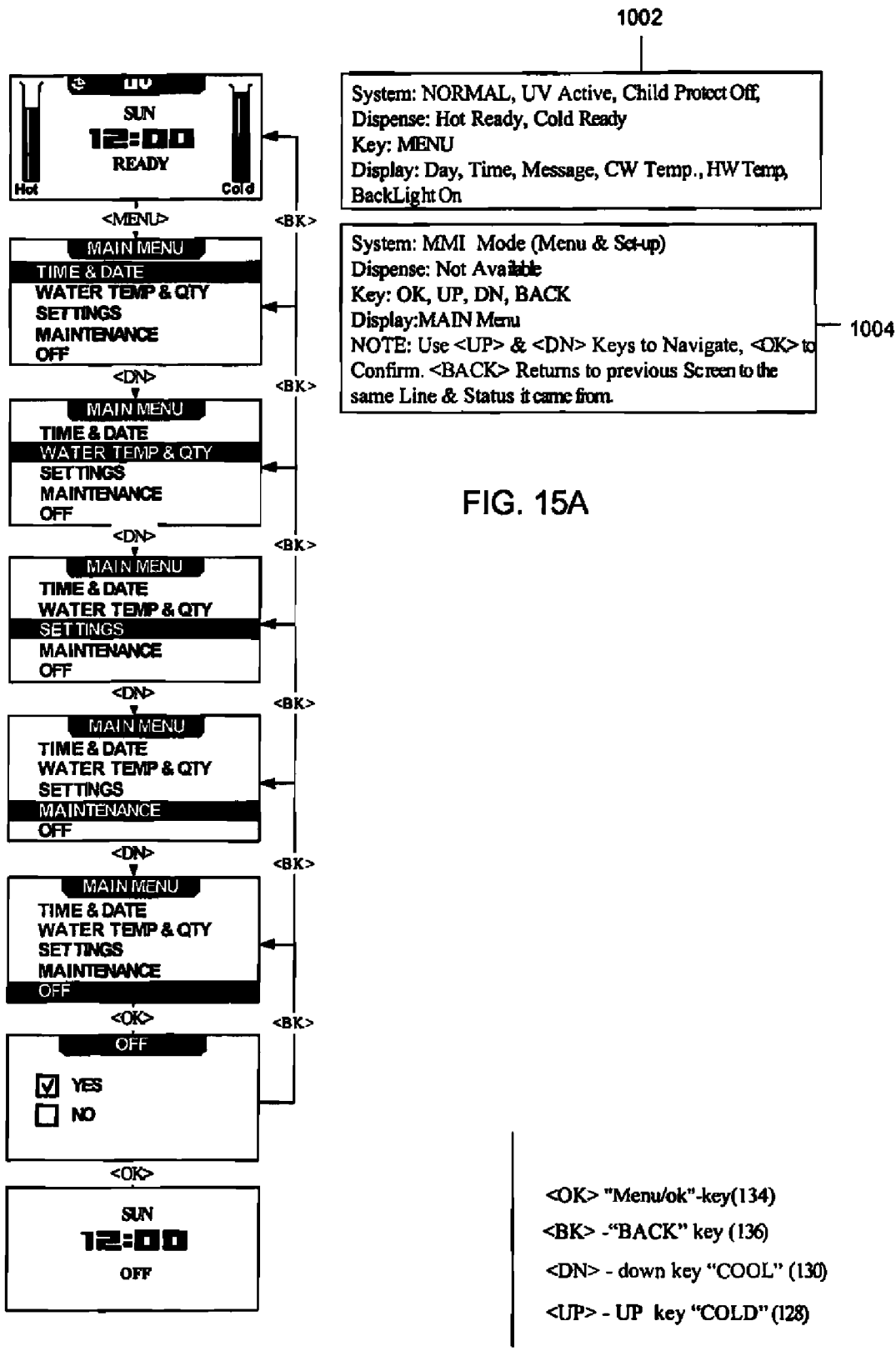

FIG. 15A shows operation of the main menu, which permits user selection of displayed time & date, water temperature and quantity, various other user interface settings, maintenance procedures and machine off state. Block 1002 indicates initial default settings corresponding to the initial screen prior to selection of the main menu. Block 1004 indicates default settings once the main menu has been selected.

Figure 15B:
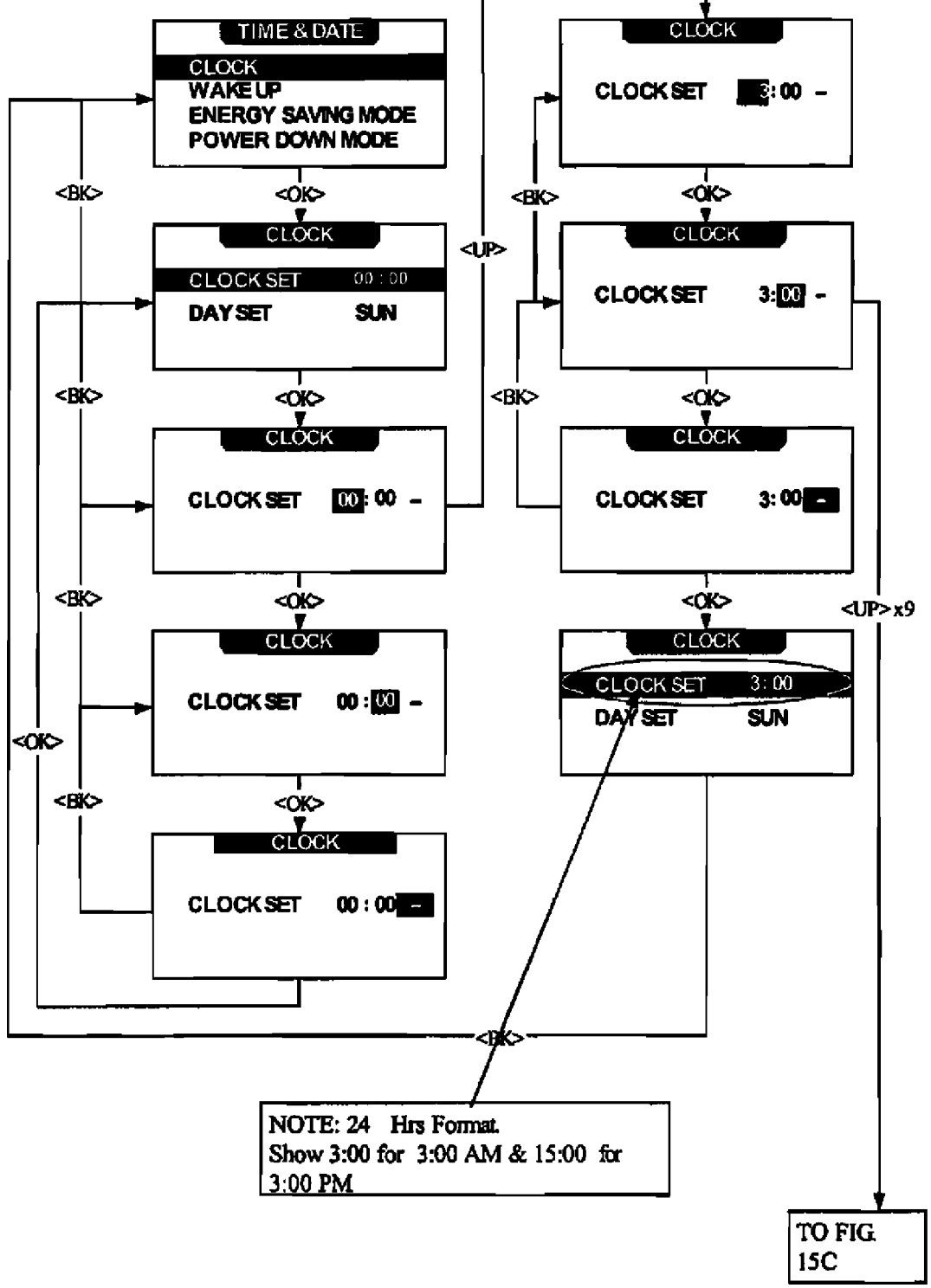
Figure 15C:
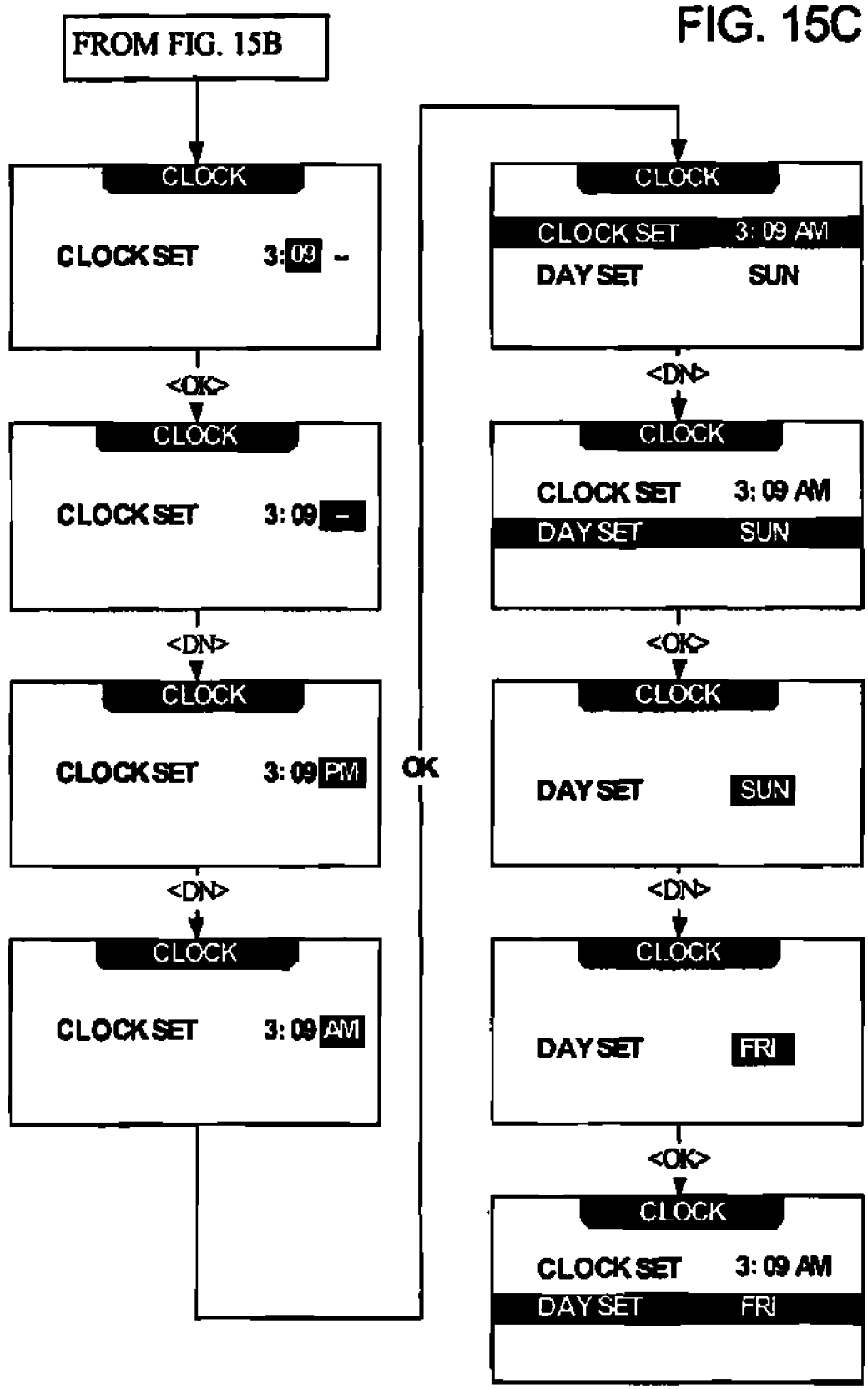
Figure 15D:
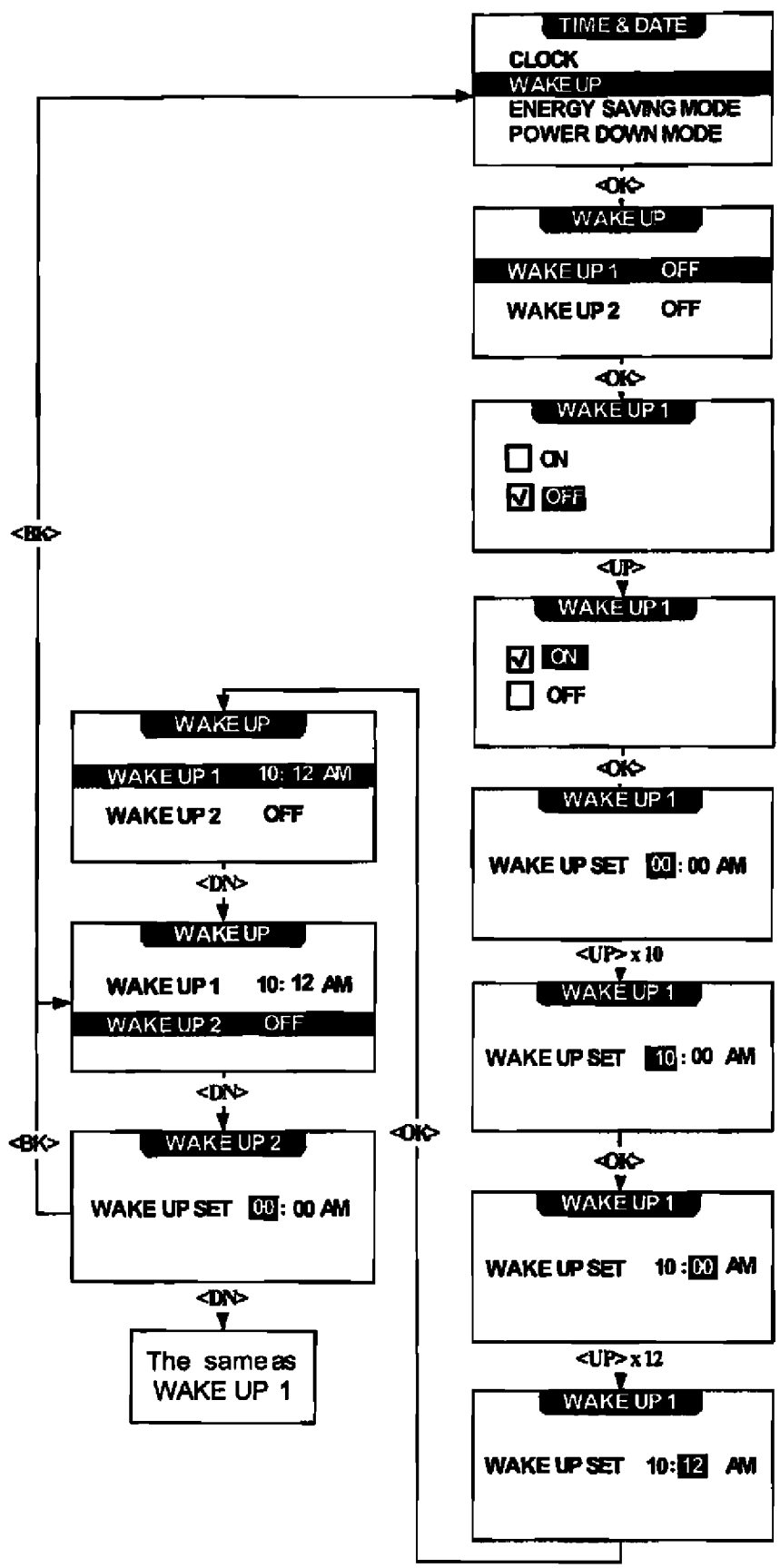
Figure 15F:
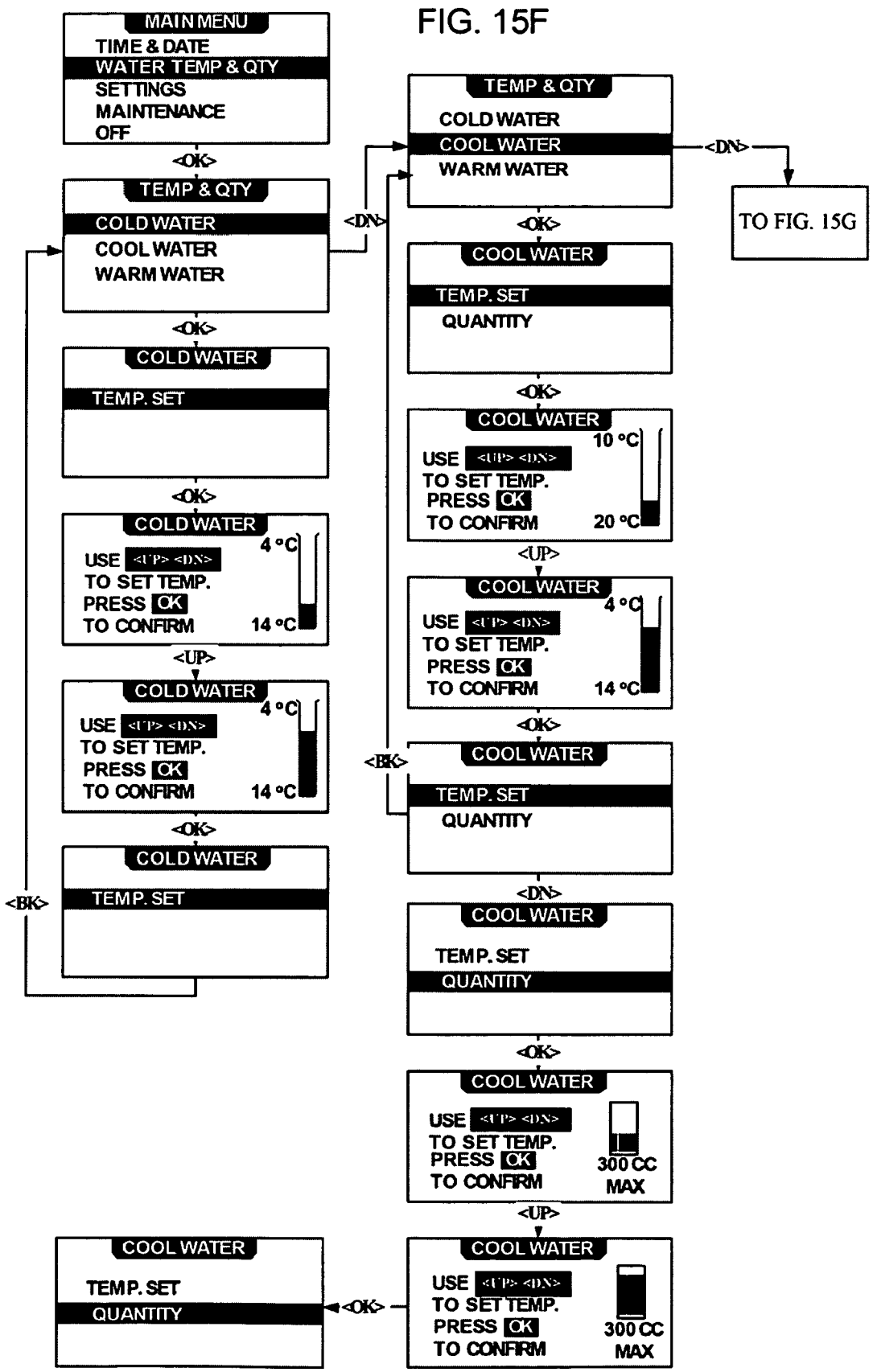
Figure 15H:
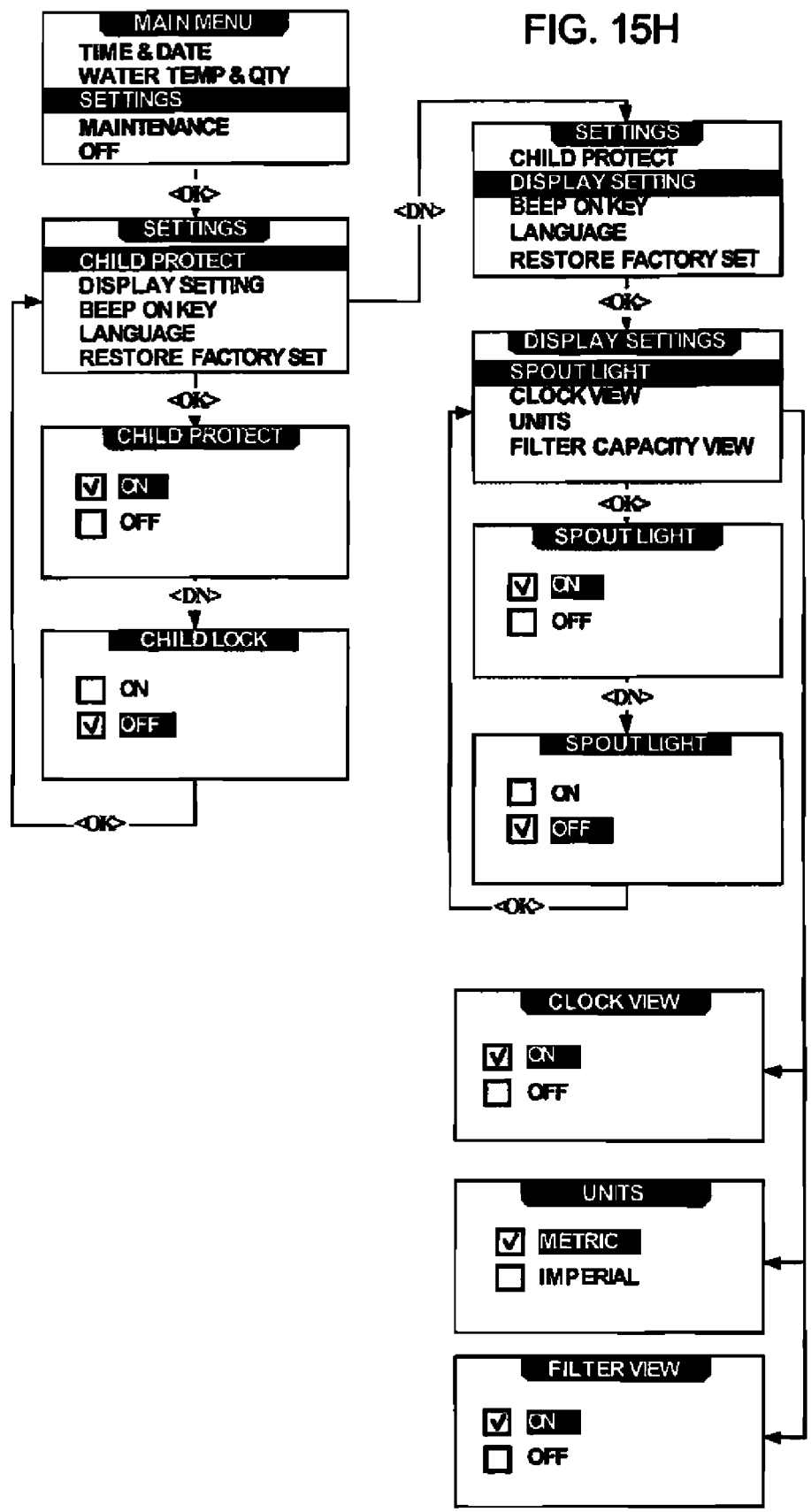
Figure 15I:
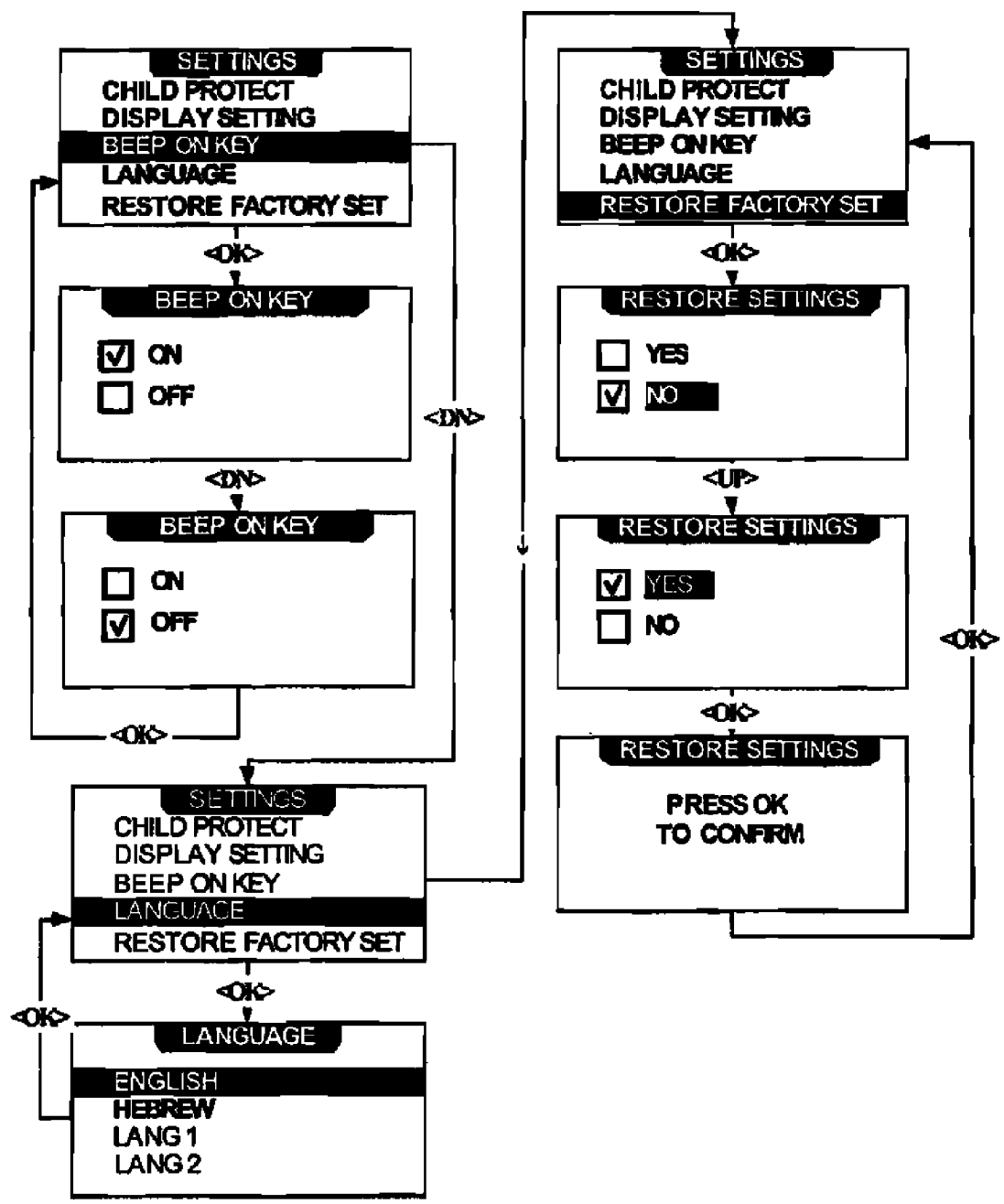
Figure 15J:
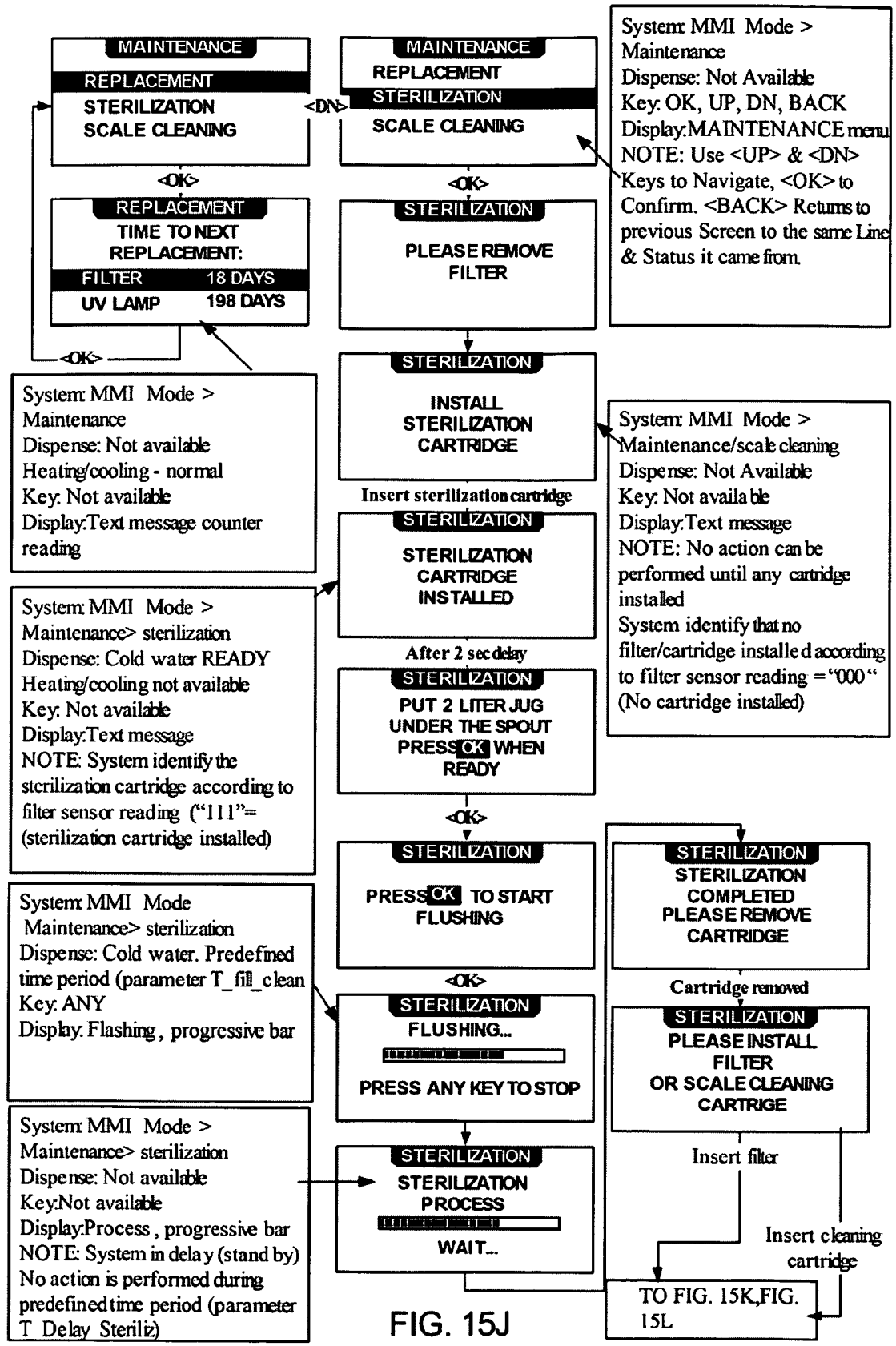
Figure 15K:
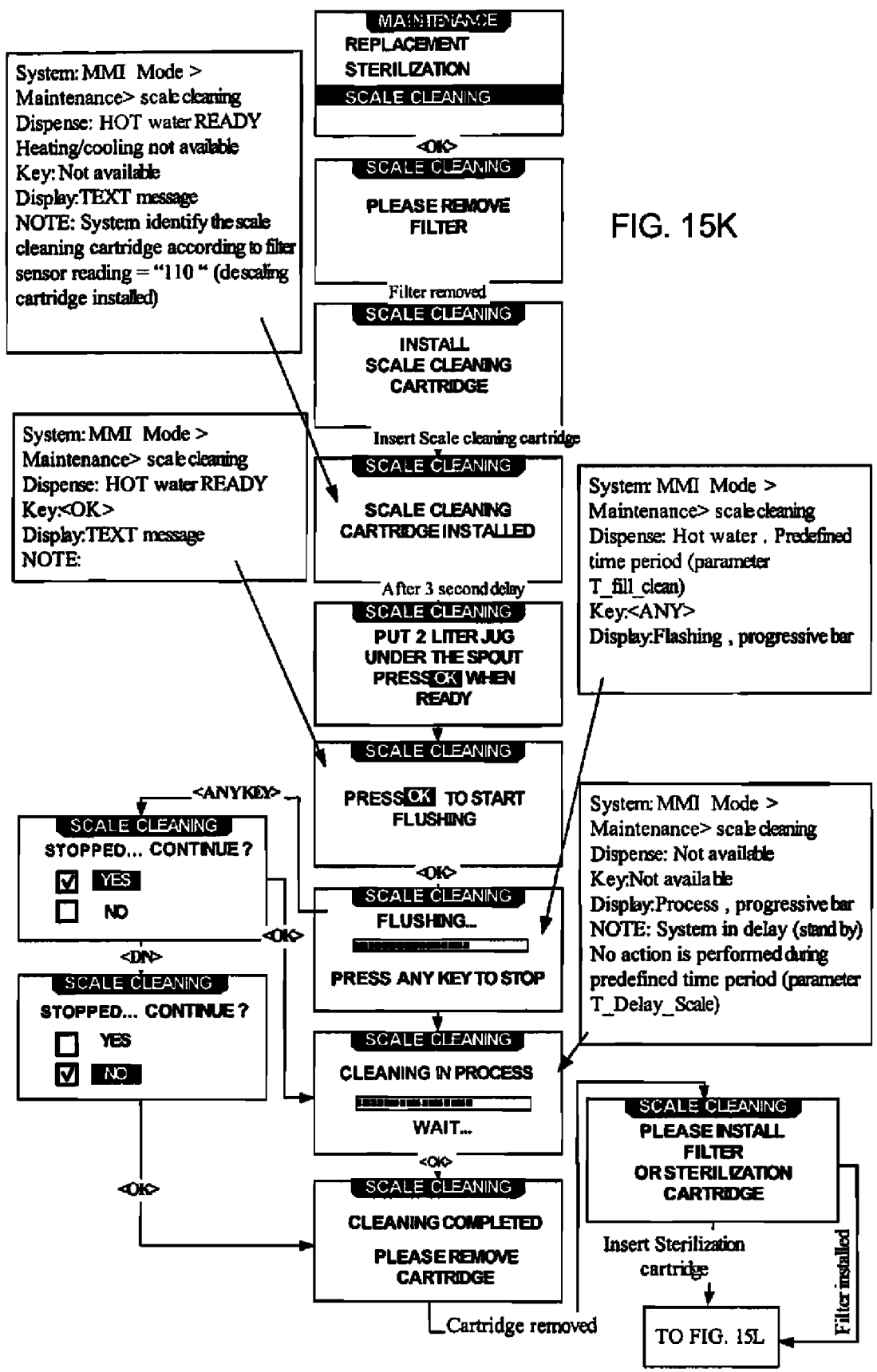
Figure 15L:
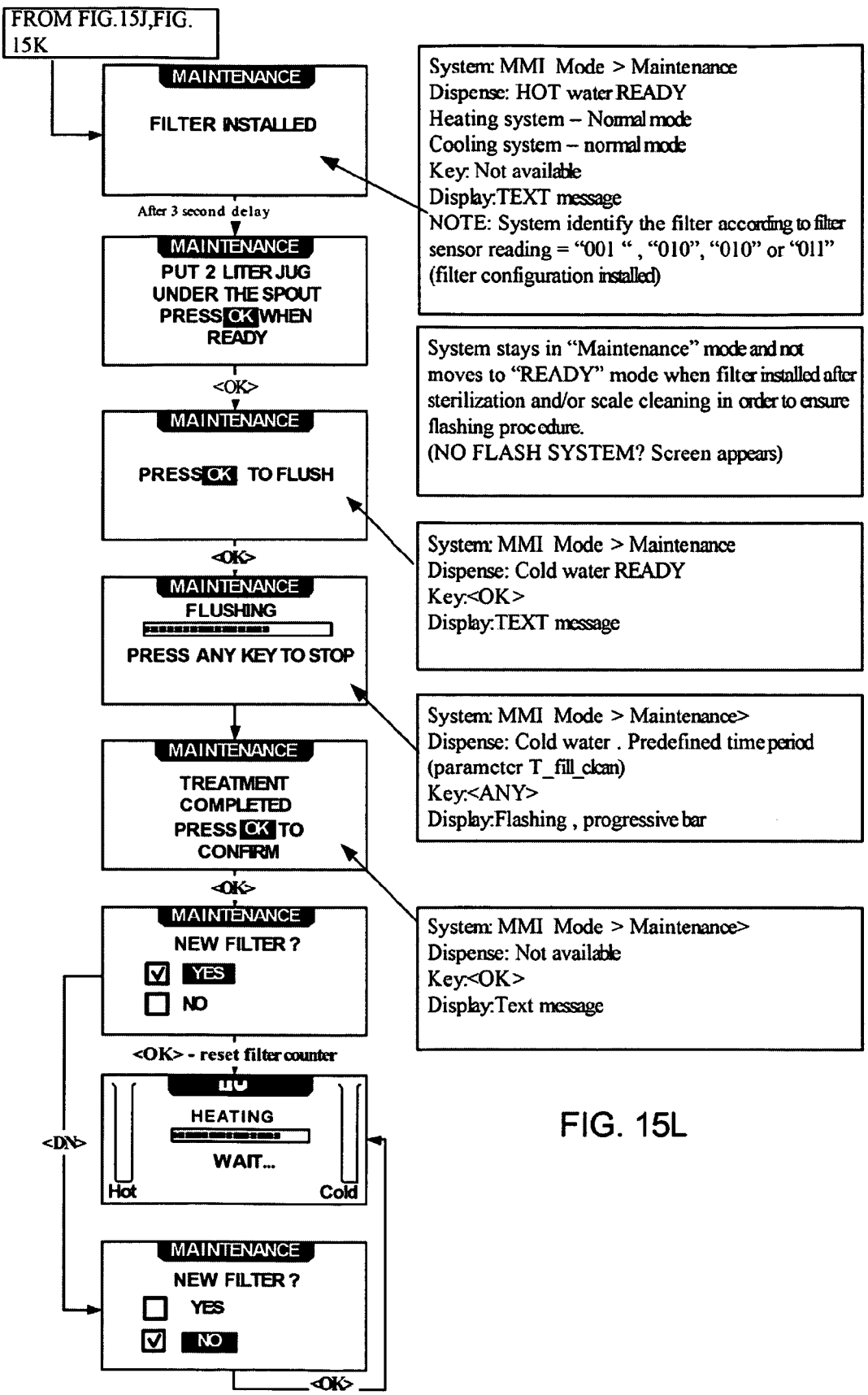

FIGS. 15B and 15C together show clock selection in the time & date sub-menu. FIG. 15D shows wake up configuration in the time & date sub-menu. FIG. 15E shows energy saving and power down configuration in the time & date sub-menu. FIGS. 15F and 15G show water temperature and quantity selection, which is a particular feature of the present invention. FIGS. 15H and 15I both show user interface setting configuration operation. FIGS. 15J, 15K and 15L together show maintenance operation.

Reference is now made to FIGS. 16A, 16B, 16C and 16D, which illustrate functionality of the water dispenser in various modes in accordance with a preferred embodiment of the present invention. This functionality is provided by the electrical circuitry shown in schematic form in FIGS. 7A-7L along with suitable software embedded in components thereof.

Figure 16A:
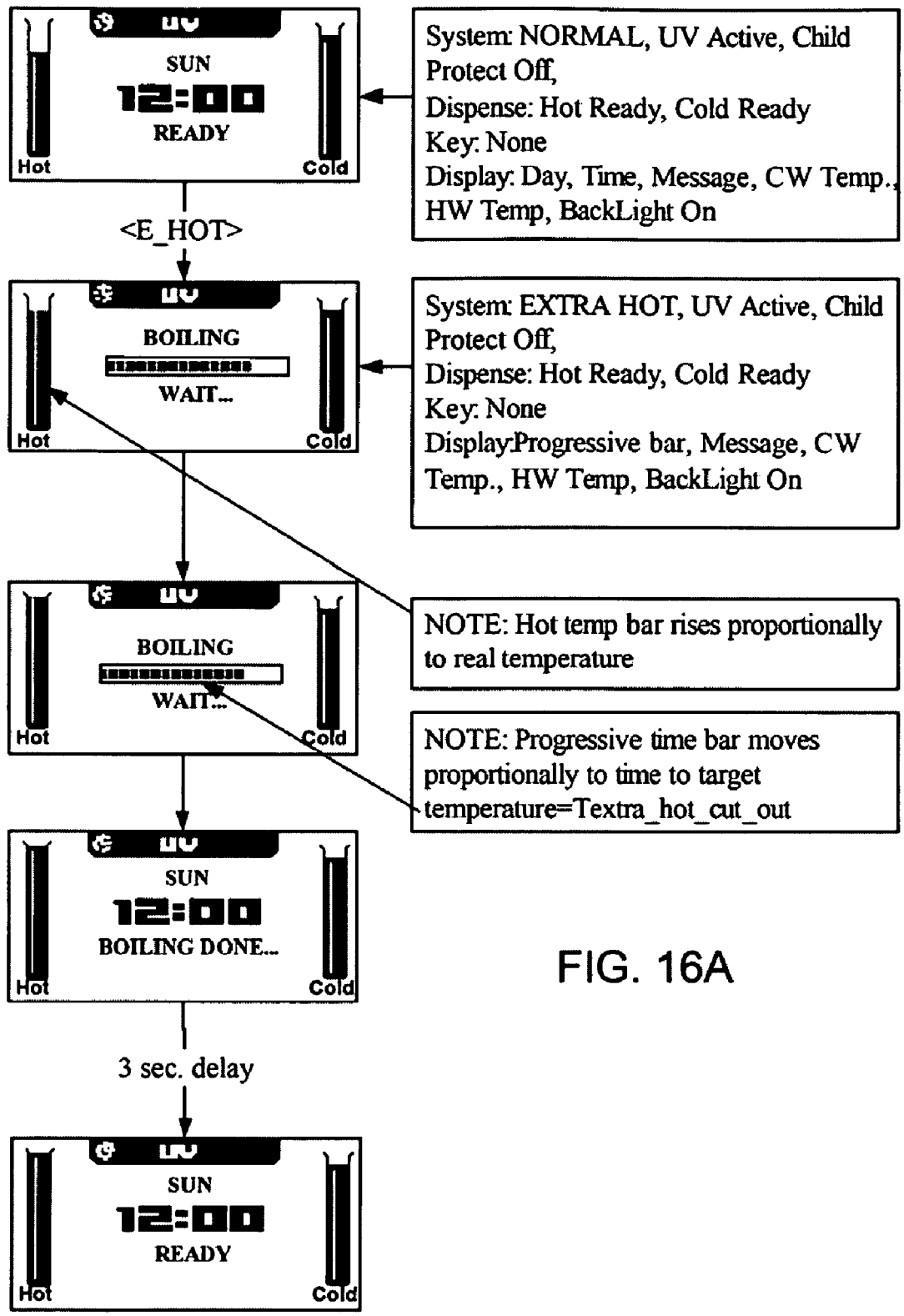
FIGS. 16A, 16B, 16C and 16D illustrate functionality of the water dispenser in various modes in accordance with a preferred embodiment of the present invention.
Figure 16B:
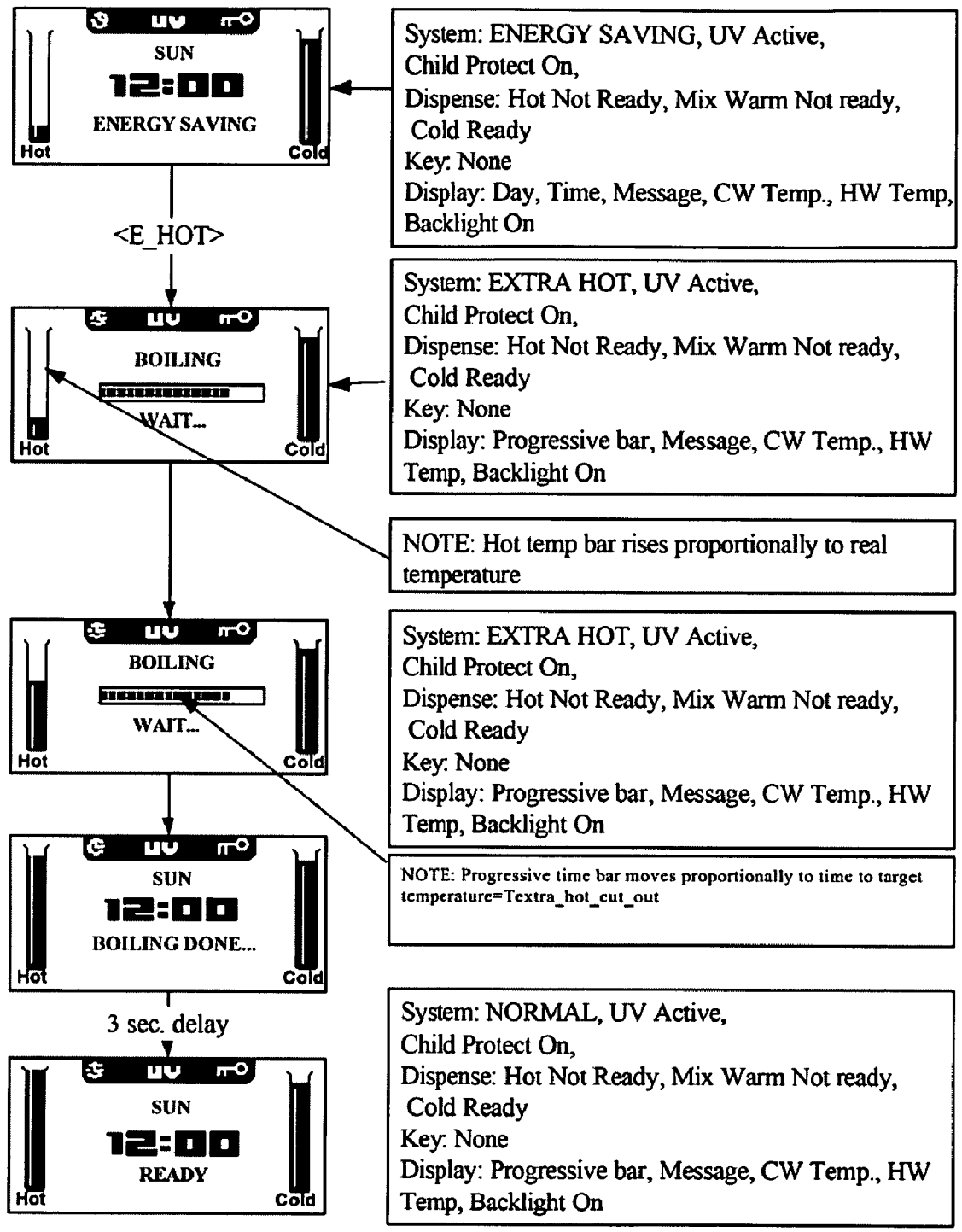
Figure 16C:
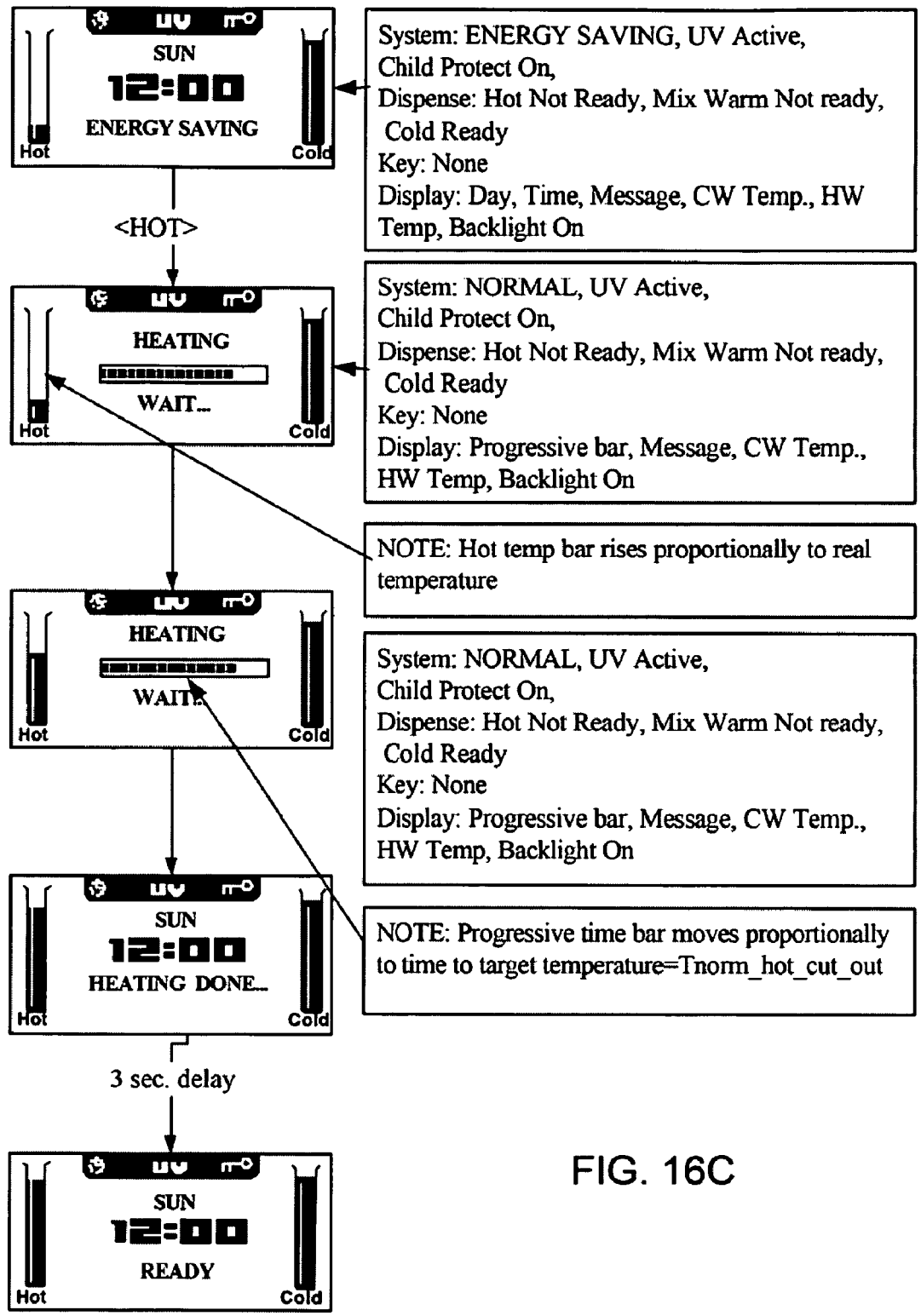
Figure 16D:
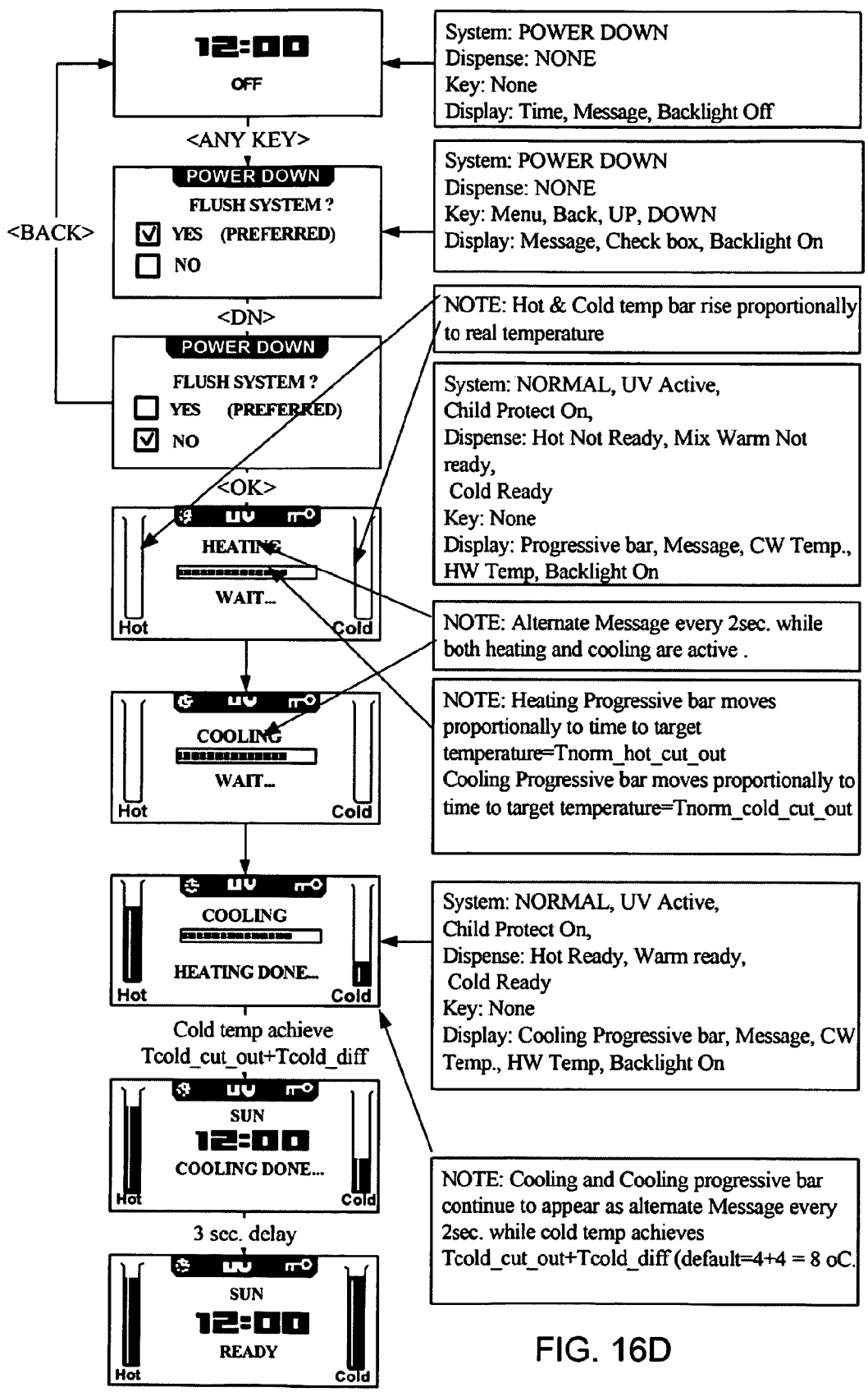

FIG. 16A illustrates operation in an extra-hot mode which preferably is initiated by a user actuating button 132 (FIG. 1A). FIG. 16B illustrates operation in an extra-hot mode which is initiated by a user actuating button 132 (FIG. 1A) when the water dispenser is in an energy saving state. FIG. 16C illustrates operation in a normal mode which is initiated by a user actuating button 124 (FIG. 1A) when the water dispenser is in an energy saving state. FIG. 16D illustrates operation in a normal mode which is initiated by a user actuating any of buttons 124, 126, 128 and 130 (FIG. 1A) when the water dispenser is in off state.

Reference is now made to FIGS. 17A, 17B, 17C, 17D, 17E and 17F, which illustrate water dispensing functionality of the water dispenser in accordance with a preferred embodiment of the present invention. This functionality is provided by the electrical circuitry shown in schematic form in FIGS. 7A-7L along with suitable software embedded in components thereof.

Figure 17A:
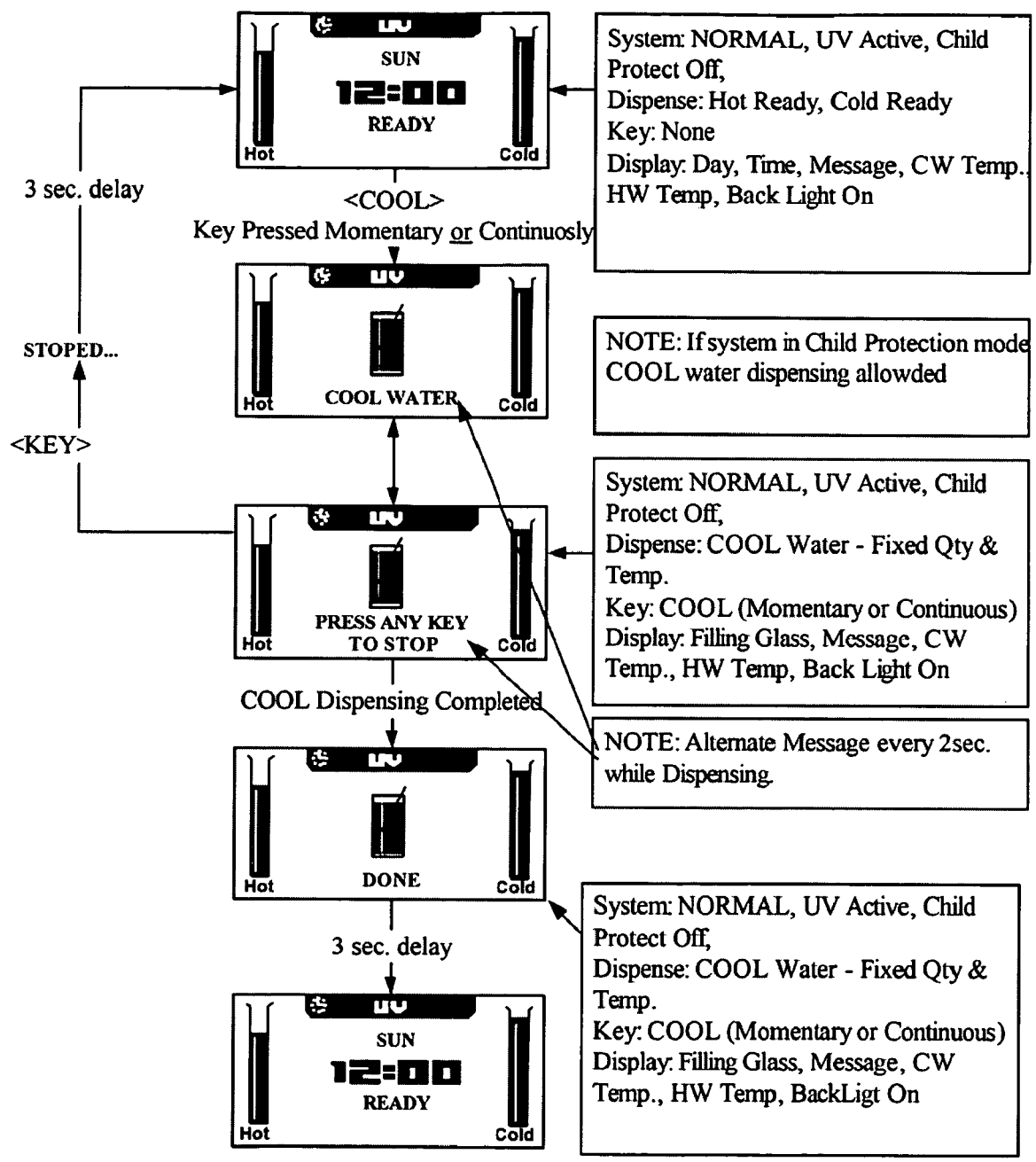
FIGS. 17A, 17B, 17C, 17D, 17E and 17F illustrate water dispensing functionality of the water dispenser in accordance with a preferred embodiment of the present invention.
Figure 17B:
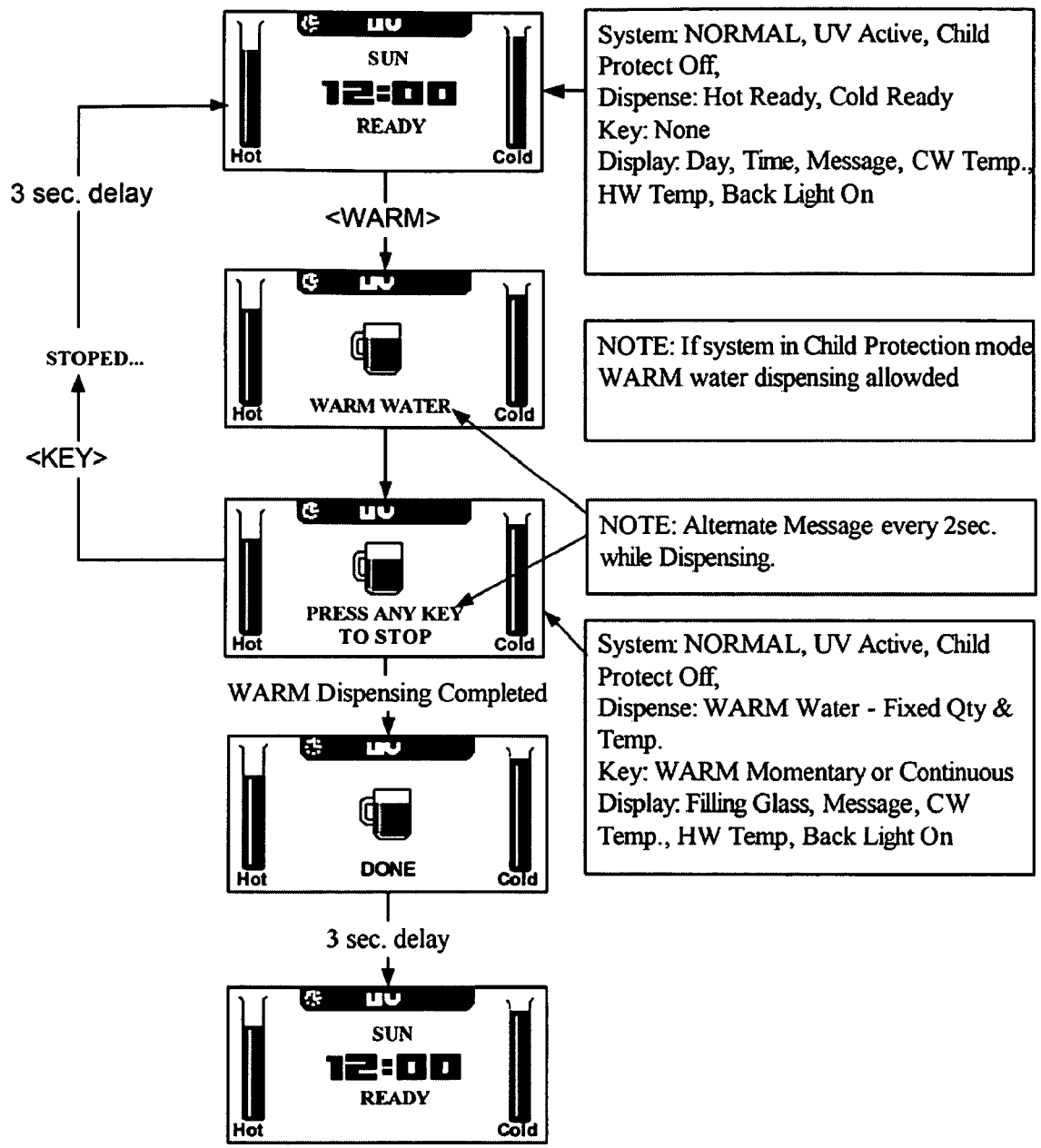

FIG. 17A illustrates cool water dispensing in accordance with a preferred embodiment of the invention, in response to a user actuating button 130 (FIG. 1A) which produces mixing of cooled and heated water. This is a particular feature of the present invention. FIG. 17B illustrates warm water dispensing in accordance with a preferred embodiment of the invention, in response to a user actuating button 126 (FIG. 1A), which produces mixing of cooled and heated water. This is a particular feature of the present invention.

Figure 17C:
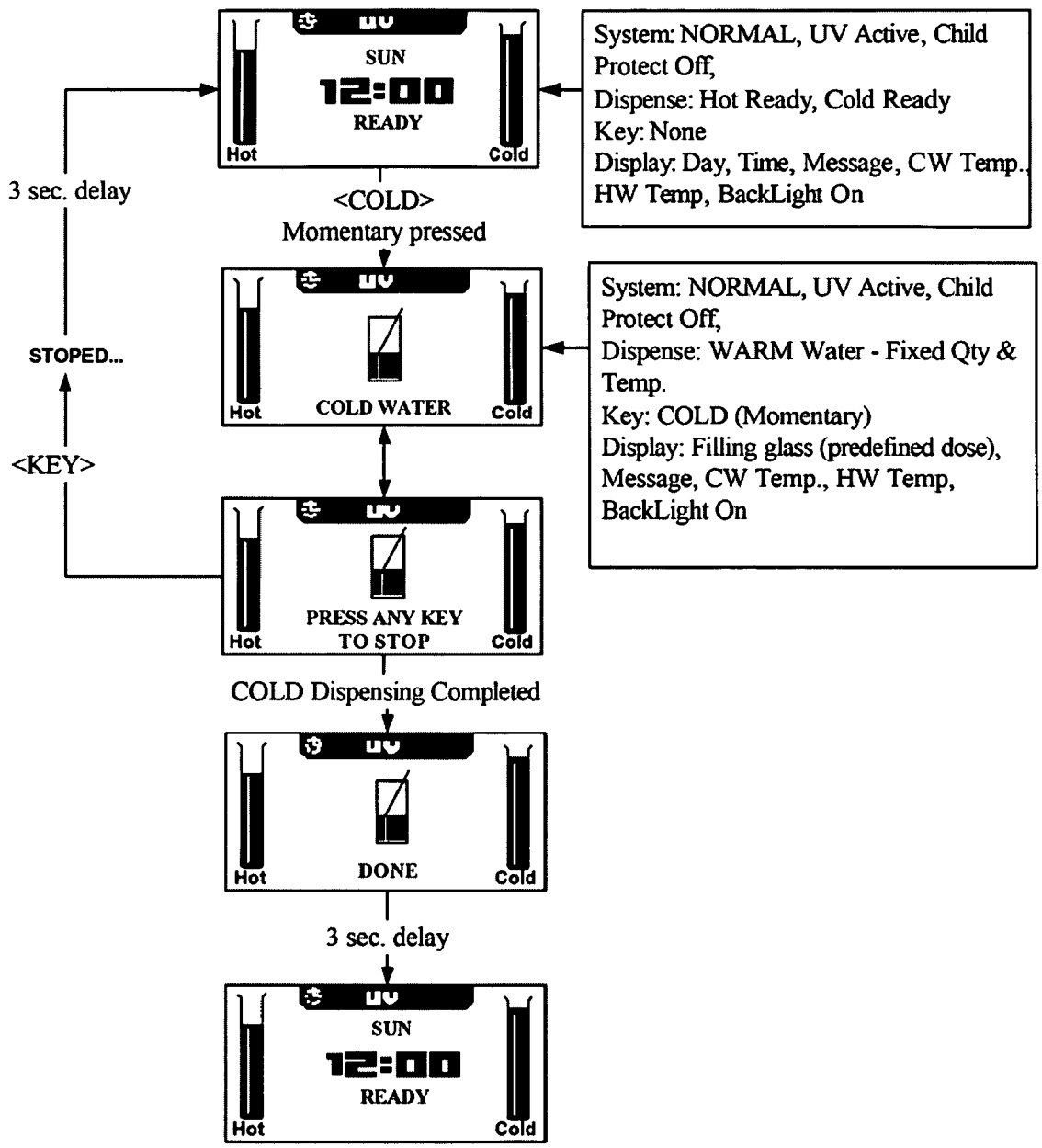
Figure 17D:
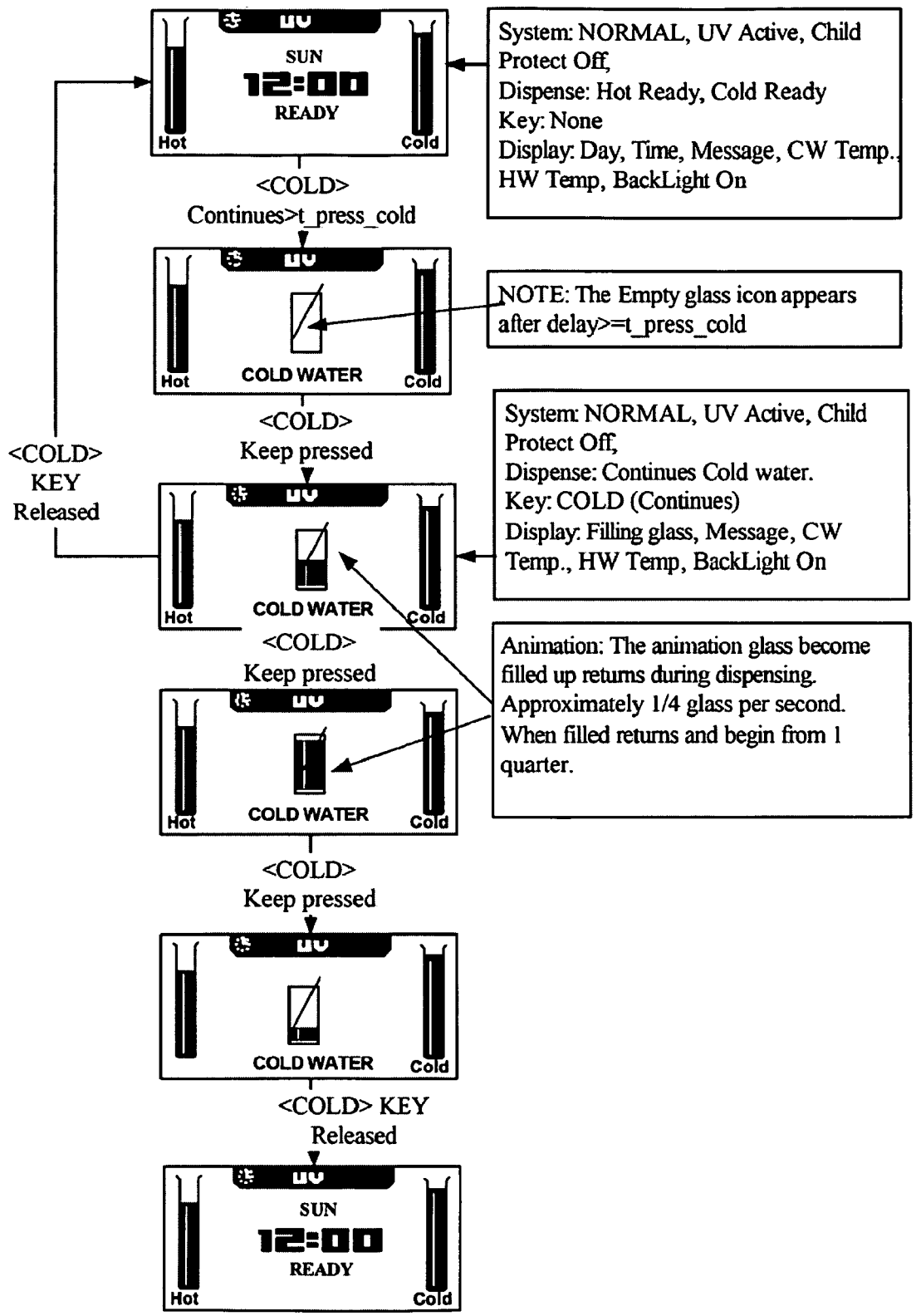
Figure 17E:
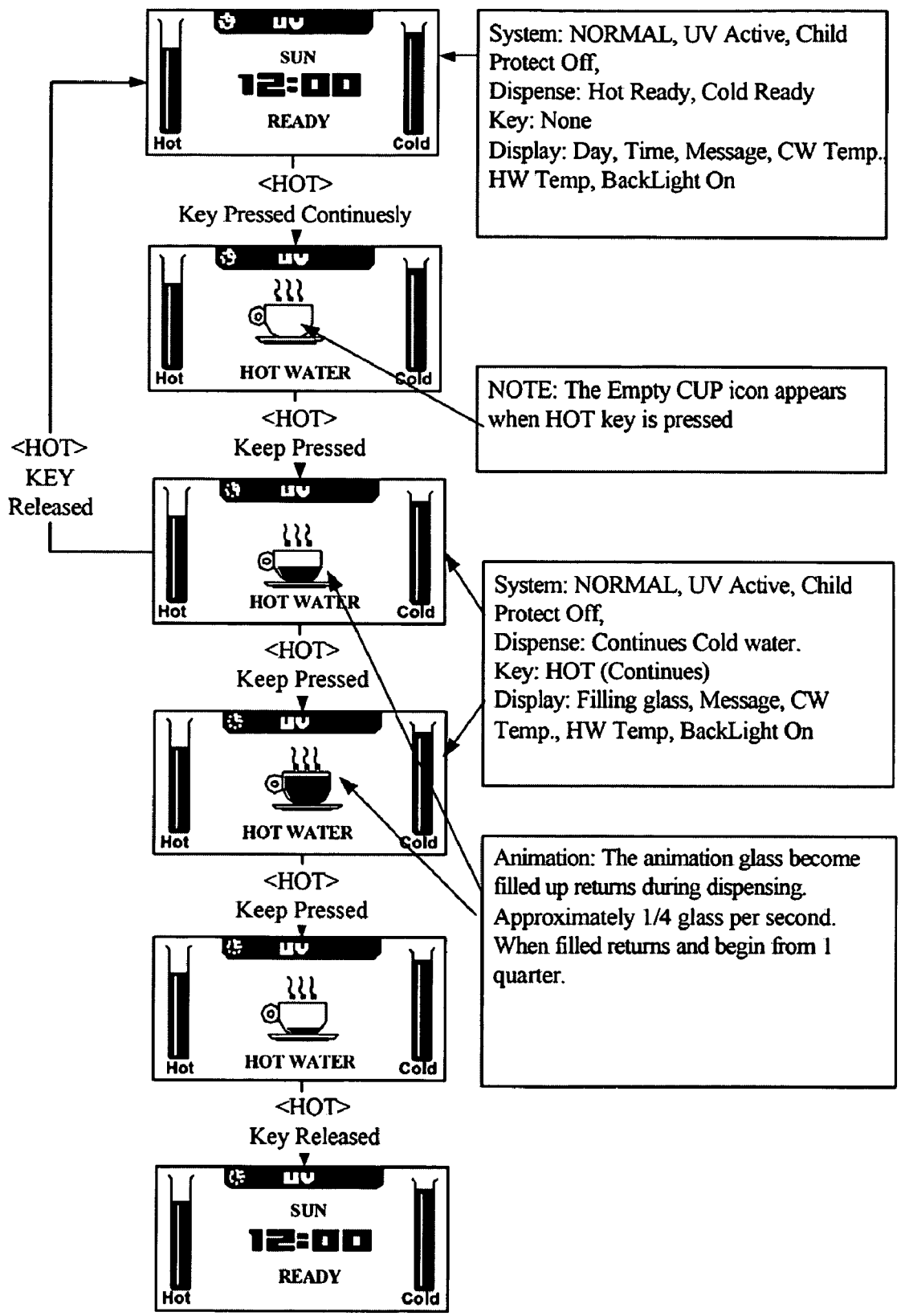
Figure 17F:
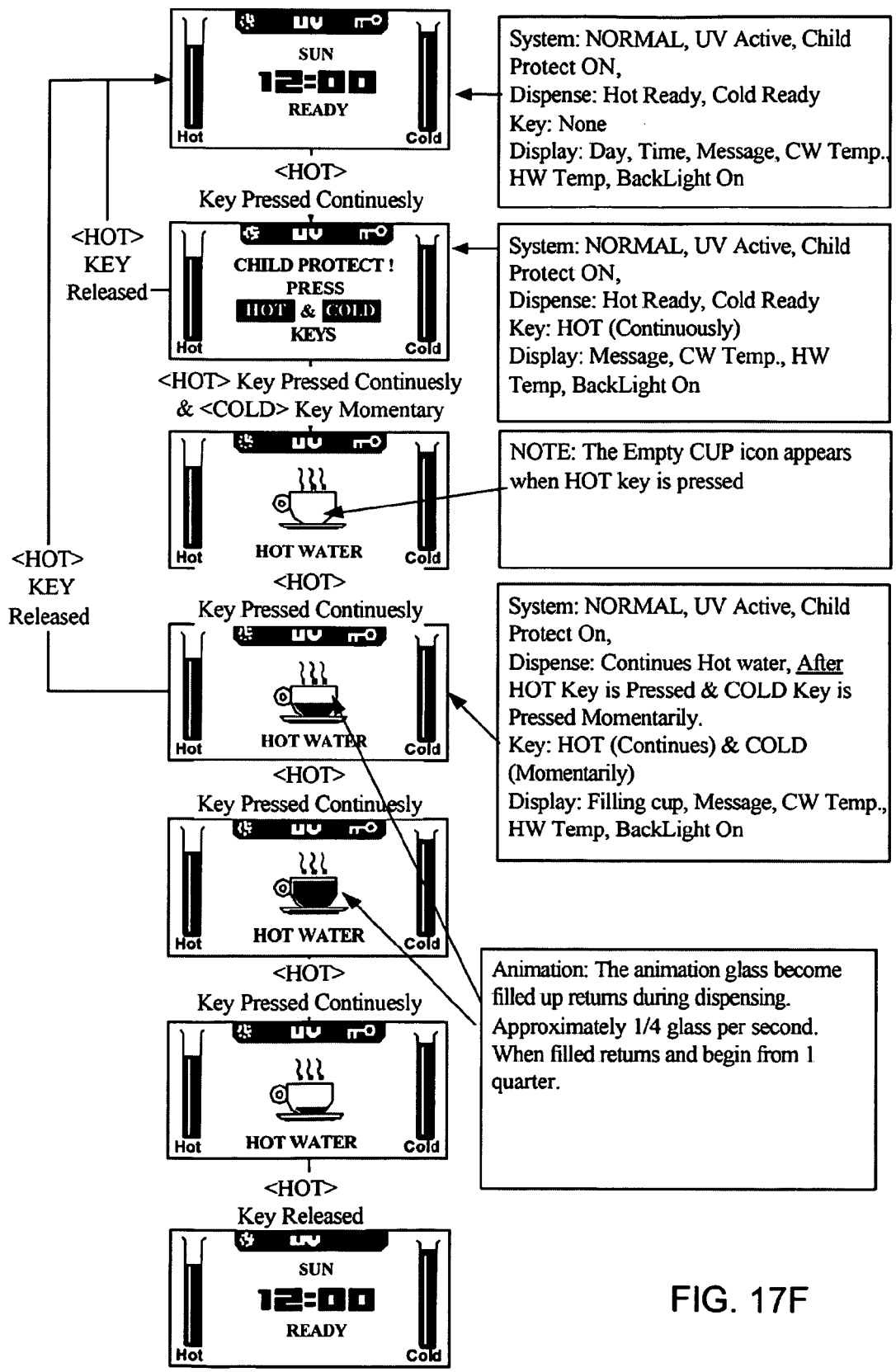

FIG. 17C illustrates cold water dispensing of a predetermined quantity of cold water in accordance with a preferred embodiment of the present invention, in response to a user briefly actuating button 128 (FIG. 1A). FIG. 17D illustrates cold water dispensing of a quantity of cold water determined by the length of time that a user actuates button 128 (FIG. 1A) in accordance with a preferred embodiment of the invention. FIG. 17E illustrates hot water dispensing of a quantity of hot water determined by the length of time that a user actuates button 124 (FIG. 1A) in accordance with a preferred embodiment of the invention, when child protection functionality is not activated. FIG. 17F illustrates hot water dispensing of a quantity of hot water determined by the length of time that a user actuates button 124 (FIG. 1A) in accordance with a preferred embodiment of the invention, when child protection functionality is activated.

Reference is now made to FIGS. 18A, 18B, 18C and 18D, which illustrate responses of the water dispenser to various operational conditions in accordance with a preferred embodiment of the present invention. This functionality is provided by the electrical circuitry shown in schematic form in FIGS. 7A-7L along with suitable software embedded in components thereof.

Figure 18A:
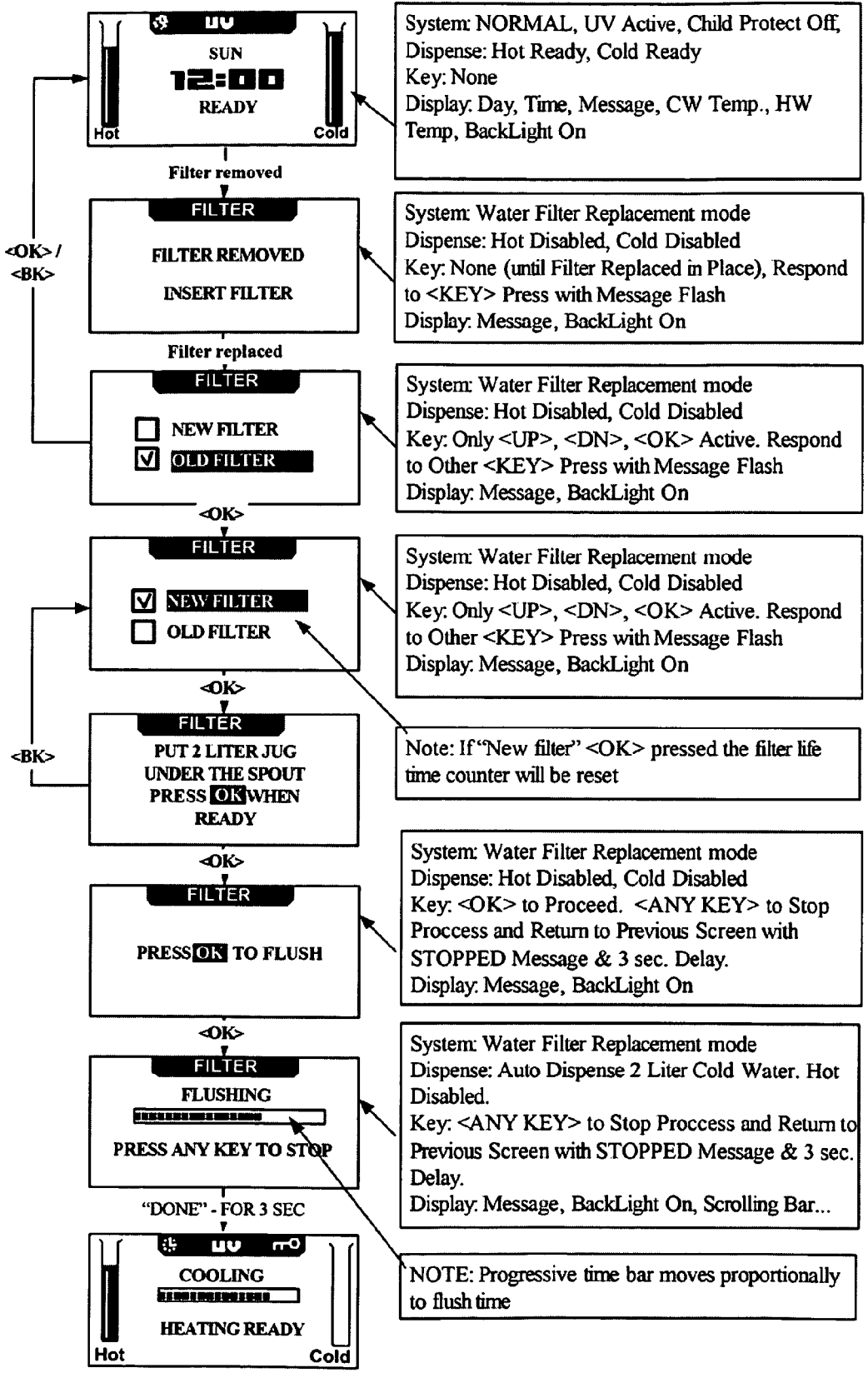
FIGS. 18A, 18B, 18C and 18D illustrate responses of the water dispenser to various operational conditions in accordance with a preferred embodiment of the present invention.
Figure 18B:
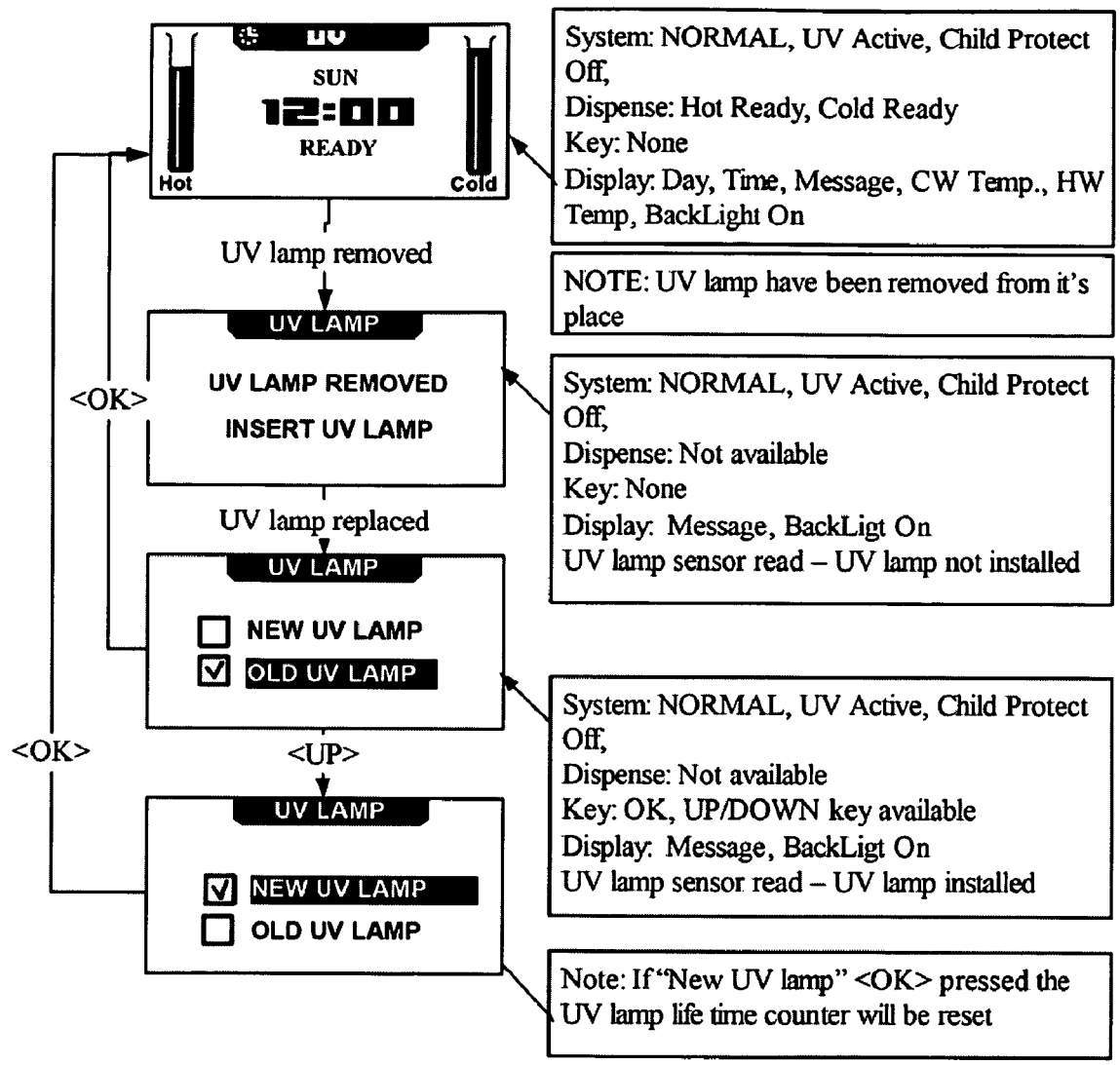
Figure 18C:
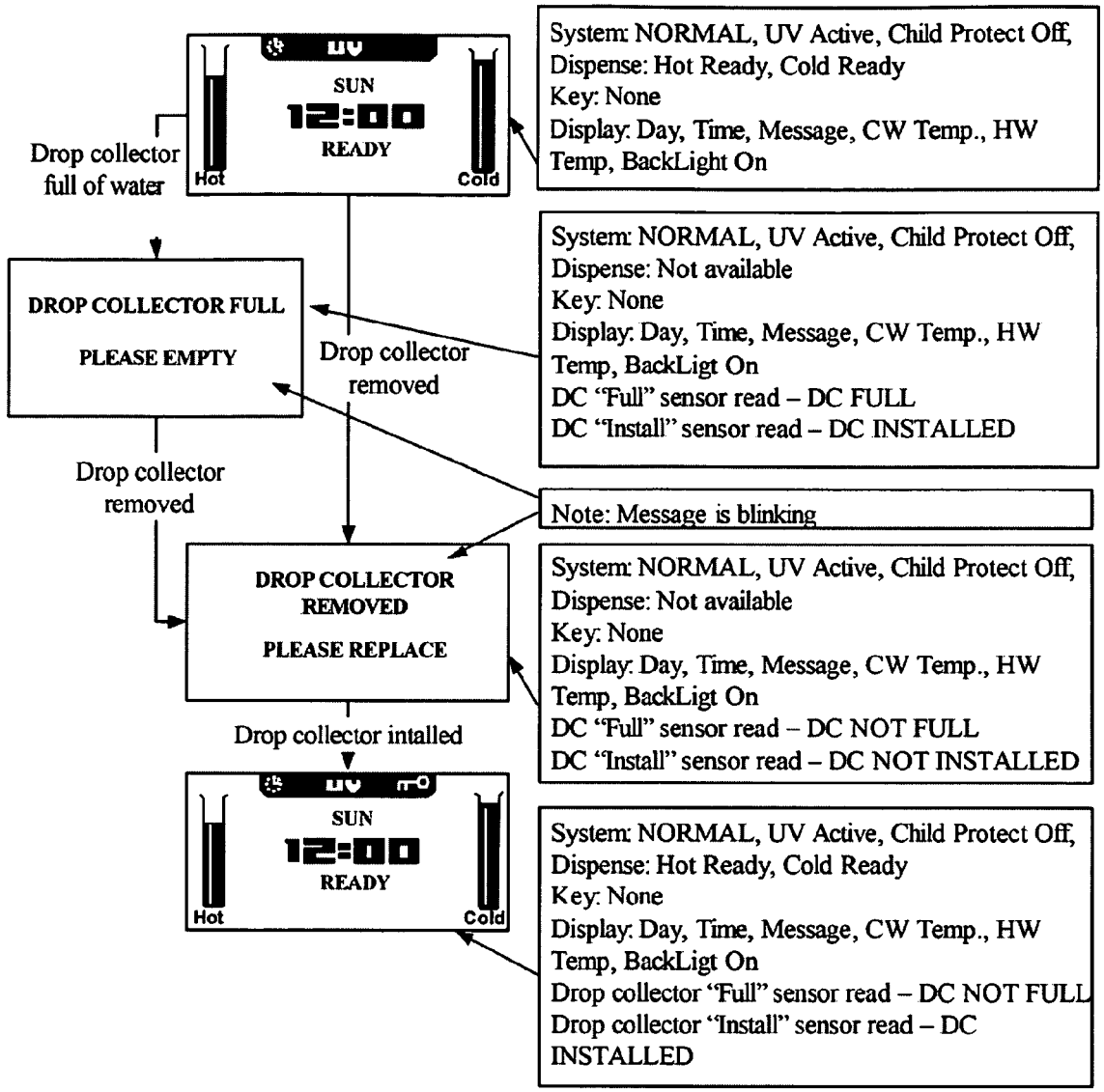
Figure 18D:
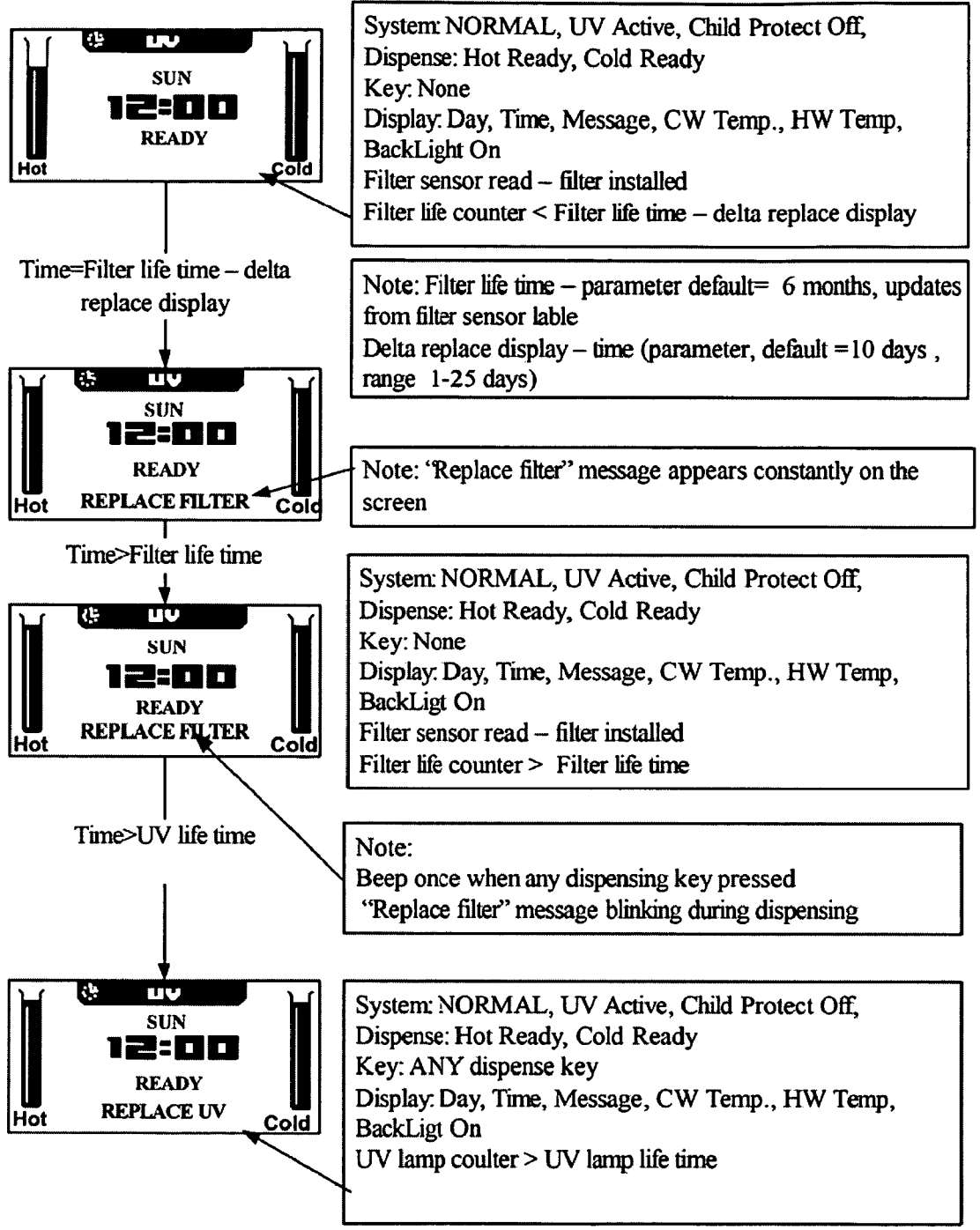

FIG. 18A illustrates operation of filter cartridge presence and identity sensor 320 (FIG. 6) when a filter cartridge 236 (FIG. 4) is removed and replaced. FIG. 18B illustrates operation when a UV lamp assembly 212 (FIG. 4) is removed and replaced. FIG. 18C illustrates operation of the water spill collector presence/full sensor 322 (FIG. 6). FIG. 18D illustrates operation of filter and UV lamp replacement time alert functionality.

It will be appreciated by persons skilled in the art that the present invention is not limited by what has been particularly shown and described hereinabove. Rather the scope of the present invention includes both combinations and subcombinations of various features described and shown in the foregoing description as well as modifications and variations thereof which would occur to a person of ordinary skill in the art upon reading the foregoing description and which are not in the prior art.

The invention claimed is:

1. A water dispenser comprising:
a water inlet adapted to receive water from a water supply;
a water filter operative to filter water received from said water supply via said water inlet;
a water outlet operative to provide filtered water received from said water filter;
a water spill collector; and
a pivotably mounted drainage-equipped water container support having a first operative orientation underlying said water outlet and defining a downwardly inclined water spill drainage pathway communicating with said water spill collector and a second, non-operative, orientation not underlying said water outlet.

2. A water dispenser according to claim 1 and also comprising:
a water cooling subassembly;
a heat exchanger cooperating with said cooling subassembly, said heat exchanger comprising an at least partially folded over grid; and
a water outlet operative to provide filtered water received from said water filter and said water cooling subassembly.

3. A water dispenser comprising:
a water inlet adapted to receive water from a water supply;
a water filter operative to filter water received from said water supply via said water inlet; and
an ultraviolet radiation assembly operative to disinfect said water received from said water supply, said ultraviolet radiation assembly including a UV lamp assembly and a UV lamp socket, said UV lamp assembly comprising a UV lamp including at least one filament and a plurality of male contacts, including first and second contacts of respective first and second different lengths, said first lengths being greater than said second lengths, said UV lamp socket defining female contacts for receiving said first and second contacts of said first and second different lengths, said first contacts providing electrical contact with said at least one filament in said UV lamp and said second contacts providing electrical contact with an electrical power supply.

4. A water dispenser according to claim 3 and also comprising:
a water cooling subassembly; and
a heat exchanger cooperating with said water cooling subassembly, said heat exchanger comprising an at least partially folded over grid.

5. A water dispenser according to claim 3 and also comprising:
a water spill collector; and
a pivotably mounted drainage-equipped water container support having a first operative orientation underlying said water outlet and defining a downwardly inclined water spill drainage pathway communicating with said water spill collector and a second, non-operative, orientation not underlying said water outlet.

6. A water dispenser according to claim 5 and also comprising:
a housing including a base which supports a chassis onto which are formed wrap-around side panels, a front control panel, said pivotably mounted drainage-equipped water container support and a top cover element.

7. A water dispenser according to claim 6 and wherein said front control panel includes a display and at least one function selection button.

8. A water dispenser according to claim 7 and wherein said at least one function selection button comprises a hot water selection button, a warm water selection button, a cold water selection button and a cool water selection button.

9. A water dispenser according to claim 8 and wherein said at least one function selection button also comprises an extra-hot water selection button and first and second menu selection buttons.

10. A water dispenser according to claim 5 and wherein said pivotably mounted drainage-equipped water container support comprises a perforated grid element which is seated in a recess formed in a tray element, having a drain aperture, said tray element being attached to a pivotable tray element support which is pivotably supported onto a chassis by means of a pair of pivot axle assemblies.

11. A water dispenser according to claim 10 and wherein at least one of said pair of pivot axle assemblies is spring loaded by a coil spring and includes a non-rotating axle portion, which is arranged for non-rotational engagement with a corresponding socket in the chassis and a cooperating tray element support engagement element, said socket and said engagement element having cooperating toothed surfaces which enable mutual seating engagement thereof at relative rotational orientations separated by 90 degrees, corresponding to said first and second orientations, thus retaining said pivotably mounted drainage-equipped water container support in its second orientation unless the user moves it to its first orientation.

12. A water dispenser according to claim 10 and wherein said pivotably mounted drainage-equipped water container support is operative in said first orientation such that water impinging thereonto from above passes through said perforated grid element and may temporarily collect on said tray element, said water draining from said tray element via said drain aperture into a drainage collection and flow region of said pivotable tray element support.

13. A water dispenser according to claim 12 and wherein said drainage collection and flow region of said tray element support is downwardly inclined towards a weir, which defines a barrier which collects water in said region but permits excess water to pour from said region into said water spill collector.

14. A water dispenser according to claim 13 and wherein when said pivotably mounted drainage-equipped water container support is in said second orientation, any remaining water in said region drains into said water spill collector.

15. A water dispenser according to claim 3 and including filter cartridge identification and verification functionality.

\* \* \* \* \*